US008890805B2

(12) United States Patent
Kwon et al.

(10) Patent No.: US 8,890,805 B2
(45) Date of Patent: Nov. 18, 2014

(54) MOBILE TERMINAL AND MODE CONTROLLING METHOD THEREIN

(75) Inventors: Yunmi Kwon, Seoul (KR); Sunghye Yoon, Busan (KR); Jaeho Choi, Seoul (KR); Joohee Son, Seoul (KR)

(73) Assignee: LG Electronics Inc., Seoul (KR)

( * ) Notice: Subject to any disclaimer, the term of this patent is extended or adjusted under 35 U.S.C. 154(b) by 338 days.

(21) Appl. No.: 13/401,647

(22) Filed: Feb. 21, 2012

(65) Prior Publication Data

US 2012/0299814 A1  Nov. 29, 2012

(30) Foreign Application Priority Data

May 27, 2011  (KR) .................. 10-2011-0050668

(51) Int. Cl.
*G09G 5/00* (2006.01)
*H04M 1/725* (2006.01)
(52) U.S. Cl.
CPC .................................. *H04M 1/72583* (2013.01)
USPC ........................................................ 345/156
(58) Field of Classification Search
None
See application file for complete search history.

(56) References Cited

U.S. PATENT DOCUMENTS

2008/0318616 A1*  12/2008  Chipalkatti et al. ....... 455/550.1

FOREIGN PATENT DOCUMENTS

| CN | 101894042 A | 11/2010 |
| CN | 102572091 A | 7/2012 |

* cited by examiner

*Primary Examiner* — Nicholas Lee
(74) *Attorney, Agent, or Firm* — Birch, Stewart, Kolasch & Birch, LLP

(57) ABSTRACT

A mobile terminal including a communication unit; a memory configured to store at least first and second operating systems including at least first and second modes, respectively; and a controller configured to display, in a first display region of a display unit of the mobile terminal, a first application indicator corresponding to a first application executable in the first mode using the first operating system and that can be activated by selecting the first application indicator, to display, in a second display region, a second application indicator corresponding to a second application executable in the second mode using the second operating system and that can be activated by selecting the second application indicator. Further, the first and second application indicators indicate whether the applications are executable in the first mode or the second mode, or executable in both the first and second modes.

18 Claims, 63 Drawing Sheets

P mode — 501

Schedule 1

Contents

Participants — 931
Time — 932

OK (a)

B mode — 502

Schedule 2

Contents

Participants — 941
Time — 942
Notifications | E-mail sending — 943

| | | | |
|---|---|---|---|
| | | | P mode |
| A | B | C | D |
| E | .. | .. | .. |
| .. | .. | .. | .. |
| .. | .. | .. | Z |

(a)

| | | | | | |
|---|---|---|---|---|---|
| | | | | | B mode |
| Q | W | E | .. | .. | P |
| A | S | .. | .. | .. | L |
| Z | X | .. | .. | .. | M |
| 1 | 2 | .. | .. | .. | O |

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

MOBILE TERMINAL AND MODE CONTROLLING METHOD THEREIN

Pursuant to 35 U.S.C. §119(a), this application claims the benefit of earlier filing date and right of priority to Korean Application No. 10-2011-0050668, filed on May 27, 2011, the entire contents of which are herein incorporated by reference.

BACKGROUND OF THE INVENTION

1. Field of the Invention

The present invention relates to a mobile terminal and corresponding method for displaying different application indicators in different modes.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

A demand for using the mobile terminal for personal needs or for business needs separately keeps rising. However, the related art mobile terminal does not provide an environment in which the mobile terminal can be separately used for personal and business needs.

SUMMARY OF THE INVENTION

Accordingly, one object of the present invention is to provide a mobile terminal and mode controlling method therein that substantially obviate one or more problems due to limitations and disadvantages of the related art.

Another object of the present invention is to provide a mobile terminal and corresponding mode controlling method for displaying information corresponding to modes on display regions corresponding to the modes.

Another object of the present invention is to provide a mobile terminal and corresponding mode controlling method therein for executing and displaying a first application operated in a first mode to be operated in a second mode.

To achieve these objects and other advantages and in accordance with the purpose of the invention, as embodied and broadly described herein, the present invention provides in one aspect a mobile terminal including a communication unit configured to communicate with at least one external terminal; a memory configured to store at least first and second operating systems including at least first and second modes, respectively; and a controller configured to display, in a first display region of a display unit of the mobile terminal, a first application indicator corresponding to a first application executable in the first mode using the first operating system and that can be activated by selecting the first application indicator, and to display, in a second display region, a second application indicator corresponding to a second application executable in the second mode using the second operating system and that can be activated by selecting the second application indicator. Further, the first and second application indicators indicate whether the applications are executable in the first mode or the second mode, or executable in both the first and second modes.

In another aspect, the present invention provides a method of controlling a mobile terminal, and which includes allowing, via a communication unit of the mobile terminal, communication with at least one external terminal; storing, in a memory of the mobile terminal, at least first and second operating systems including at least first and second modes, respectively; displaying in a first display region of a display unit of the mobile terminal a first application indicator corresponding to a first application executable in the first mode using the first operating system and that can be activated by selecting the first application indicator; and displaying in a second display region of the display unit, a second application indicator corresponding to a second application executable in the second mode using the second operating system and that can be activated by selecting the second application indicator. Further, the first and second application indicators indicate whether the applications are executable in the first mode or the second mode, or executable in both the first and second modes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First, mobile terminals described in this disclosure can include a mobile phone, a smart phone, a laptop computer, a digital broadcast terminal, a PDA (personal digital assistant), a PMP (portable multimedia player), a navigation system and the like. With the exception of a mobile terminal only, the configurations described in this disclosure are applicable to such a stationary terminal as a digital TV, a desktop computer and the like.

Figure 1:
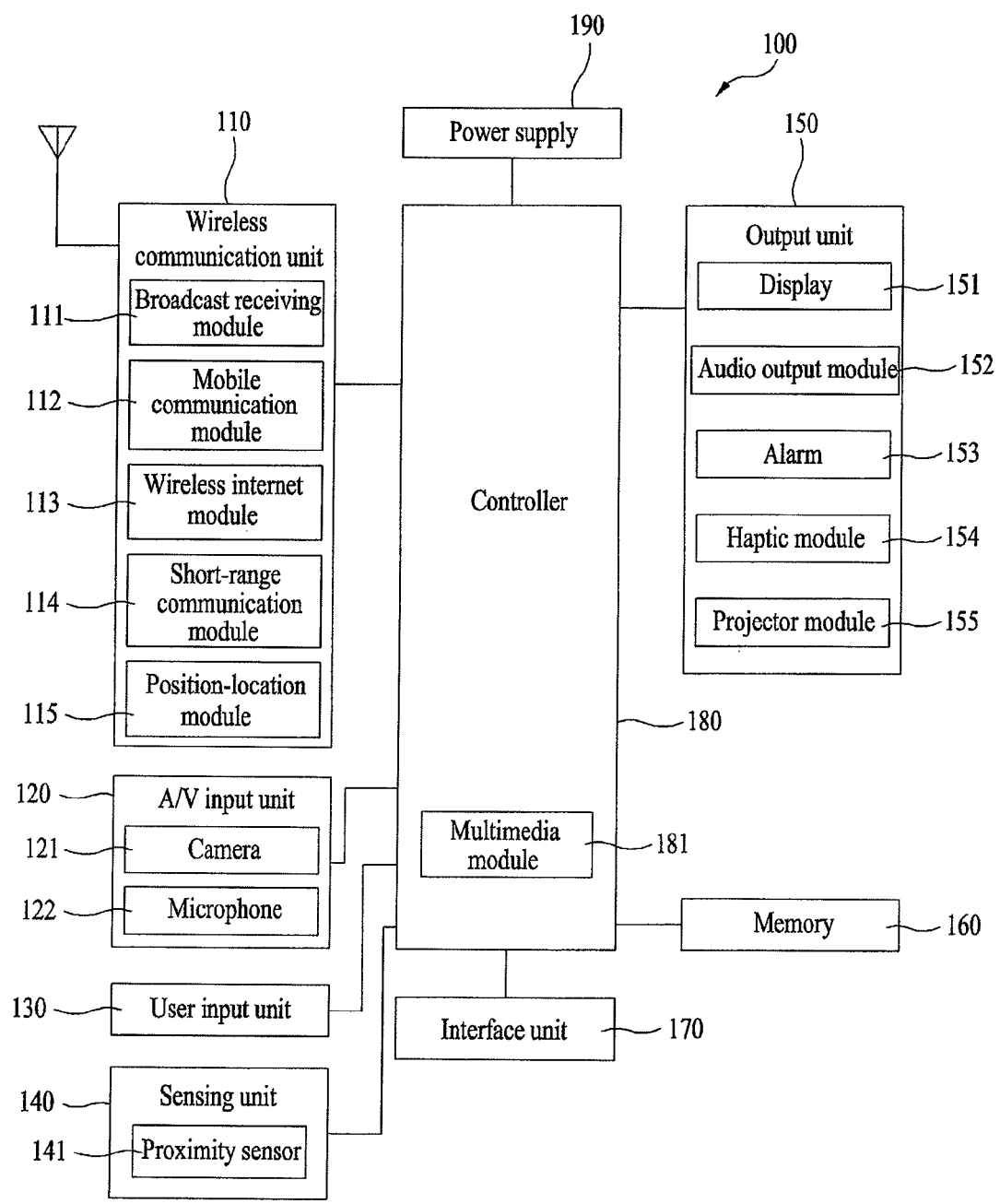
FIG. 1 is a block diagram of a mobile terminal according to one embodiment of the present invention.

First, FIG. 1 is a block diagram of a mobile terminal 100 according to one embodiment of the present invention. Referring to FIG. 1, the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but all of the illustrated components are not required. Greater or fewer components may alternatively be implemented.

The wireless communication unit 110 generally includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which includes a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

Further, the broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160. In addition, the mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few. Further, the position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when in call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example of the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 by being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it can use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing mechanism for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 generally controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively. Further, the power supply unit 190 provides power used by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
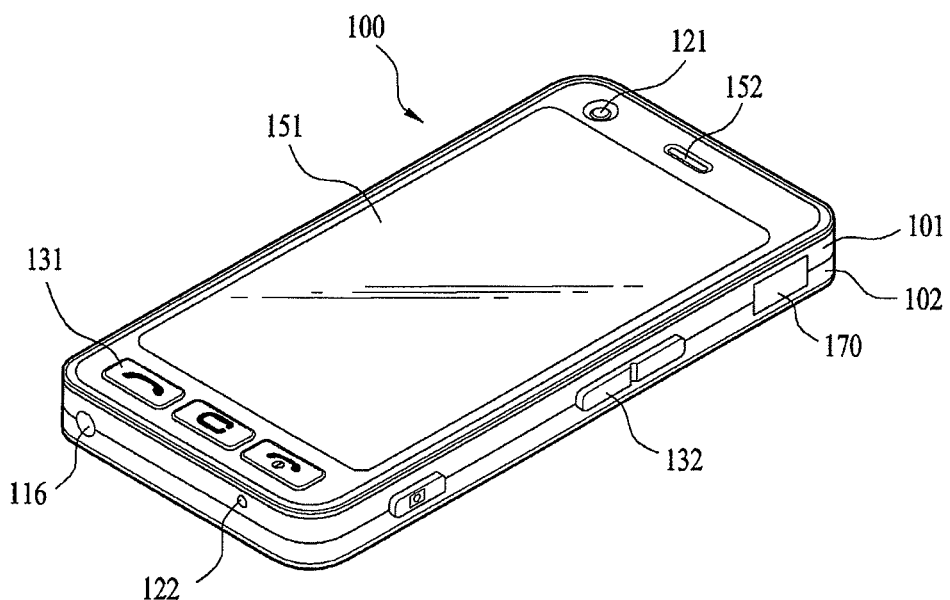
FIG. 2A is a front perspective diagram of a mobile terminal according to one embodiment of the present invention.

Next, FIG. 2A is a front perspective diagram of the mobile terminal 100 according to one embodiment of the present invention. The mobile terminal 100 shown in the drawing has a bar-type terminal body. However, the mobile terminal 100 may be implemented in a variety of configurations, including folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101. The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132. A retractable antenna 116 can also be provided.

Figure 2B:
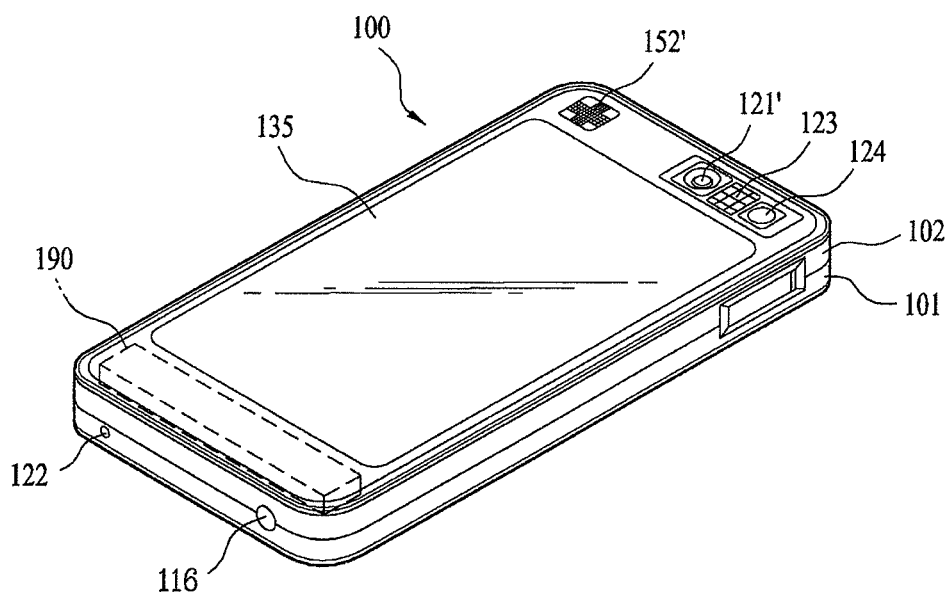
FIG. 2B is a rear perspective diagram of a mobile terminal according to one embodiment of the present invention.

Next, FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121' has a photographing direction that is substantially opposite to that of the former camera 121 shown in FIG. 21A and may have pixels differing from those of the former camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provide to the terminal body.

The power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this instance, if the display unit 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First, the mobile terminal mentioned in the following description includes at least some of the components shown in FIG. 1. In addition, in order to perform an operation using the components (e.g., touchscreen, wireless communication unit, memory, etc.), the controller 180 can control an individual operation of each of the components or interconnected operations among a plurality of the components.

Applications mentioned in this disclosure may be embodied as software programs drivable in the mobile terminal. The driven application executes a corresponding function or operation. The application can be stored in the mobile terminal 100 (particularly the memory 160) or can be downloaded from an external server of an external terminal.

For example, the applications can include a compass, an augmented reality, a camera, a video player, a music player, a game, news, a web browser, a message, a phonebook, a memo, a schedule management, and the like. The allocations are non-limited by this example and can be implemented in various other ways.

Contents or data associated with the applications are possible as well. In this instance, the associated content or data is stored in the memory 160 or can be stored in an external server having a storage space. For instance, the contents can include an audio file (associated with the music player), a video file (associated with the video player), a document file (associated with an e-book), and the like. In addition, the data can include a message content (associated with the message), a memo content (associated with the memo), a counterpart information (associated with the phonebook), a schedule content (associated with the schedule management), and the like.

According to an embodiment of the present invention, the mobile terminal can configure a plurality of modes differing from each other in application configuration for data security for one mode against another mode or data security between different modes. In addition, the mobile terminal according to an embodiment of the present invention can implement a plurality of the modes selectively or simultaneously (or sequentially).

When a specific application is executed in a prescribed mode, at least one application interoperable with the specific application can be executed in the prescribed mode. For instance, if a specific application is a voice call application, an application interoperable with the voice call operation can include a phonebook, a message and the like.

Regarding mode discrimination in application configuration, an application executable in each of a plurality of modes can include at least one application (hereinafter named a dedicated application) executable by being dedicated to each of a plurality of the modes or at least one application (hereinafter named a common application) executable in any one of a plurality of the modes. In particular, the common application can change at least one feature in each of a plurality of the modes in which the corresponding application is executable. For instance, at least one of configuration, representation, security and the like of the common application is changeable. This shall be described in detail later.

The common application may not change its feature in each of a plurality of the modes in which the corresponding application is executable. For instance, if the common application includes such a basic terminal application as a voice call, a message and the like, it may not change its feature.

For example, if first to third applications are executed in a first mode and if the third application, a fourth application and a fifth application are executed in a second mode, the first and second applications, the third application and the fourth and fifth application can be called the dedicated applications of the first mode, the common application of the first and second modes and the dedicated applications of the second mode, respectively.

A plurality of modes can include a first mode (i.e., a private mode) facilitating user's personal life, a second mode (i.e., a business mode) facilitating a user's work life, and the like. This enables a mobile terminal to be discriminatively used in consideration of a user's personal life (e.g., privacy) and a user's public life (e.g., work life). In particular, in aspect of security reinforcement, when either a private mode or a business mode is implemented, restriction can be put on an access to information corresponding to the other mode.

The above-described private mode and the business mode are just examples for describing a plurality of the modes. If the above-described private mode and the business mode are suitable for the mode discrimination reference mentioned in this disclosure, they are non-limited by their names. Although the mode discrimination of a plurality of the modes is explained in the above description based on the application configuration, it shall be described in detail with reference to the accompanying drawings later.

Implementation and activation of a plurality of modes mentioned in the description of the present invention shall be defined as follows. First, according to an embodiment of the present invention, a mobile terminal can implement a plurality of modes and can activate one of a plurality of the currently implemented modes. For instance, if a plurality of the modes include a first mode and a second mode, the mobile terminal boots an operating system capable of implementing both of the first and second modes and can then activate the implemented first or second mode selectively.

In particular, if both of the first and second modes are already implemented, the mode for displaying an executed screen on a current screen, the mode for designating the currently executed application, the mode having a high priority or the like can be called an activated mode. In this instance, a non-activated mode (or a deactivated mode) can be regarded as operating as a background despite being implemented in the mobile terminal. In more detail, if an executed screen of the first mode and an executed screen of the second mode are being displayed on a first region and a second region of the screen through screen partition, respectively, the mode selected by a user, the mode for activating the corresponding region currently, the mode for designating a currently executed application, the mode having a high priority or the like can be regarded as activated.

Occasionally, after the mobile terminal has implemented and activated one mode, if the mobile terminal attempts to switch the current mode to the other mode, the mobile terminal can implement and activate the other mode (i.e., selective implementation and activation of mode).

In the following description, implementation of a plurality of modes and operations of components used for inter-mode switching for a plurality of the modes are explained in detail with reference to FIGS. 3A to 4C. In particular, FIGS. 3A to 3C are block diagrams of components used for controlling a plurality of modes and switching of the modes according to an embodiment of the present invention.

Figure 3A:
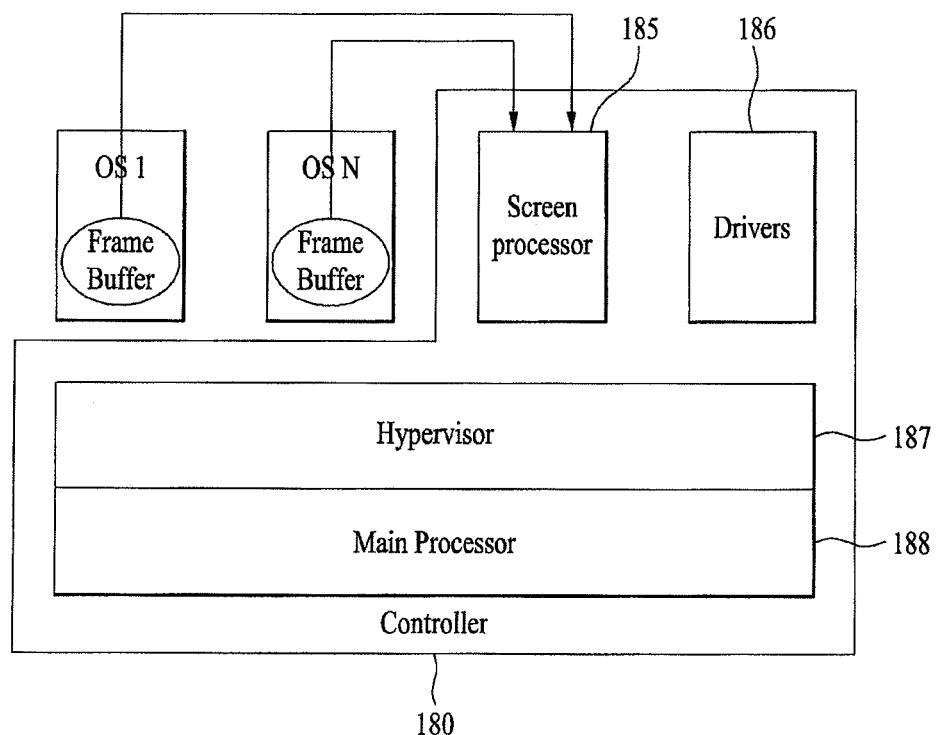
FIGS. 3A to 3C are block diagrams of components for controlling a plurality of modes and switching of the modes according to an embodiment of the present invention.
Figure 3B:
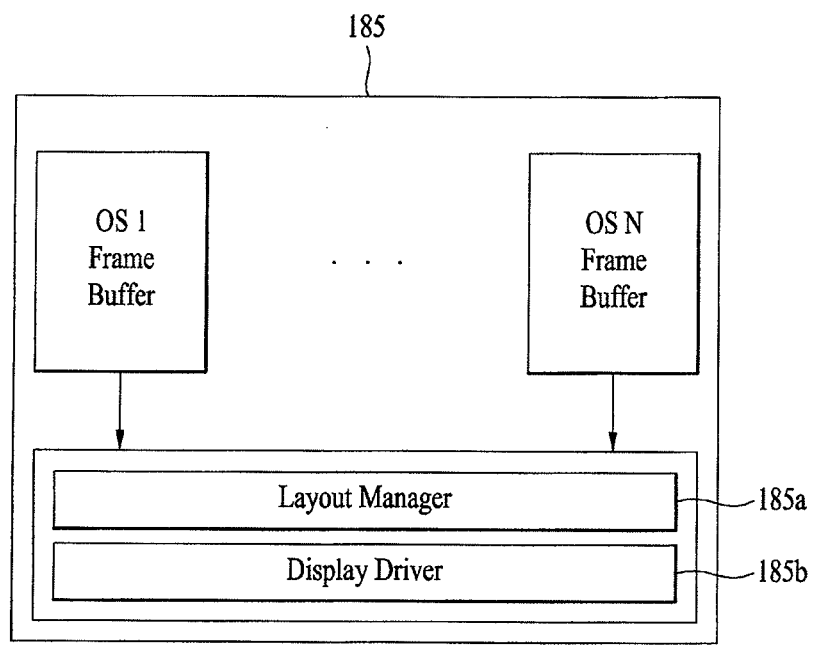
Figure 3C:
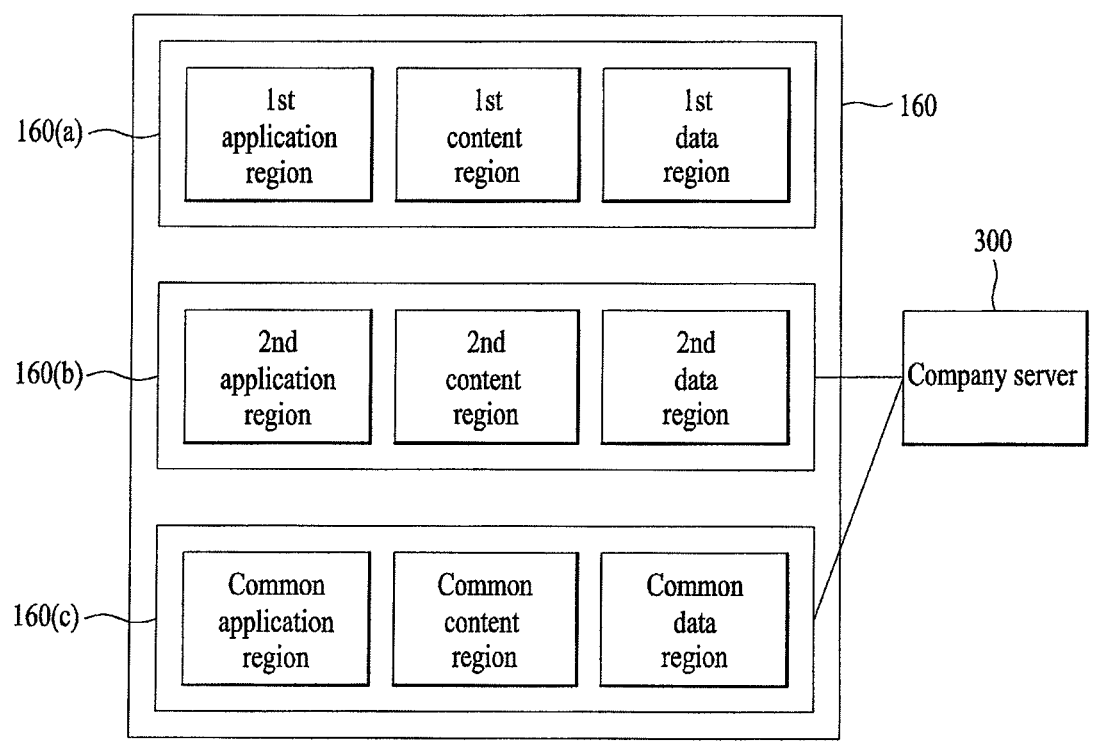

FIG. 3A is a block diagram of the controller 180 for driving a plurality of operating systems (OSs) and con ring a dedicated screen of a plurality of operating systems. In addition, FIG. 3B is a block diagram of a screen processor 185 shown in FIG. 3A. In particular, FIGS. 3A and 3B show a situation in which a plurality of the operating systems are provided in parallel with each other (FIGS. 4A(a) and 4B).

According to an embodiment of the present invention, a plurality of the modes can be implemented by a plurality of the operating systems, respectively. In particular, the operating system for supporting implementation can differ per mode.

Referring to FIG. 3A, the controller 180 includes the screen processor 185, a driver 186, a hypervisor 187 and a main processor 188. In this instance, the hypervisor 187 can be called a virtual engine (virtual machine), a virtualizing module (virtualization), a virtual engine monitor (virtual machine monitor), a virtualization module monitor (virtualization monitor) and the like. This terminology is just exemplary. In addition, a component capable of performing the same function of the hypervisor 187 is non-limited by the corresponding terminology.

Further, a frame buffer is provided to each of a plurality of the operating systems stored in the memory 160. When the plurality of operating systems are driven, the screen processor 185 receives a frame corresponding to a dedicated screen of the corresponding operating system from each of the frame buffers and then determines whether to display the dedicated screen of a prescribed one of the operating systems on a screen of the display unit 151 under the control of the main processor 188.

Under the control of the main processor 188, the screen processor 185 displays the dedicated screen of the specific operating system on the whole screen of the display unit 151 (e.g., when implementing one mode only). Alternatively, the screen processor 185 generates one integrated frame by combining and/or editing the frames received from the frame buffers and can then display an integrated dedicated screen including all the dedicated screens of a plurality of the operating systems (e.g., when implementing a plurality of the modes).

Figure 4A:
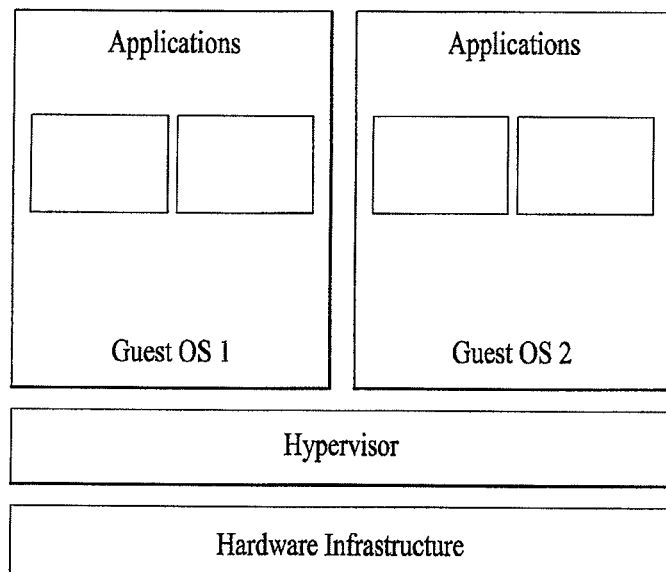
FIGS. 4A to 4C are block diagrams of components for operating a plurality of operating systems and modes according to an embodiment of the present invention.
Figure 4A:
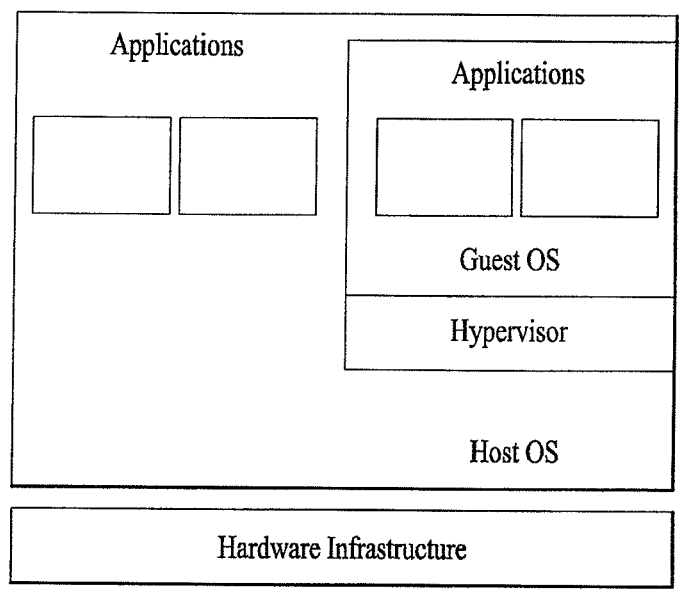
Figure 4B:
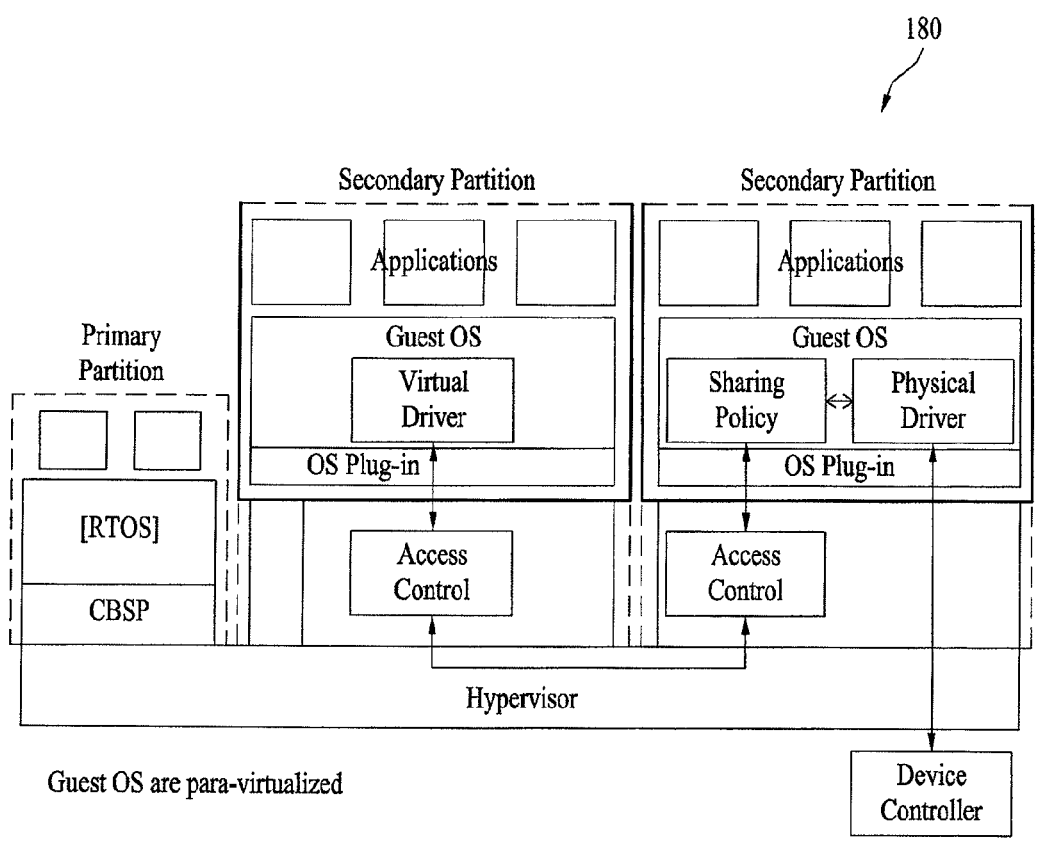

Referring to FIG. 3A, a plurality of the operating systems OS 1, . . . OS N are prepared in parallel with each other, which can be described in detail with reference to FIGS. 4A(a) and 4B as follows. FIGS. 4A(a) and 4B show a scheme of booting a plurality of operating systems Guest OS 1 and Guest OS 2 respectively supporting different modes in parallel by loading a hypervisor (hereinafter named a first scheme).

Referring to FIGS. 4A(a) and 4B, the mobile terminal 100 can implement Guest OS 1 and Guest OS 2 selectively, sequentially or simultaneously. In addition, a different mode can be designated to each of the Guest OS 1 and the Guest OS 2. In this instance, the operation of the Guest OS 1 and the Guest OS 2 and the corresponding mode activation can be performed by the hypervisor. The components shown in FIG. 4B can perform general operations related to the virtualization engine technology.

Multi-OS booting and mode activation corresponding to the multi-OS booting are described in detail as follows. First, when (1) activating a mode corresponding to the currently booted Guest OS 1 or Guest OS 2 or (2) booting the Guest OS 1 corresponding to first mode and the Guest OS 2 corresponding to a second mode sequentially or simultaneously, the controller 180 (particularly, the hypervisor) implements and activates either the first mode or the second mode (2-1) or can activate either the first or second mode despite implementing both of the first and second modes (2-2).

Referring now to FIG. 3B, the screen processor 185 includes a layout manager 185*a* and a display driver 185*b*. Under the control of the main processor 188, the layout manager 185*a* generates one integrated frame by combing or editing the frames received from the frame buffers and the display driver 185*b* then controls the frame generated by the layout manager 185*a* to be displayed on the display unit 151.

The driver 186 controls the operating systems to be driven. Further, the hypervisor 187 is a middleware between the main processor 188 and each of the operating systems and includes a virtualization engine configured to a plurality of the operating systems to be usable in the mobile terminal 100 according to an embodiment of the present invention. In addition, the main processor 188 controls all operations related to the driving of a plurality of the operating systems according to an embodiment of the present invention.

As mentioned in the above description, the screen processor 185, the driver 186, the hypervisor 187 and the main processor 188 can be included in the controller 180 or can be stored as software in the memory 160.

Next, FIG. 3C is a block diagram of the memory 160 having a database storage region corresponding to each of a plurality of the modes. According to an embodiment of the present invention, the mobile terminal 100 can manage the database storage regions of a plurality of the modes discriminatively. In particular, when a plurality of the modes are implemented by the different operating systems, respectively, the mobile terminal 100 can manage the database storage regions of a plurality of the modes discriminatively.

Generally, when at least one operating system capable of implementing a first mode and a second mode is provided, the memory 160 can store an application corresponding to each of the at least one operating system. Therefore, the provided operating systems can be booted selectively or simultaneously under the control of the controller 180.

For instance, the operating system can include such a commercial OS as Android OS, Linux based OS, Windows Mobile OS, Apple OS and the like. In addition, a dedicated application can be differently set for each of the operating systems. In addition, a multi-OS can include different kinds of operating systems (e.g., Android OS, Apple OS, etc.) and the same kinds of operating systems (e.g., 2.1 version of Android OS, 2.2 version of Android OS, etc.) differing from each other in version.

According to an embodiment of the present invention as shown in FIG. 3C, assuming that both the first mode and the second mode can be implemented, the memory 160 can include a first database storage region 160(*a*) corresponding to the first mode, a second database storage region 160(*b*) corresponding to the second mode, and a common database storage region 160(*c*) in common with the first mode and the second mode. Occasionally, the common database storage region 160(*c*) can be omitted. In this instance, a commonly-designated application and content or data associated with the corresponding application can be stored in the database storage region of the corresponding mode.

In particular, in configuring the first, second and common database storage regions, the mobile terminal 100 uses memories different from each other in hardware as the storage regions, puts restriction on accessing the storage regions per mode despite providing the storage regions within a same memory, or can discriminate the storage regions from each other using a storage partition per mode.

In this instance, the same operating system implements the first mode and the second mode or different operating systems can implement the first mode and the second mode, respectively. Moreover, at least two or modes can be implemented by the mobile terminal 100. If so, the database storage regions can be further subdivided.

In particular, the first database storage region 160(*a*) can include a region (i.e., a first application region) for storing at least one first application executable in the first mode, a region (i.e., a first content region) for storing a content associated with the first application and a region (i.e., a first data region) for storing data associated with the first application.

In addition, the second database storage region 160(*b*) can include a region (i.e., a second application region) for storing at least one second application executable in the second mode, a region (i.e., a second content region) for storing a content associated with the second application and a region (i.e., a second data region) for storing data associated with the second application.

Moreover, the common database storage region 160(*c*) can include a region (i.e., a common application region) for storing at least one common application executable in both of the first mode and the second mode, a region (i.e., a common content region) for storing a content associated with the common application and a region (i.e., a common data region) for storing data associated with the common application.

When the second mode is a business mode that facilitates a user's public life, information stored in the second database storage region 160(*b*) and information corresponding to the second mode in the common database storage region 160(*c*) can be utilized only if the corresponding information is stored by being shared with a company server 300, the corresponding information is stored in the company server 300 (i.e., the second database storage region 160(*b*) is unnecessary) or the company server 300 is accessed. In this instance, the company server 300 can include a server of a company, for which a user works, a server of a specific company designated by a user (or a company where the user works), or the like.

While the first mode is activated, the mobile terminal 100 can utilize the information stored in the first database storage region 160(*a*) and the information corresponding to the first mode in the common database storage region 160(*c*). While the second mode is activated, the mobile terminal 100 can utilize all the information stored in the first, second and common database storage regions 160(*a*), 160(*b*) and 160(*c*).

Alternatively, while the second mode is activated, the mobile terminal 100 can utilize the information stored in the first database storage region 160(*a*) and the information corresponding to the second mode in the common database storage region 160(*c*). While the first mode is activated, the mobile terminal 100 can utilize all the information stored in the first, second and common databases storage regions 160(*a*), 106(*b*) and 160(*c*).

Optionally, the mobile terminal 100 can be set not to utilize the information on the first mode in the course of the activated second mode. Besides, although the drawing shows that the application region, the content region and the data region are situated in the database storage region, the application region, the content region and the data region can be integrated together if desired.

Next, FIGS. 4A(*b*) and 4C show a scheme of driving a hypervisor on a Host OS for supporting one mode to boot a Guest OS for supporting another mode (hereinafter named a second scheme). In particular, a mode supported by the Host OS can include a private mode. In addition, a mode supported by the Guest OS can include a business mode.

Figure 4C:
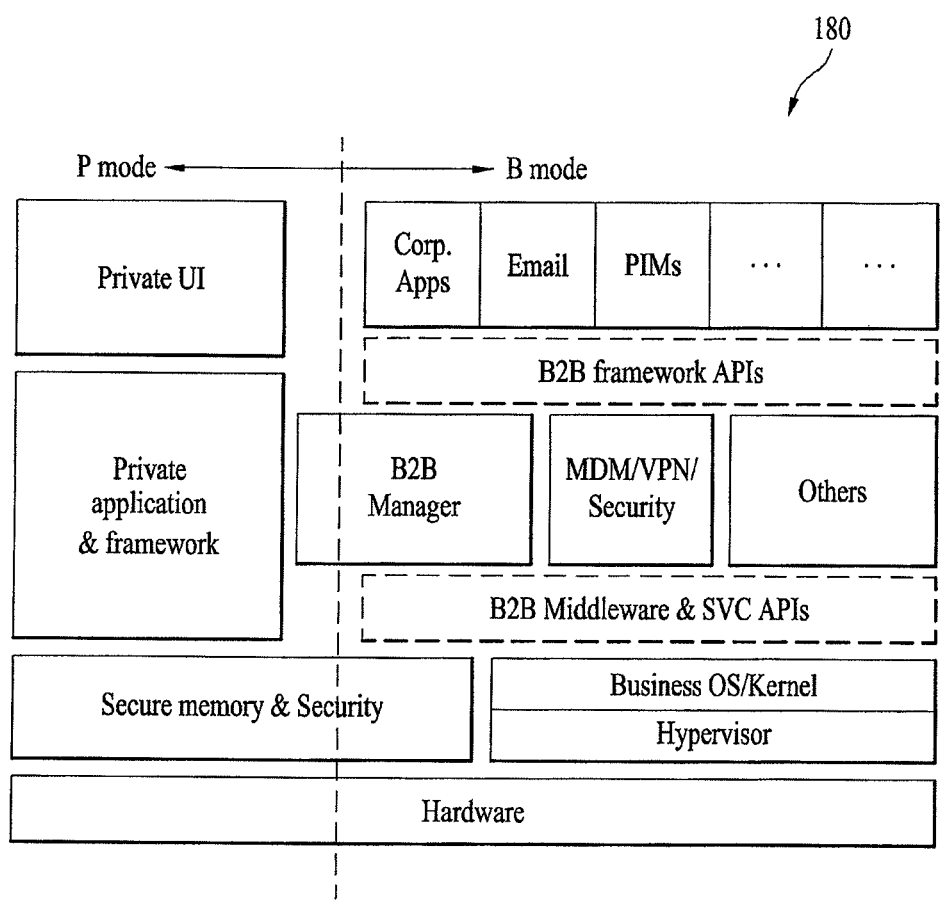

In more detail, referring to FIG. 4C, a B2B manager can perform a switching operation between a private mode (hereinafter abbreviated a P mode) and a business mode (hereinafter abbreviated a B mode). Components shown in a P mode region of the two regions partitioned by a dotted line can operate when the private mode is implemented, components shown in the B mode region can operate when the business mode is implemented, and components included in both of the modes can operate in both of the modes.

According to an embodiment of the present invention, the mobile terminal 100 can implement a plurality of modes on an operating system selectively, simultaneously or sequentially. A different operating system (hereinafter named an individual operating system) is designated to each of a plurality of the modes or a common operating system can be designated to a plurality of the modes. Specifically, implementation of a plurality of the modes can be controlled by the hypervisor 187.

In particular, a currently implemented or activated mode in accordance with an individual or common operating system is defined as follows. For clarity and convenience of the following description, assume that a plurality of modes include a first mode and a second mode. At least two or more modes can exist if desired.

First, when a common operating system is booted, the controller 180 implements and activates either the first mode or the second mode or activates either the first mode or the second mode despite implementing both of the first and second modes.

When an individual operating system is booted, the controller (1) implements and activates a mode corresponding to a currently booted individual operating system, (2) implements and activates a mode corresponding to one of the first mode and the second mode when booting a first operating system corresponding to the first mode and a second operating system corresponding to the second mode sequentially or simultaneously, or (3) activates either the first mode or the second mode despite implementing both of the first mode and the second mode.

The following description describes how to discriminate a plurality of modes from each other. First, according to an embodiment of the present invention, each of a plurality of modes can be discriminated by at least one of a mode indicator, a database storage region, an operating system, a user access authority, an application configuration, a content configuration, a data configuration, an application feature, an application group, a group identifier and the like.

Discriminating a plurality of modes using a mode indicator according to a first embodiment is explained as follows. First, each of a plurality of modes can have an indicator different to indicate a corresponding mode. An indicator per mode is basically stored in the mobile terminal 100 or can be downloaded from an external server or an external terminal. The indicator per mode is set or selected by a user or can be randomly set by the controller 180.

For instance, each of a plurality of the modes can have a different one of a mode icon, a mode image, a background image, a background color/brightness, a letter font/color/size, a home screen picture (number of pages and page indicator included), an application arrangement structure (e.g., the number of applications included in one home screen, etc.), an application identifier, an LED color, an alarm sound such as a bell sound and the like, a keypad type (backlight color of keypad included), a mode switching key zone, a group identifier (described later) and the like. These examples of the mode indicator are just exemplary and can include all display elements for discriminating a mode. This is explained in detail with reference to FIGS. 5A to 5D.

Figure 5A:
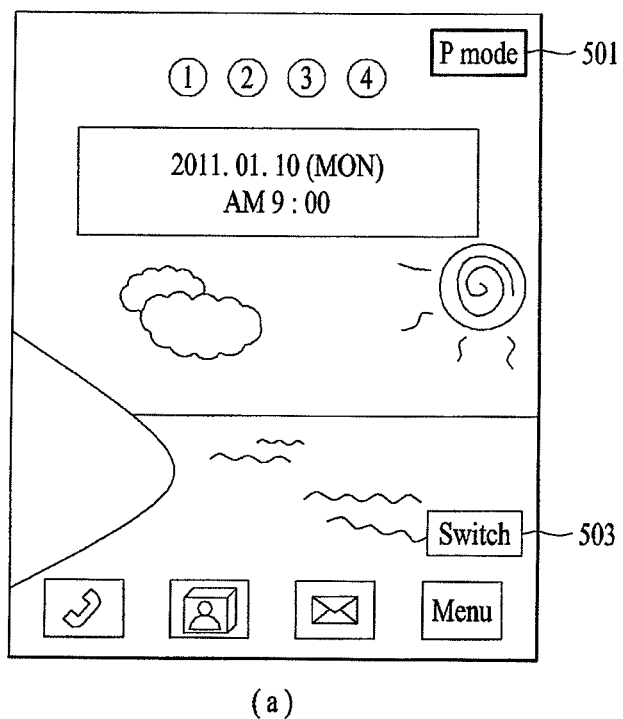
FIGS. 5A to 10C are display screens illustrating discriminating a plurality of modes according to an embodiment of the present invention.
Figure 5A:
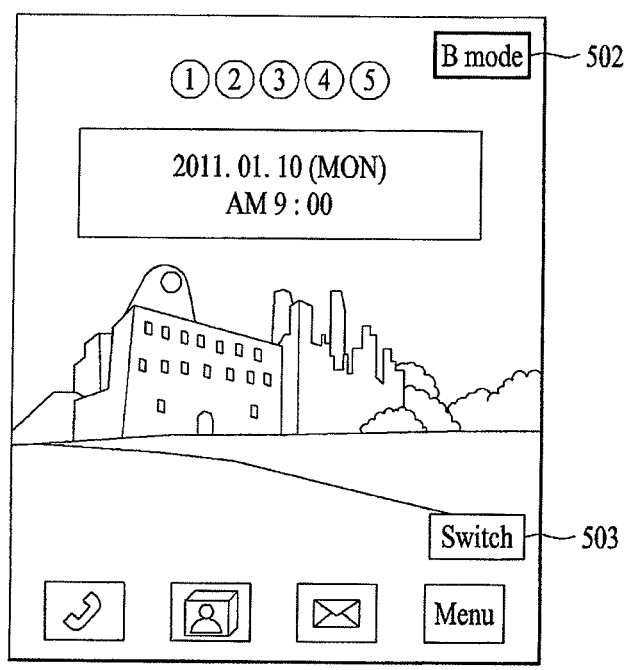

For clarity and convenience, the following description assumes the first mode is the private mode and the second mode is the business mode. Either the private mode or the business mode is also assumed to be in an active state. FIGS. 5A to 10C are diagrams for discriminating a plurality of modes according to an embodiment of the present invention. Referring to FIG. 5A, if a personal mode is currently activated, the mobile terminal 100 can display an icon (P mode) 501 corresponding to the private mode on a prescribed region of a screen (FIG. 5A(a)). If a business mode is currently activated, the mobile terminal 100 can display an icon (B mode) 502 corresponding to the business mode on a prescribed region of a screen (FIG. 5A(b)).

Figure 5B:
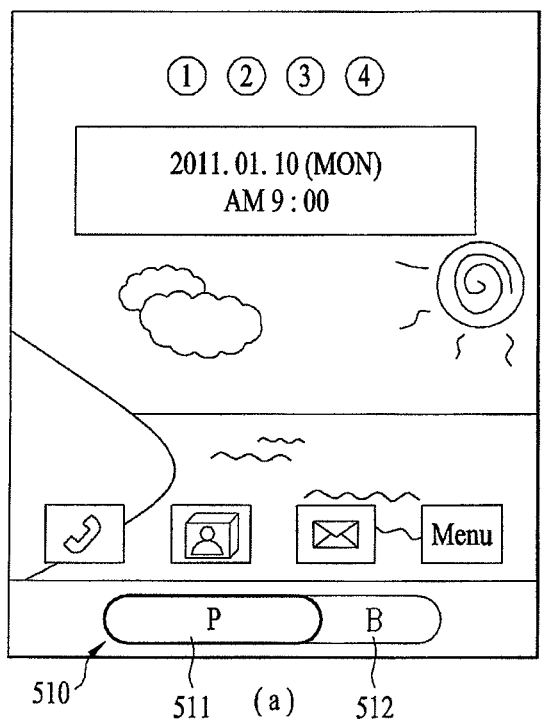
Figure 5B:
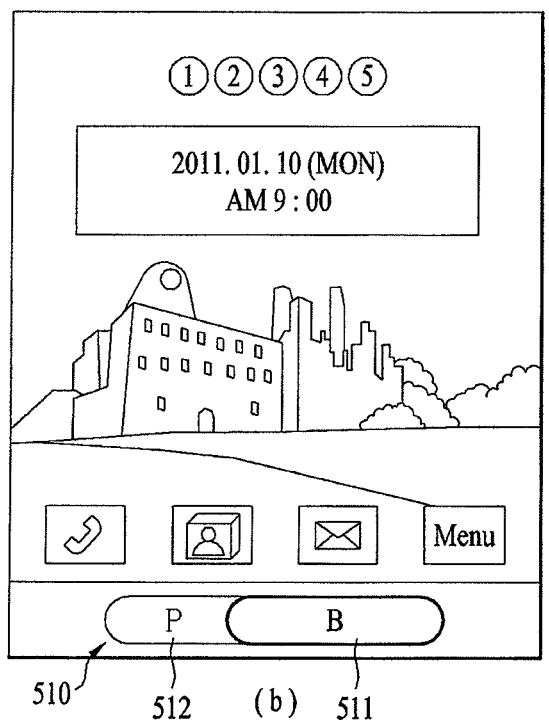

Referring to FIG. 5B, the mobile terminal 100 includes a mode switching key region 510 provided to a prescribed region of the screen. If the private mode is currently activated, the mobile terminal 100 can discriminatively display a zone (P) 511 corresponding to the private mode in the mode switching key region 510 (FIG. 5B(a)). If the business mode is currently activated, the mobile terminal 100 can discriminatively display a zone (B) 512 corresponding to the business mode in the mode switching key region 510 (FIG. 5B(b)).

Figure 5C:
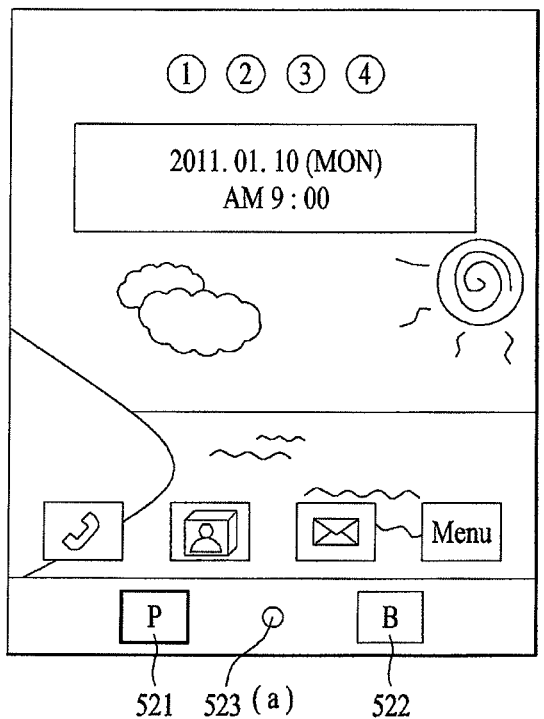
Figure 5C:
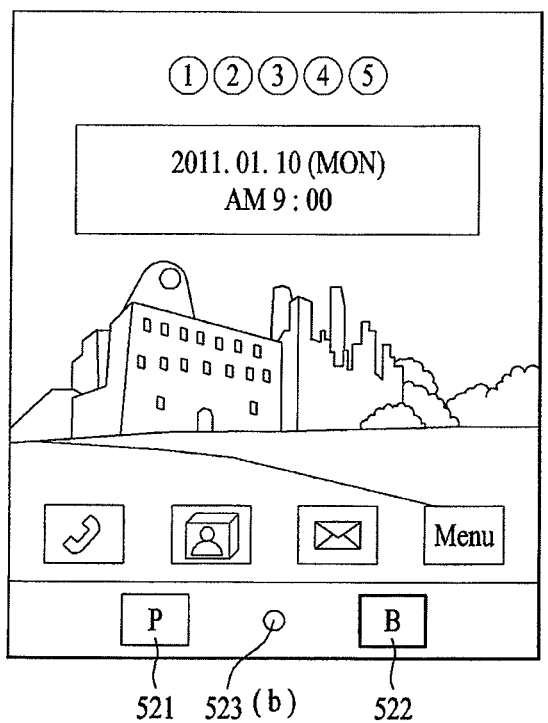

Referring to FIG. 5C, a private mode zone 521, a business mode zone 522 and a switching command zone 523 are provided to the screen of the mobile terminal 100. If the private mode is currently activated, the mobile terminal 100 can discriminatively display the private mode zone (P) 521 (FIG. 5C(a)). If the business mode is currently activated, the mobile terminal 100 can discriminatively display the business mode zone (B) 522 (FIG. 5C(b)).

Figure 5D:
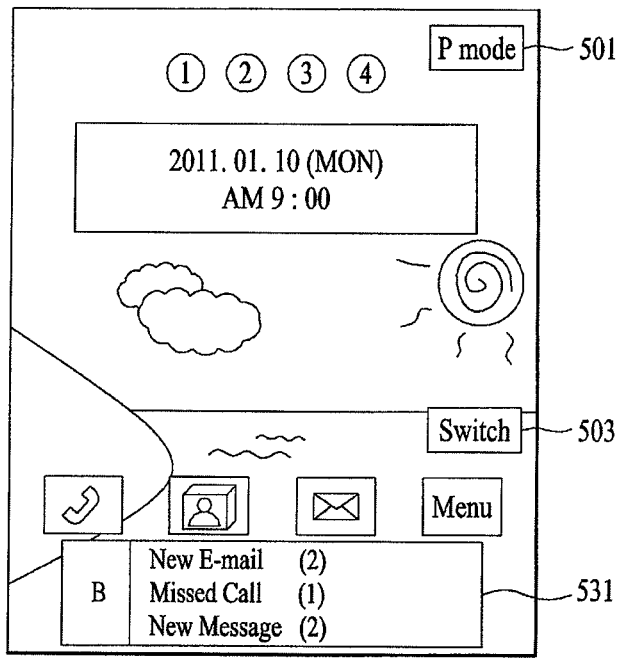
Figure 5D:
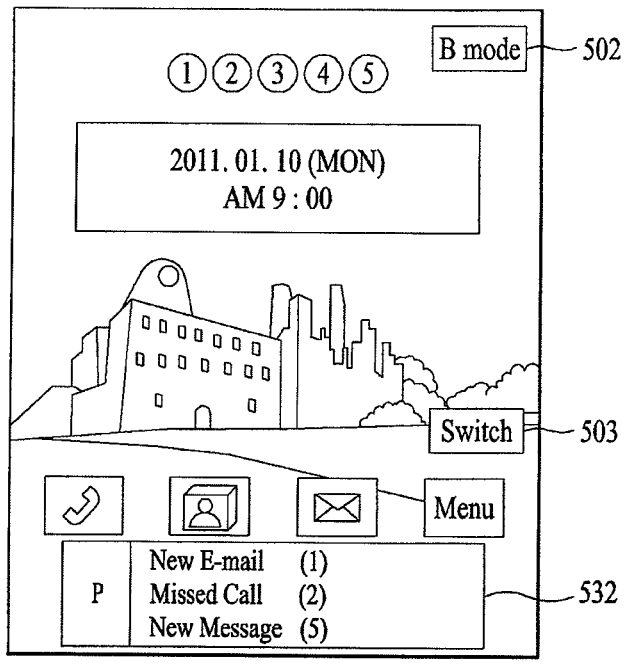

Referring to FIG. 5D, if the private mode is currently activated, the mobile terminal 100 can display an announcement window 531 for announcing events (e.g., email, message, call, etc.) occurring in association with the business mode or the number of the events (or, occurrence time, counterpart information, etc.) on a prescribed region of the screen (FIG. 5D(a)). If the business mode is currently activated, the mobile terminal 100 can display an announcement window 532 for announcing events (e.g., email, message, call, etc.) occurring in association with the private mode or the number of the events (or, occurrence time, counterpart information, etc.) on a prescribed region of the screen (FIG. 5D(b)).

The following description describes discriminating a plurality of modes using a database storage region according to a second embodiment. First, a plurality of the modes can discriminatively have database storage regions within the memory 160, respectively (FIG. 3C).

Each of a plurality of the modes can utilize the information stored in the corresponding database storage region or the corresponding information stored in the common database storage region only. Moreover, the information on one mode can be set not to be utilized in other modes. Besides, one (e.g., business mode) of a plurality of the modes can utilize information on another mode (e.g., private mode), whereas the latter mode can be set not to use the information on the former mode.

If the information on the first mode can be utilized in the second mode (yet the first mode is unable to utilize the information on the second mode), that means an access restriction has been placed on the second mode or that a higher security level has been set on the second mode. This is explained in detail later with reference to FIGS. 7A to 7B.

Figure 6A:
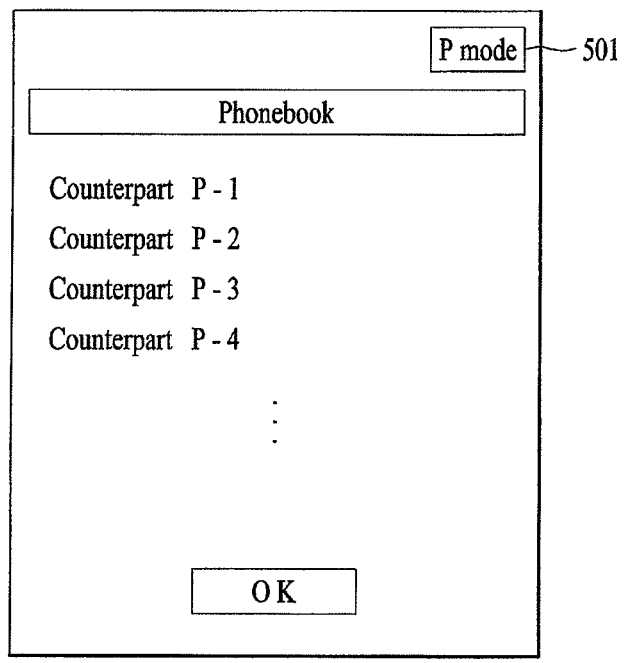

Referring to FIG. 6A, when a phonebook (example of a common application) is being executed in the private mode, the mobile terminal 100 extracts counterpart information corresponding to the private mode from counterpart information associated with the phonebook only and can then display the extracted counterpart information.

Figure 6B:
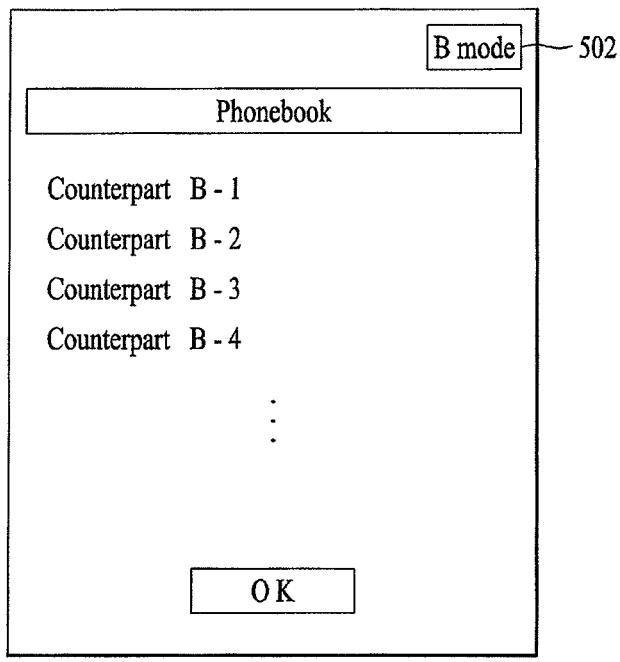
Figure 6B:
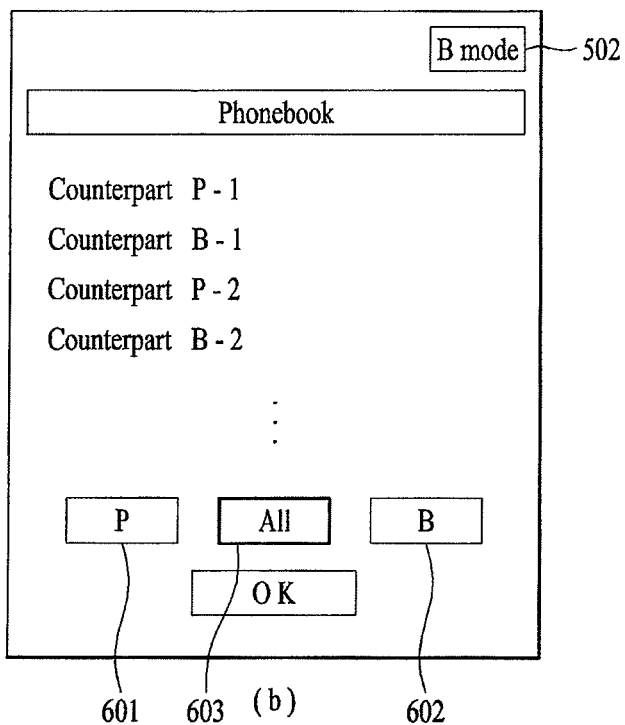

Referring to FIG. 6B, when executing a phonebook in the private mode, the mobile terminal 100 extracts counterpart information corresponding to the business mode from counterpart information associated with the phonebook and then displays the extracted counterpart information (FIG. 6B(a)). Alternatively, the mobile terminal 100 extracts counterpart information corresponding to either the private mode or the business mode and can then display the extracted counterpart information (FIG. 6B(b)).

In particular, FIG. 6B(b) shows a zone (All) 603 as activated. If a privacy zone (P) 601 is activated, the mobile terminal 100 can selectively display the counterpart information corresponding to the private mode only. If a business zone (B) 602 is activated, the mobile terminal 100 can selectively display the counterpart information corresponding to the business mode only.

Figure 7A:
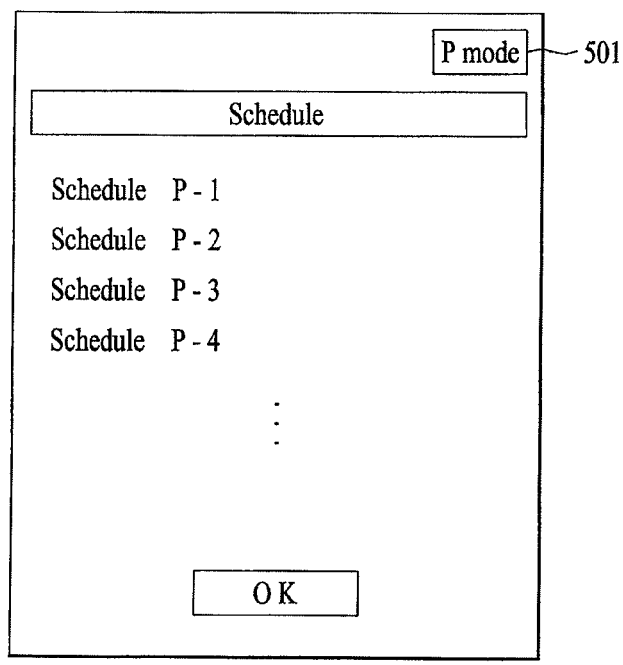

Referring to FIG. 7A, when a schedule management (example of a common application) is being executed in the private mode, the mobile terminal 100 extracts schedules corresponding to the private mode from schedules associated with the schedule management only and can then display the extracted schedules.

Figure 7B:
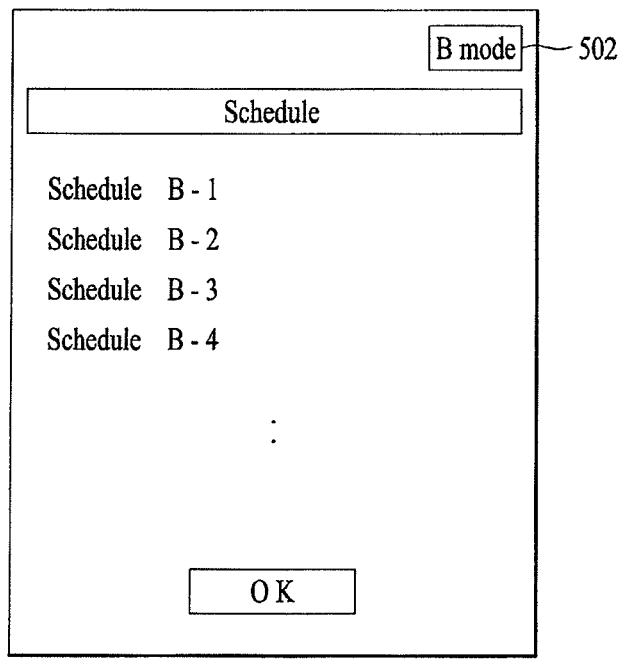
Figure 7B:
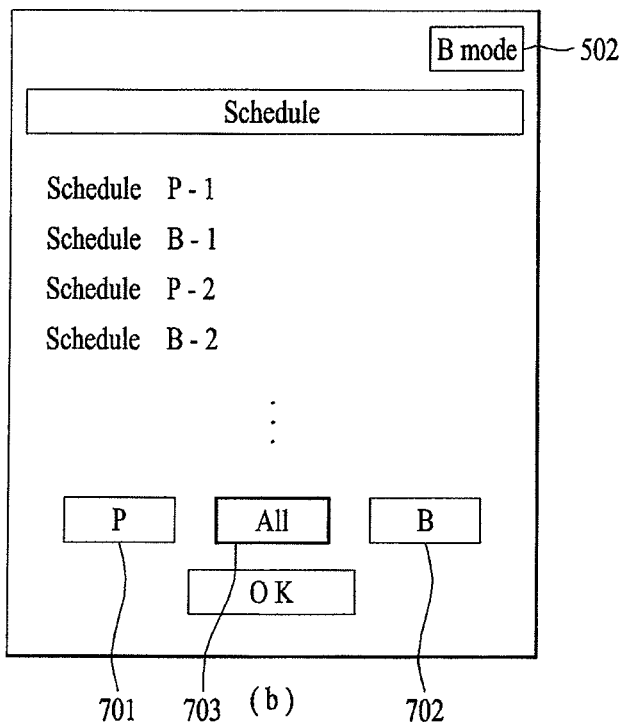

Referring to FIG. 7B, when executing a schedule management in the private mode, the mobile terminal 100 extracts schedules corresponding to the business mode from schedules associated with the schedule management and then displays the extracted schedules (FIG. 7B(a)). Alternatively, the mobile terminal 100 extracts schedules corresponding to either the private mode or the business mode and can then display the extracted schedules (FIG. 7B(b)).

In particular, FIG. 7B(b) shows a zone (All) 703 as activated. If a privacy zone (P) 701 is activated, the mobile terminal 100 can selectively display the schedules corresponding to the private mode only. If a business zone (B) 702 is activated, the mobile terminal 100 can selectively display the schedules corresponding to the business mode only.

Specifically, referring to FIGS. 6A to 7B, although the private mode is unable to access the information on the business mode or the database storage region storing the information on the business mode, the business mode can freely access the information on the private mode or the database storage region storing the information on the private mode.

According to a third embodiment, each of a plurality of modes can be discriminated by a corresponding user access authority.

Regarding each of a plurality of the modes, as a different security level is set, a user access authority can be changed. Regarding each of a plurality of the modes, if an access restriction is put on one mode but an access restriction is not put on the other mode, a user access authority can be changed.

For this, in order to enter a specific one of a plurality of the modes, an authentication procedure can be requested. Hence, the specific mode can be entered only if a valid authentication procedure is performed to enter the specific mode. In particular, if an access restriction or a security level over a predetermined reference is put on the specific mode, an authentication procedure can be requested.

For instance, in a mode having a high user access authority, information corresponding to a mode having a low user access authority or a database storage region of the corresponding information is freely accessed and can be freely utilized. On the contrary, in a mode having a low user access authority, it is unable to access information corresponding to a mode having a high user access authority or a database storage region of the corresponding information.

When entering or switching to a mode having a high user access authority, an input of a user authentication information is requested. If a valid user authentication information is input, the mobile terminal 100 can enter or switch to the mode having the high user access authority (example of an authentication procedure). When a mode having a low security level is implemented, the mobile terminal 100 is requested to input a user authentication information (e.g., name, social security number, etc.) of a low level. When a mode having a high security level is implemented, the mobile terminal 100 is requested to input a user authentication information (e.g., name, social security number, specific touch pattern, specific password, etc.) of a high level.

Regarding management (e.g., input, inquiry, editing, etc.) of information (e.g., content, data, etc.) on an application in accordance with a user access authority, three kinds of cases are described in detail as follows. For clarity and convenience of the following description, assume that a plurality of modes include a first mode and a second mode.

According to a first embodiment, applications in which contents or data can be input regardless of a mode are possible. For instance, the content or data input application can include such an application for performing a basic function in using a terminal as a schedule management, a scheduler, an email, a message, a messenger, a conference call, a video call, an internet, a phonebook and the like.

According to a second embodiment, like the first embodiment, an information input is possible without mode discrimination. However, a database storage region can be discriminated pre mode (FIG. 3C).

In particular, inter-mode information exchange is impossible but unilateral information exchange is possible. For instance, an information transfer from a private mode to a business mode is possible but an information transfer from a business mode to a private mode is impossible. For another instance, by setting a plurality of modes to different security levels, respectively, an information transfer from a low level to a high level is possible but an information transfer from a high level to a low level is impossible.

In a specific situation, an external terminal having a predetermined authority in a remote place deletes information (e.g., application, content, data, etc.) on a specific mode only or can shut down the specific mode itself. For instance, the specific situation can include one of an employee taking out a terminal without authorization, a terminal being stolen, an unregistered storage medium being loaded into a terminal, a terminal accessing an unsubscribed network, and the like.

Furthermore, regarding a user access authority, an authority for accessing an application, a content, a data or the like, which is available for a business mode, can be differentiated in accordance with a user level (e.g., a rank in company, a duty attribute in company, a department in company, etc.) of the mobile terminal 100. In addition, a function for a specific application can be differentiated. For instance, when a user level (e.g., a group head) is equal to or higher than a predetermined reference, an approval grant function is usable. Yet, when a user level (e.g., a company employee) is lower than a predetermined reference, an approval grant function is deactivated. Moreover, the same application can have a usable content/data that differs in accordance with a user level or the same content/data can have a different range of the provided information in accordance with a user level (e.g., a different data field can be configured in accordance with a user level). Besides, in accordance with a user's authority, an icon associated with a job failing to belong to the corresponding authority is not displayed on a terminal itself. Even if the icon is displayed on the terminal, it can be set not to be executed.

According to a third embodiment, applications (e.g., dedicated applications) accessible to corresponding information as well as operable in either a first mode or a second mode are possible. For instance, for security matters in a business mode, a photographing function is restricted, a conditional access to a network is granted, or a print function is blocked. When the business mode is implemented, a business related application is provided. Whereas in the private mode, the business related application may not be provided. When the private mode is implemented, a privacy-related application is provided. Whereas in the business mode, the privacy-related application may not be provided.

Meanwhile, a content or application specialized in a unilateral mode only is possible. For instance, the application specialized for the business mode can include a company business related application. In addition, the company business related application can perform a function of an upload to a company server, a function of a download to the company server and the like.

In addition, an access restriction (or entry) per mode can be set in accordance with a place or time. For instance, a business mode can be set not to be entered at home. In another instance, a private mode can be set not to be entered within a specific time zone. Occasionally, a separately authorized person can enter the business mode at home or the private mode at the office within a specific time zone. Moreover, because an interface is provided to be shared with users in the business mode, information can be shared with the users. If the business mode is switched to the private mode, the interface provided for the information sharing can be shut down.

Furthermore, one hardware module (e.g., a common module) usable for a plurality of modes in common or another hardware module (e.g., a dedicated module) usable for a specific one of a plurality of the modes is possible. Hence, if a first mode is currently activated, a common module and a dedicated mode of the first mode are activated, while a dedicated module of a second module is not activated. In this instance, the common module and the dedicated module are designated in accordance with a user selection or can be designated by a decision made by the controller 180 or the company server 300.

For instance, assuming that a first mode and a second mode are a private mode and a business mode, respectively, a common module can include one of the mobile communication module 112 for call and message transmission and reception, the power supply unit 190, the display unit 151, the memory 160 and the like. A dedicated module of the private mode can include one of the camera 121, the position location module 115 and the like. In addition, a dedicated module of the business mode can include the projector module 155 or the like. The above examples of the communication module and the dedicated module are just exemplary, by which the communication module and the dedicated module are non-limited. In addition, the communication module and the dedicated module can be configured in other various ways.

In the following description, a user access authority is explained in detail with reference to FIGS. 8A and 8B. For clarity and convenience of the following description, assume that the same content is accessed.

Figure 8A:
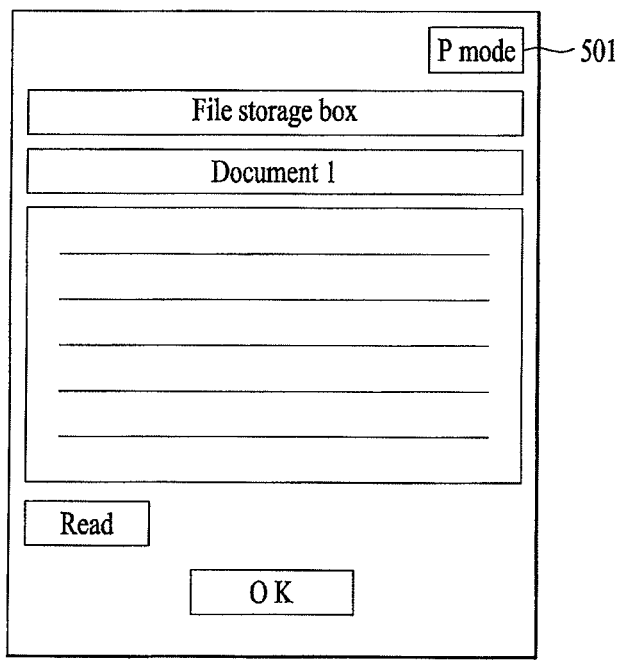
Figure 8A:
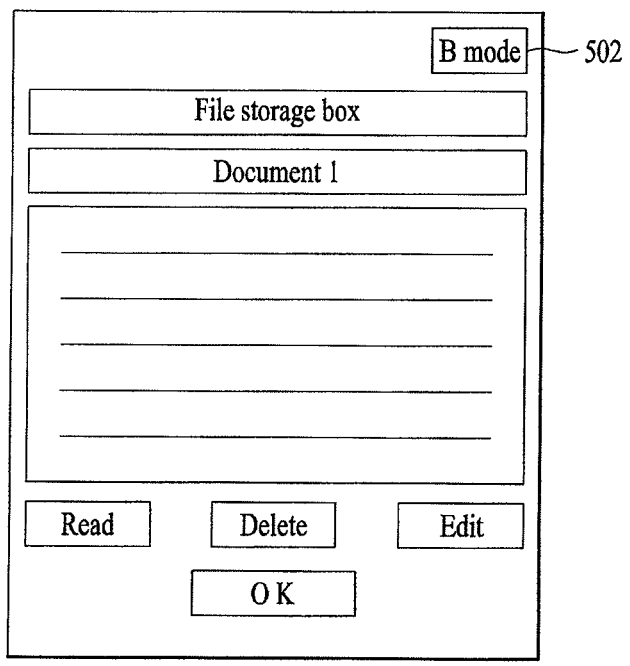

Referring to FIG. 8A, when a document 1 (example of content) is accessed in a private mode, the mobile terminal 100 can grant 'read authority' for the document 1 (FIG. 8A(a)). When a document 1 is accessed in a business, the mobile terminal 100 can grant 'read authority, delete authority, edit authority' for the document 1 (FIG. 8A(b)). Moreover, if a user is authorized over a predetermined level in a company, an approval authority can be granted to the user for the document 1 that requires approval or authorization.

Figure 8B:
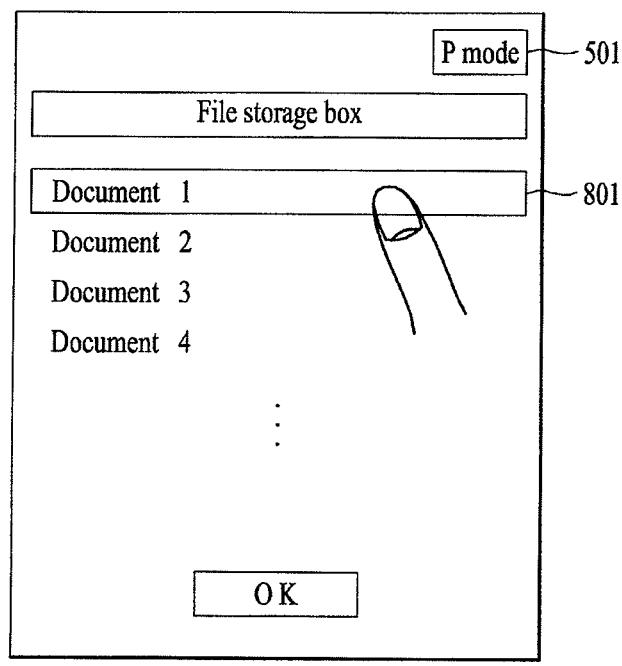
Figure 8B:
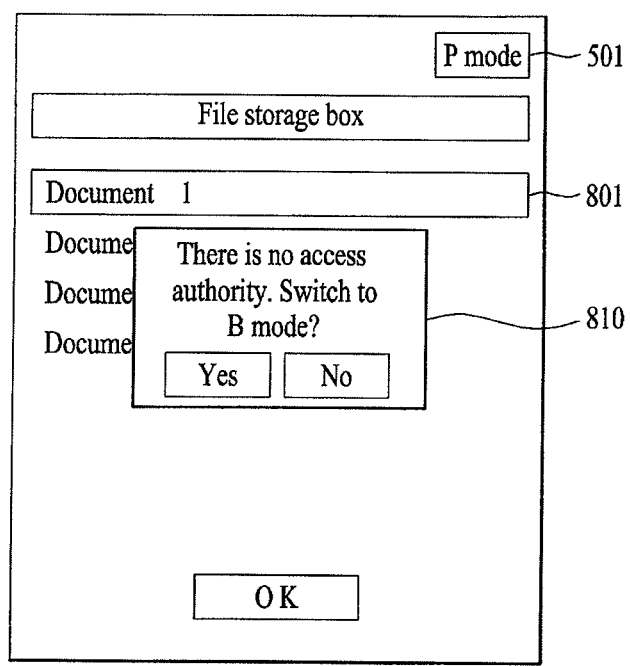

Referring to FIG. 8B, when a file 1 (example of content) corresponding to a business mode is selected from a file list in a private mode (FIG. 8B(a)), the mobile terminal 100 informs a user that there is no access authority on the file 1 and enables the user to select whether to switch the private mode to the business mode to check the file 1 (FIG. 8B(b)).

When implementing the private mode in FIG. 8B, a file corresponding to the business mode may not be included in the file list. In addition, an indicator indicating whether the file corresponds to the privacy or business mode can be displayed on the file list. Although the user access authority is set per mode in the above description, it can be set per application, content or data if desired. Therefore, a user authorized with the user access authority can check the same content, whereas an unauthorized user is unable to check the same content.

According to a fourth embodiment, each of a plurality of modes can be discriminated in accordance with at least one of an application configuration, a content configuration and a data configuration. Each of a plurality of the modes can configure an application differently per mode. Even if an application is a common application, each of a plurality of the modes can configure a content or data corresponding to the application differently.

Figure 10A:
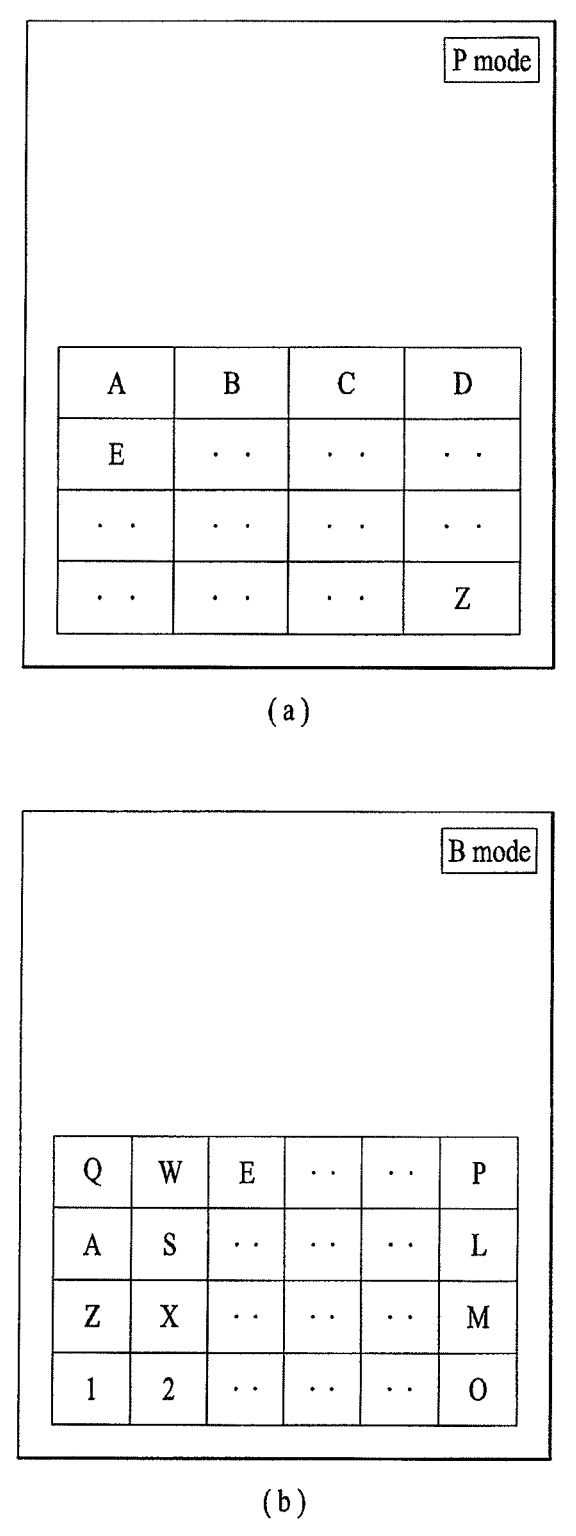
Figure 10B:
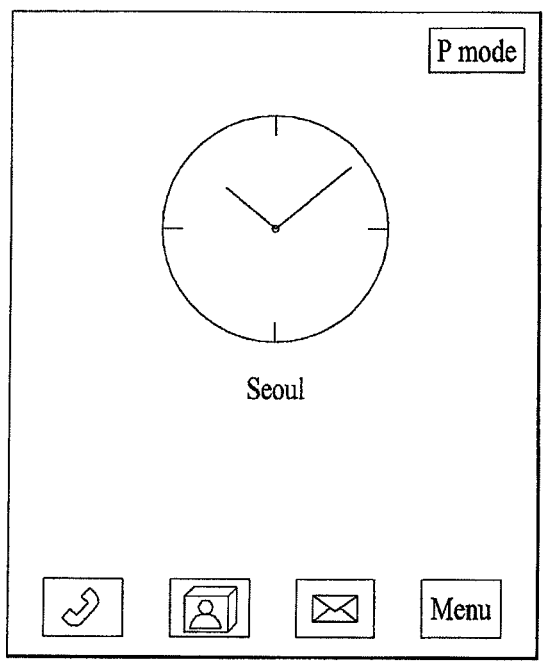
Figure 10B:
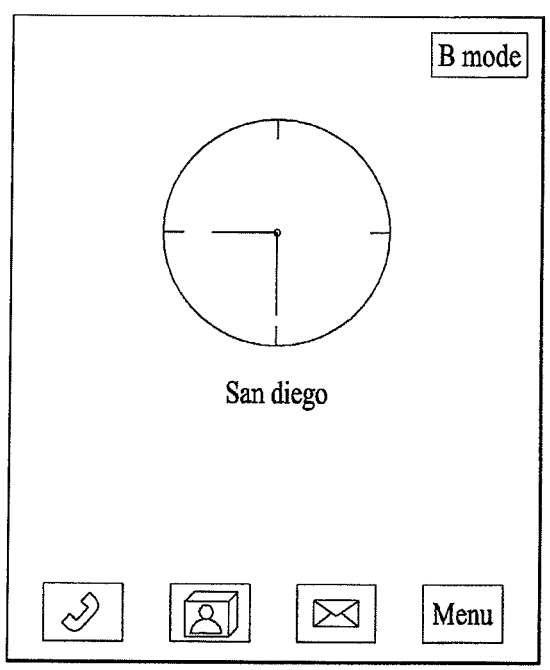
Figure 10C:
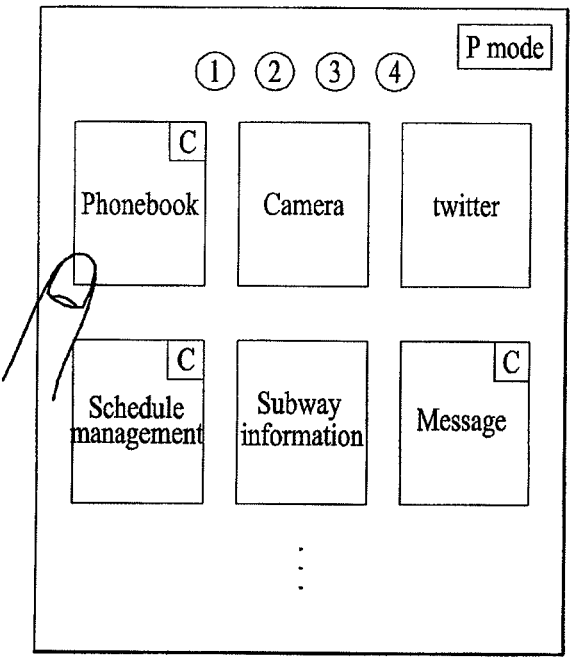
Figure 10C:
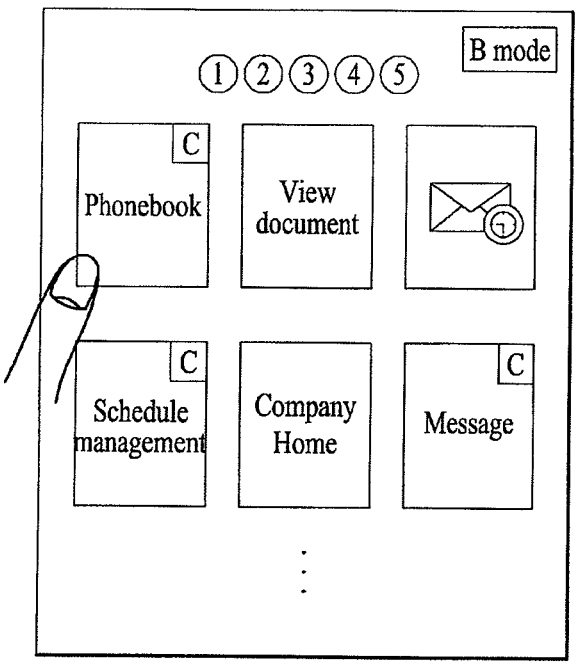

In this instance, the configuration of the application being different means that at least one application (hereinafter named a first dedicated application) dedicated to a first mode and at least one application (hereinafter named a common application) in common with the first mode and a second mode are executed in the first mode or that at least one application (hereinafter named a second dedicated application) dedicated to the second mode and at least one application (hereinafter named a common application) in common with the first mode and the second mode are executed in the second mode (FIG. 10C).

The configuration of the content/data being different can include both a substance of the content/data being different and a substance of the content/data being different in part. Specifically, the latter case can mean that a substance of a specific content corresponding to each of the first mode and the second mode is different even if the specific content is designated to both of the first mode and the second mode. This is enabled by configuring a data field differently per mode for the same content or data.

Figure 9A:
Figure 9A:

This is explained in detail with reference to FIGS. 9A and 9B as follows. Referring to FIG. 9A, in storing the same counterpart information, the mobile terminal 100 designates different contacts 911 and 921 and different emails 912 and 922 to a private mode and a business mode, respectively, further designates a blog address 913 and a birthday information 914 to the private mode, and further designates an approval authority 923, a rank 924 and a department 925 to the private mode.

Referring to FIG. 9B, in storing the same schedule, even if a content and participant information 931 and a content and participant information 941 are identically designated to a private mode and a business mode, respectively, the mobile terminal 100 can further designate a time information 932 to the private mode and is also able to further designate a conference room information 942 and a notification 943 to the business mode.

The mobile terminal 100 can set a keypad type differently per mode (FIG. 10A) or can set a time zone differently per mode (FIG. 10B). The mobile terminal 100 can set a different application and a different backup level of information associated with the application per mode. For instance, the mobile terminal 100 backs up information of a recent week in the private mode and can back up information of a recent month or real-time information in the business mode. The backup level per mode is set by a user or can be randomly set by the controller 180.

In particular, in the business mode, if a counterpart terminal is not in the business mode or a working hour (or a holiday) currently in consideration of a status (e.g., a currently activated mode, a current location, a time zone, etc.) of the counterpart terminal, with which the mobile terminal 100 currently attempts to contact, the mobile terminal 100 informs a user of the unavailability of the counterpart terminal to enable the user to select whether to make a contact. In doing so, the mobile terminal 100 can receive information indicating the status of the counterpart terminal from the counterpart terminal or a company server and can then obtain the status of the counterpart terminal using the received information.

In the business mode, all previously stored schedules can be modified to a currently belonging time zone by reflecting a current time zone (when a time zone is changed).

When there is no user input action made for a predetermined period of time in the business mode, the business mode can be locked or shut down automatically or in accordance with a user selection. In this instance, in order to unlock the locked state or cancel the shutdown, a user authentication information corresponding to the business mode is input or an authentication should be granted by the company server. Moreover, in the business mode, when an overseas roaming function is loaded on a user terminal, if a current location of a user is domestic, the overseas roaming function is automatically deactivated. If a current location of a user is overseas, the overseas roaming function can be automatically activated.

According to a fifth embodiment, when at least one common application is executed, each of a plurality of modes can vary its feature to correspond to a currently activated mode. In other words, when a specific application is a common application of a first mode and a second mode, the feature of the specific application can vary in accordance with whether the currently activated mode is the first mode or the second mode.

In this instance, a feature varying per mode means that a configuration (e.g., a corresponding content/data configuration included), display or security of an application is varied. For instance, a feature varying per mode means that a structure (e.g., configuration of a corresponding menu item) of an application, an executed screen (e.g., background image, letter type, letter size, provided information, etc.) of an application, a configuration of content/data associated with an application (FIG. 9A, FIG. 9B), an application function, a security of an application (content, data, etc.) or the like is different per mode. As the examples of the application features are just exemplary, any situation in which a common application is configured to be different per mode is applicable to the present embodiment.

For instance, when the application function is different, a photographing function is allowed to a camera in a private mode but may not be allowed in a business mode. In another instance, when an authority of access to an application is different, a phonebook provides a counterpart name, a phone number and a personal email address in a private mode and can further provide a company email address, a rank, a department and an approval authority information in a business mode.

This is explained in detail with to FIG. 10C as follows. Referring to FIG. 10C, the mobile terminal 100 can receive an input of an execution command signal for executing a phonebook (i.e., an example of a common application) from a user.

The mobile terminal 100 determines a mode activated at the input timing point of the execution command signal. If a private mode is currently activated, the mobile terminal 100 executes the phonebook in accordance with a feature corresponding to the private mode and then displays an executed screen of the phonebook (FIG. 6A or FIG. 9A(a)). On the contrary, if a business mode is activated, the mobile terminal 100 executes the phonebook in accordance with a feature corresponding to the business mode and then displays an executed screen of the phonebook (FIG. 6B or 9A(b)).

For instance, a situation in which a security of an application is different is explained as follows. First, when attempting to execute a common application in a first mode, either an authentication procedure is not requested or a low-level security set authentication information can be input. Yet, when attempting to execute a common application in a second mode, an authentication procedure is requested or a high-level security set authentication information should be input. In doing so, the application execution can include an output of content or data associated with the application as well as an executed screen display of the application.

According to a sixth embodiment, a plurality of modes can be discriminated from each other using user information corresponding to the modes, respectively. In this instance, the user information can include a user name (or title), a user image, a user phone number, a user email address, a user blog address and the like.

For instance, first and second user information different from each other can be set for first and second modes, respectively. In particular, when a first phone number and a second phone number (e.g., dual SIM) are assigned to the mobile terminal 100, the first phone number and the second phone number can be set for the first mode and the second mode, respectively.

In the above description, the definitions of the modes mentioned in the disclosure are explained. In addition, when a plurality of modes exist, the method of discriminating a plurality of the modes is explained as well. According to a seventh embodiment, each of a plurality of modes can be discriminated by an application group including at least one application executed in the corresponding mode.

For instance, when at least one application is executable in each of a plurality of modes, the controller 180 can configure an application group including executable application(s) per mode. Moreover, the application group can be configured in accordance with an application type as well as the corresponding mode. For example, if an application type is a call, call related applications are included in the corresponding application group. If an application type is a camera, camera related applications can be included in the corresponding application group.

Moreover, the mobile terminal 100 displays a per-mode group identifier corresponding to a per-mode application group on the screen. If a specific group identifier is selected, the mobile terminal 100 can display indicators of applications belonging to the corresponding application group or can switch a current mode to a mode corresponding to the specific group identifier (assuming that it is not a currently activated mode).

A method of controlling modes in a mobile terminal 100 according to an embodiment of the present invention will now be explained in detail with reference to the accompanying drawings. For clarity and convenience of the following description, the display unit 151 includes a touchscreen and the same reference number of the display unit 151 is given to the touchscreen.

According to an embodiment of the present invention, when implementing a plurality of modes, the mobile terminal 100 displays information on corresponding modes on a plurality of display regions corresponding to a plurality of the modes, respectively. If a touch and drag action from a prescribed display region to a different display region is received, the mobile terminal 100 determines whether the information corresponding to the prescribed region is supported in a mode corresponding to the different display region. In accordance with a result of the determination, the mobile terminal 100 can generate the information corresponding to the prescribed display region from the different region.

Figure 11:
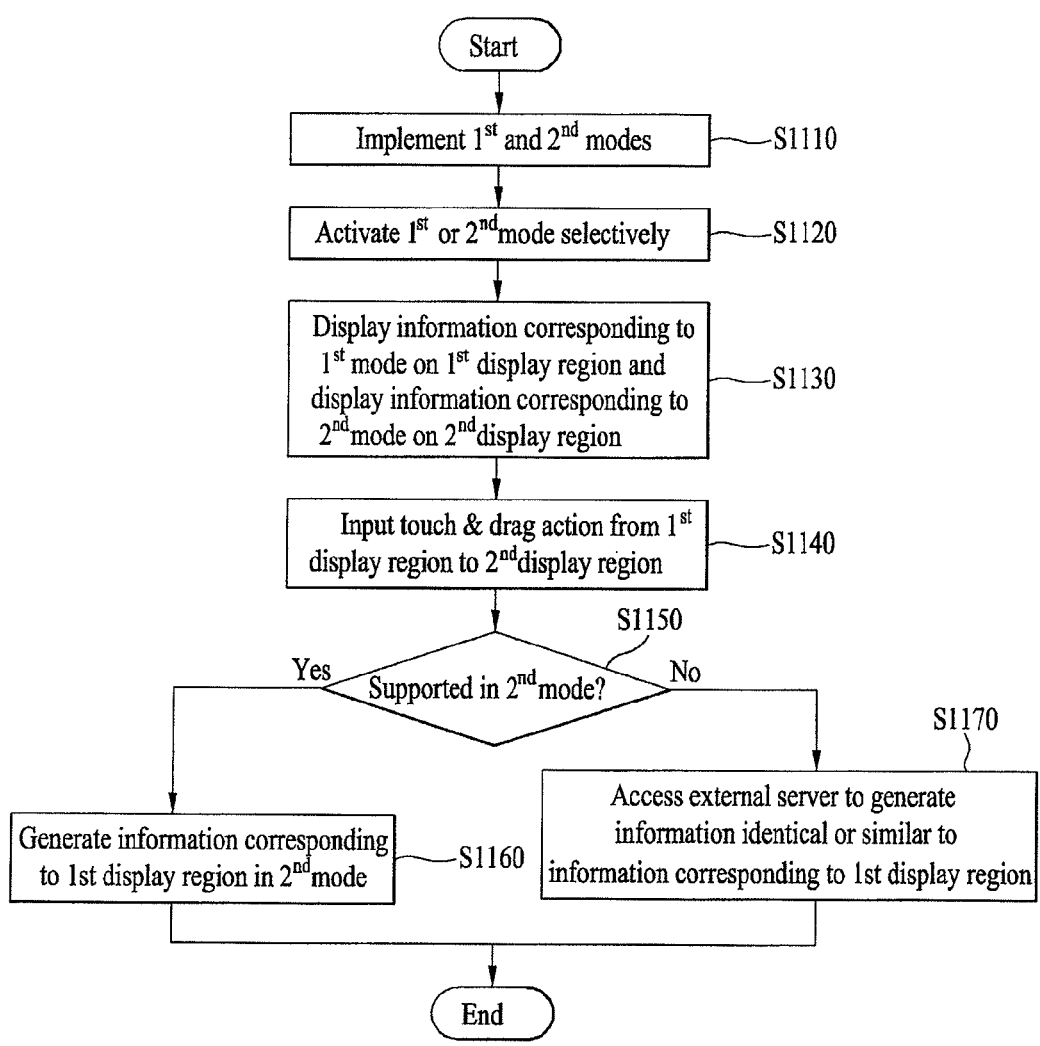
FIG. 11 is a flowchart illustrating a method of controlling a mobile terminal according to one embodiment of the present invention.

Next, FIG. 11 is a flowchart illustrating a method of controlling modes in a mobile terminal according to one embodiment of the present invention. Referring to FIG. 11, the controller 180 implements a first mode and a second mode (S1110) and then selectively activates the implemented first or second mode (S1120). In particular, while both of the first and second modes are implemented, the controller 180 can activate either the first mode or the second mode.

In the implementing step S1110, if an operating system is designated per mode, the controller 180 can implement the first mode using a first individual operating system (i.e., a first OS in multiple operating systems) corresponding to the first mode or the second mode using a second individual operating system (i.e., a second OS in the multiple operating systems) corresponding to the second mode. When the operating system per mode is in common, the controller 180 can implement each of the first and second modes using a common operating system (i.e., a single OS).

In the activating step S1120, when a first application and a second application are executed in the first mode and the second mode, respectively, the controller 180 executes the first application in accordance with a feature corresponding to the first mode and executes the second application in accordance with a feature corresponding to the second mode. In this instance, each of the first and second applications can include an application (hereinafter named a common application) executable in each of the first and second modes in common or an application (hereinafter named a first or second dedicated application) executable by being dedicated to either the first mode or the second mode.

For instance, assuming that a phonebook application, which is a common application, is executed in a private mode (i.e., example of a first mode) and a business mode (i.e., example of a second mode), the mobile terminal 100 can (1) display a counterpart information list including counterpart information related to the private mode or specific counterpart information including a data field corresponding to the private mode in accordance with a feature corresponding to the private mode; and (2) display a counterpart information list including counterpart information related to the business mode or specific counterpart information including a data field corresponding to the business mode in accordance with a feature corresponding to the business mode.

In the following description, a mode activated on OS booting per multi-OS type (FIGS. 4A to 4C) is explained in detail. For instance, the multi-OS types can include a first multi-OS type (including Guest OS 1 and Guest OS 2, corresponding to a first scheme) and a second multi-OS type (including Host OS and Guest OS, corresponding to a second scheme). In addition, a private mode corresponds to Guest OS 1 and Host OS, and a business mode corresponds to Guest OS 2 and Guest OS.

First, according to the first multi-OS type, as a hypervisor included in the controller 180 is driven, the mobile terminal 100 can boot Guest OS 1 and Guest OS 2 simultaneously or sequentially. If a specific mode is selected from the private mode and the business mode by a user (or the controller 180), the controller 180 can activate the selected specific mode on Guest OS corresponding to the selected specific mode. Meanwhile, if the specific mode selecting step is omitted, the controller 180 can activate the private mode using Guest OS 1 designated as default.

According to the second multi-OS type, the controller 180 preferentially boots the Host OS corresponding to the private mode and can then preload the Guest OS corresponding to the business mode. The controller 180 activates the private mode on the Host OS. When the pre-loaded Guest OS is booted, the controller 180 can activate the business mode on the Guest OS. Meanwhile, the controller 180 can post-load the Guest OS.

In doing so, when pre-loading the Guest OS, an initial OS booting takes a considerable time. However, because two operating systems are already booted after completion of the booting process, a mode switching operation can be quickly performed. When post-loading the Guest OS, an initial OS booting is quickly performed. However, when switching a current mode to a mode corresponding to the Guest OS, the mode switching process may take a considerable amount of time due to the time consumption attributed to the Guest OS booting.

Referring again to FIG. 11, in the activating step S1110, the controller 180 can activate either the first mode or the second mode in accordance with a user selection or a prescribed reference for an operating system booting. For instance, for the single OS, any one of the first and second modes can be activated in accordance with the single OS booting process. In another instance, for the multi-OS, a mode selected by a user from the first mode and the second mode or a completed firstly booted of the first mode and the second mode is activated in accordance with the simultaneous booting of the multi-OS or a mode corresponding to the preferentially booted OS in accordance with the sequential booting of the multi-OS can be activated.

In particular, for the sequential booting of the multi-OS, the controller 180 can preferentially boot the OS, which meets a prescribed condition. For instance, the controller 180 can preferentially boot the OS that meets one of the conditions such as an OS having a preferential booting order, an OS designated by a user to be preferentially booted and an OS supporting a mode corresponding to a current terminal status. In particular, if a current terminal location corresponds to a specific place corresponding to a specific mode or a current hour belongs to a specific time corresponding to a specific mode, the controller 180 can preferentially boot the OS for operating the specific mode. Moreover, the controller 180 can preferentially activate the mode corresponding to the preferentially booted OS.

In the activating step S1120, while information on the first mode and information on the second mode are displayed on the first display region corresponding to the first mode and the second display region corresponding to the second mode, respectively, the controller 180 can selectively activate either the first mode corresponding to the first information or the second mode corresponding to the second information.

In the activating step S1120, the controller 180 (1) activates a mode corresponding to a display region that has received an input of a touch action from a user, (2) activates a mode corresponding to a currently occurring event (e.g., call reception, message reception, etc.), (3) activates a mode in which a prescribed information is changed (e.g., added, deleted, edited, etc.), (4) activates a mode corresponding to either the first display region or the second display region if having a size greater than that of the other, or (5) activates a mode corresponding to a main display region selected from the first display region and the second display region. The controller 180 can also activate a mode for receiving an input of an activation command from a user or can activate a mode set as default to be activated when implementing a plurality of modes.

Moreover, when receiving an input of a touch action on the second display region in the first mode activated status (and vice versa), the controller 180 deactivates the first mode, and activates the second mode by switching the first mode to the second mode. In particular, the controller 180 determines whether a conditional access is set on the second mode. If the conditional access is set on the second mode, the controller 180 can switch the first mode to the second mode only if an authentication procedure is validly performed.

For instance, if the first mode and the second mode are set to a private mode and a business mode, respectively, the conditional access can be set. Thereafter, if the authentication procedure for the switching to the second mode is successfully performed, the authentication procedure can be skipped when performing a re-switching (or re-entry) to the second mode in the future. For instance, for re-switching for a predetermined period of time (e.g., duty hours, a day, a week, etc.), re-switching between a terminal-on and a terminal-off or the like, the authentication procedure can be skipped.

The controller 180 then displays the information corresponding to the first mode on the first display region corresponding to the first mode and also displays the information corresponding to the second mode on the second display region corresponding to the second mode (S1130). In this instance, the displaying step S1130 can be performed using the touchscreen 151.

Further, the first and second display regions are provided to the same page or can be provided to different pages, respectively. In particular, a prescribed mode can include a plurality of pages (or screens), different information can be displayed on each of a plurality of the pages, and a page number, a content per page, a background image per page, a configuration per page, a presence or non-presence of deletion and the like can vary in accordance with a user selection or a decision made by the controller 180. For instance, assuming that the first mode includes first to fourth pages, first to third application indicators and a first widget are displayed on the first page, fourth to tenth application indicators are displayed on the second page, second to fourth widgets are displayed on the third page and first to fourth images are displayed on the fourth page.

The first display region and the second display region can also be identifiably displayed. Moreover, either the first display region or the second display regions, which corresponds to a currently activated mode, can be identifiably displayed. For instance, the display regions can be identifiably displayed using identification information (e.g., name, icon, symbol, number, etc.) of a corresponding mode. In another instance, the display regions can be identifiably displayed using a color, size, shape, font and/or the like of displayed information. In still another instance, the display regions can be identifiably displayed using a background image, background color, size, position and/or the like of a corresponding display region.

Information corresponding to a mode is the information displayed on a mode screen and includes indicator(s) or widget(s) of application(s) executable in the mode, executed status information of an application executed in a current mode, information displayed a prescribed one of a plurality of pages configuring the mode, and content/data displayed in accordance with an application execution.

Figure 12A:
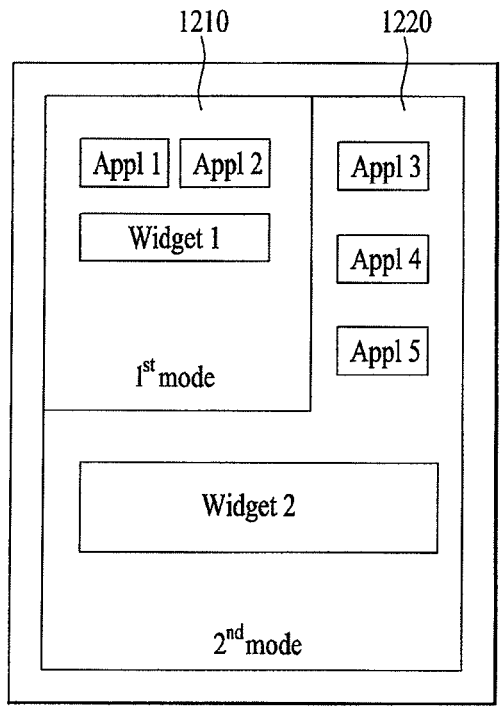
FIGS. 12A to 12C are first display screens designating a display region per mode according to an embodiment of the present invention.
Figure 12B:
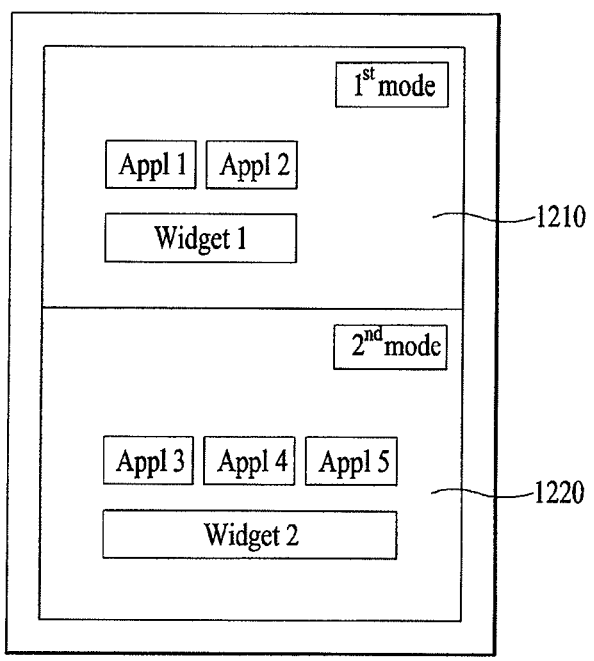
Figure 12C:
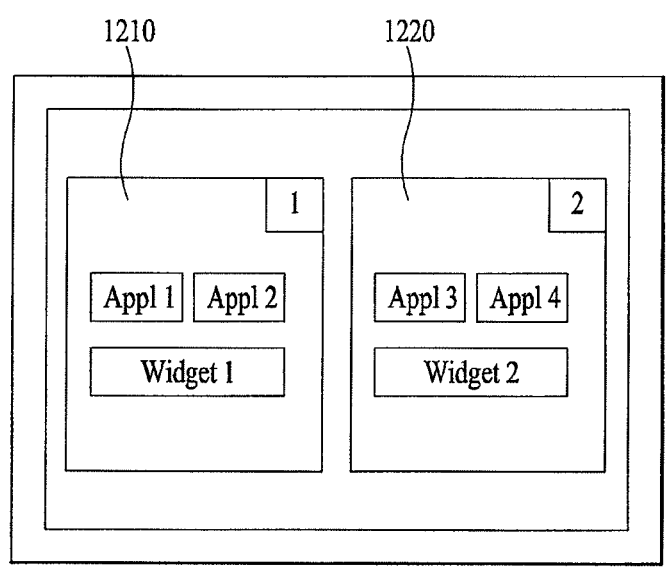

The displaying step S1130 is described in detail with reference to the accompanying drawings as follows. FIGS. 12A to 12C are first display screens designating a display region per mode according to an embodiment of the present invention. In particular, FIGS. 12A to 12C illustrate both first and second display regions being displayed on a page.

Referring to FIG. 12A, the controller 180 allocates a portion of a whole display region to a first region 1210 and the rest of the display region to a second region 1220. Referring to FIG. 12B, the controller 180 partitions a whole display region into two regions including a first partitioned region and a second partitioned region. The controller 180 can then allocate the first region 1210 and the second region 1220 to the first partitioned region and the second partitioned region, respectively.

Referring to FIG. 12C, the display region includes a popup window. In addition, the controller 180 can allocate the first region 1210 and the second region 1220 to a first popup window and a second popup window, respectively.

Figure 13A:
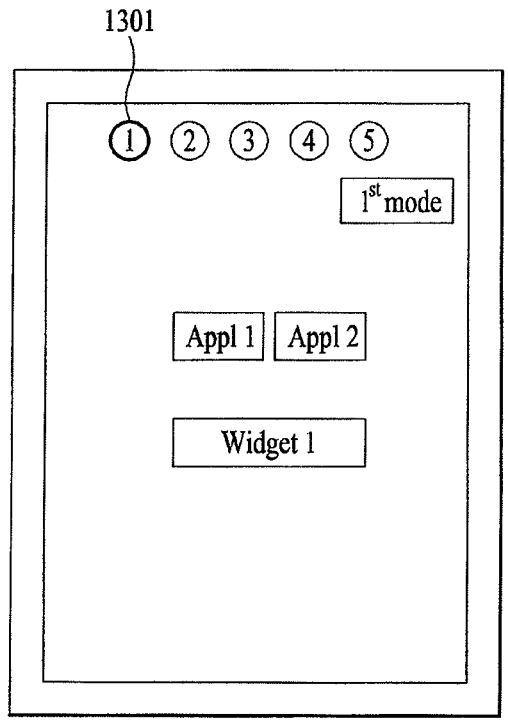
FIGS. 13A and 13B are second display screens designated a display region per mode according to an embodiment of the present invention.
Figure 13A:
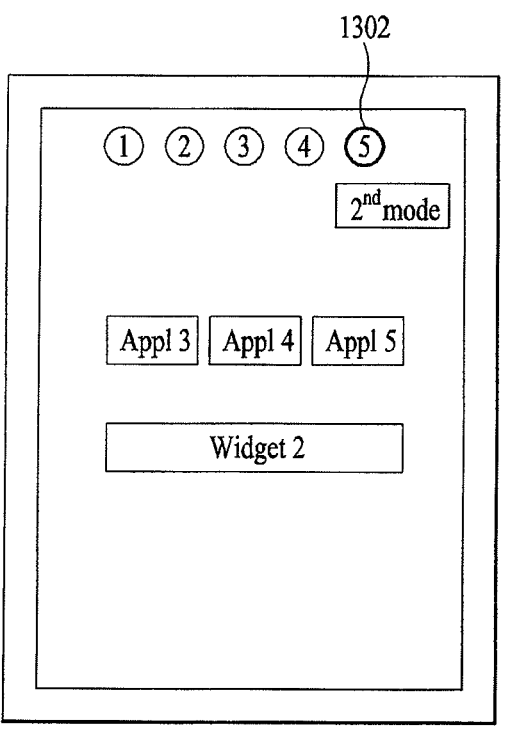
Figure 13B:
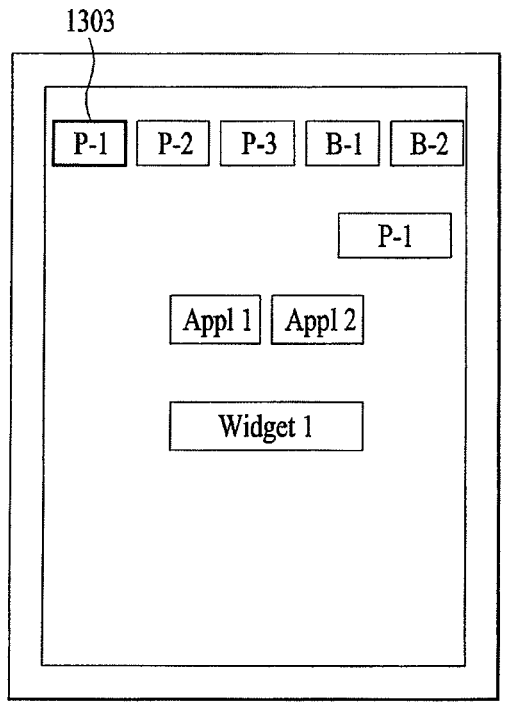
Figure 13B:
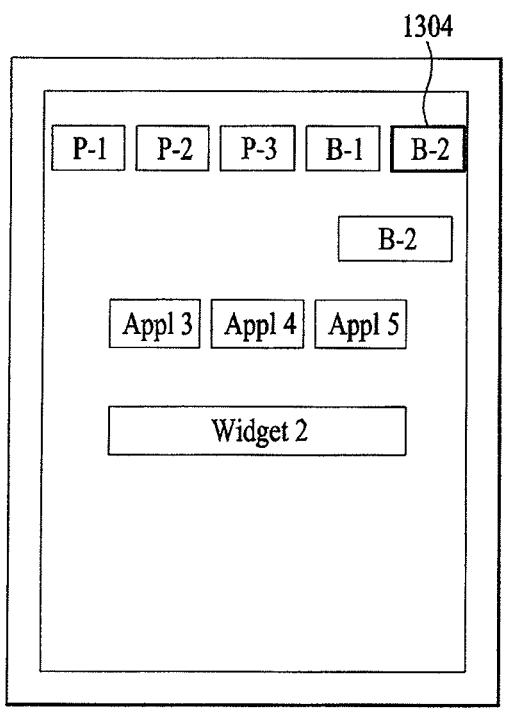

Next, FIGS. 13A and 13B are second display screens designating a display region per mode according to an embodiment of the present invention. In particular, FIGS. 13A and 13B show displaying a first display region and a second display region on different pages, respectively.

Referring to FIG. 13A, the controller 180 allocates a first display region to a first page (a first page identifier 1301 corresponding to a first page) (FIG. 13A(a)) and allocates a second display region to a fifth page (a fifth page identifier 1302 corresponding to a fifth page (FIG. 13A(b)).

Referring to FIG. 13B, the controller 180 can allocate a per-mode display region to each of a plurality of pages as shown in FIG. 13A. Specifically, the controller 180 displays identification information (e.g., mode name, mode number, etc.) of a mode corresponding to a corresponding display region on a page identifier, thereby facilitating a user to select a desired display region. For instance, P-1 to P-3 indicate first to third private modes, respectively. In another instance, B-1 and B-2 indicate a first business mode and a second business mode, respectively. Identification information 1303 and 1304 in FIG. 13B illustrates the P-1 and B-2 modes, respectively.

Referring again to FIG. 11, in the displaying step S1130, the controller 180 can adjust at least one of a size, color, position and display scheme of each of the first and second display regions under the control of the controller 180. For instance, the controller 180 can determine a size, color, position or display scheme of each of the first and second display regions based on a user selection. Hence, a user can freely control a display status of each of the first and second display regions.

The controller 180 can determine a size, color, position or display scheme of each of the first and second display regions based on at least one of a use frequency (or activation frequency) of each of the first and second modes, the number of executable applications, a property of a currently executed application and a presence or non-presence of application execution. In particular, the higher the use frequency gets, the size of the corresponding display region increases. The color of the corresponding display region can be changed in accordance with what kind of application is currently executed (if a color per application is designated).

For example, when a currently executed application is a sound-oriented application (i.e., not a matter of display) (e.g., music play application, voice call application, radio application, etc.), a size of a corresponding display region is set equal to or smaller than a predetermined reference (e.g., ¼ of a whole screen size). When a currently executed application is a display-oriented application (e.g., video play application, video call application, TV application, etc.), a size of a corresponding display region is set equal to or greater than a predetermined reference (e.g., ½ of a whole screen size).

The controller 180 can set up a display region generating condition through a menu search/setting. In particular, when displaying a plurality of display regions on a single screen, the controller 180 sets up a layout of a display region or an arrangement format of a plurality of the display regions. Hence, the controller 180 can generate a plurality of display regions in accordance with the set layout or arrangement format of the display regions. Moreover, the controller 180 can set up various conditions including a color, position, size, and background image of the display region and the like through the menu search/setting.

For instance, when a layout of display regions is set up, an arrangement form or position of a plurality of display regions can be set. Moreover, as the arrangement format of the display regions, the arrangement can set one of a main/supplementary format (FIG. 12A), a screen partition format (FIG. 12B), a popup window (or window) format (FIG. 12C), an individual page format (FIGS. 13A and 13B) and the like.

In the following description, a display control of a display region is explained in detail with reference to the accompanying drawings. In particular, FIGS. 14A and 14B are display screens illustrating adjusting a size of a display region according to an embodiment of the present invention.

Figure 14A:
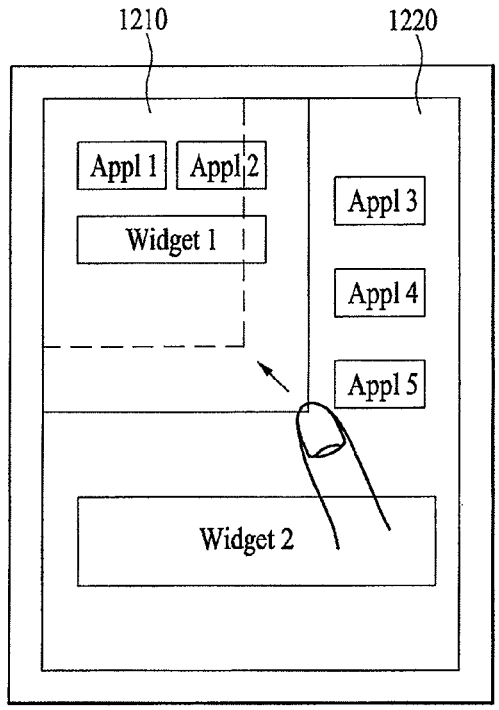
FIGS. 14A and 14B are display screens illustrating adjusting a size of a display region according to an embodiment of the present invention.
Figure 14A:
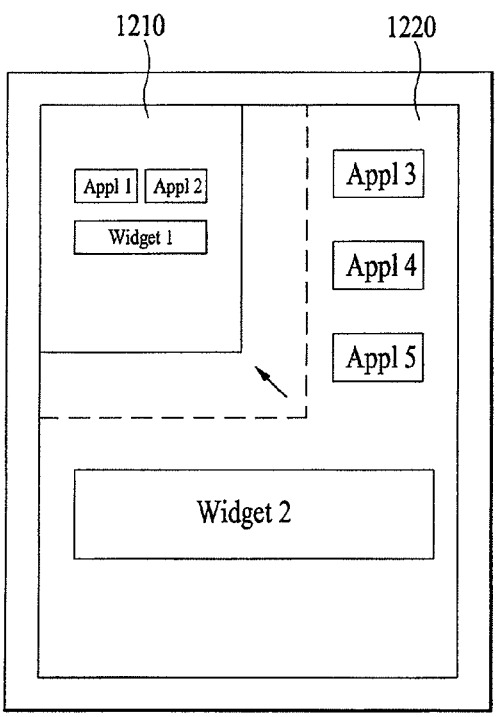

Referring to FIG. 14A, when receiving an input of a touch and drag action on the first display region 1210 in an inward direction (FIG. 14A(a)), the controller 180 reduces the first display region 1210 to correspond to a touch and drag distance or a touch and drag speed and relatively enlarges the second display region 1220 provided to the rest of the whole display region (FIG. 14A(b)).

Figure 14B:
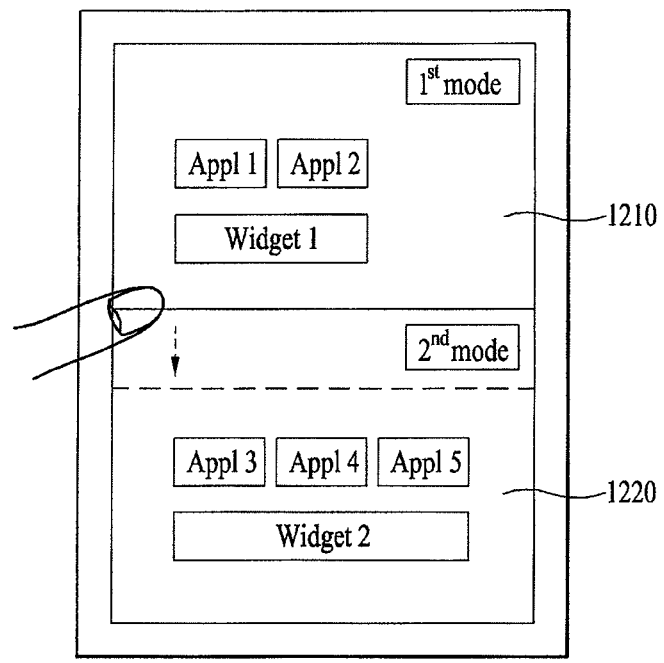
Figure 14B:
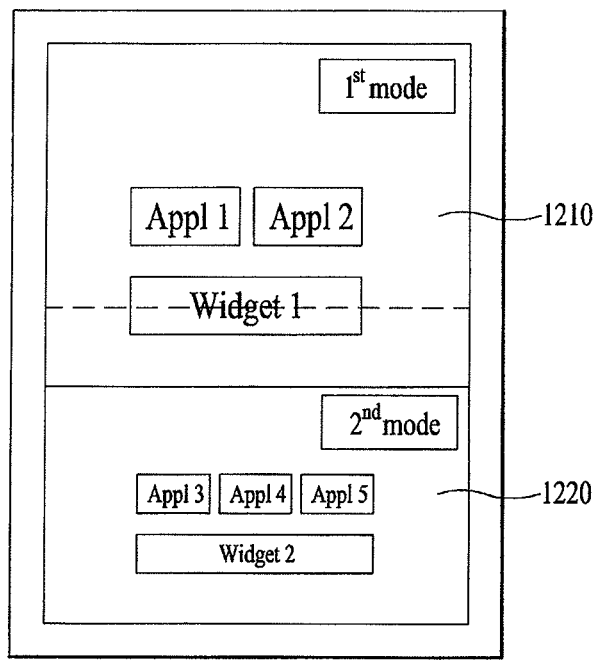

Referring to FIG. 14B, after the first display region 1210 and the second display region 1220 are allocated to a first partitioned region and a second partitioned region, respectively, and when receiving a touch and drag action from a random point of a boundary line between the first and second display regions 1210 and 1220 or a random point within the first display region 1210 to a random point within the second display region 1220 (FIG. 14B(a)), the controller 180 enlarges the first display region 1210 to correspond to a touch and drag distance or a touch and drag speed and reduces the second display region 1220 (FIG. 14B(b)).

Thus, if a corresponding display region is reduced, a size of information displayed thereon can be reduced. Similarly, if a corresponding display region is enlarged, a size of information displayed thereon can be enlarged.

Figure 15A:
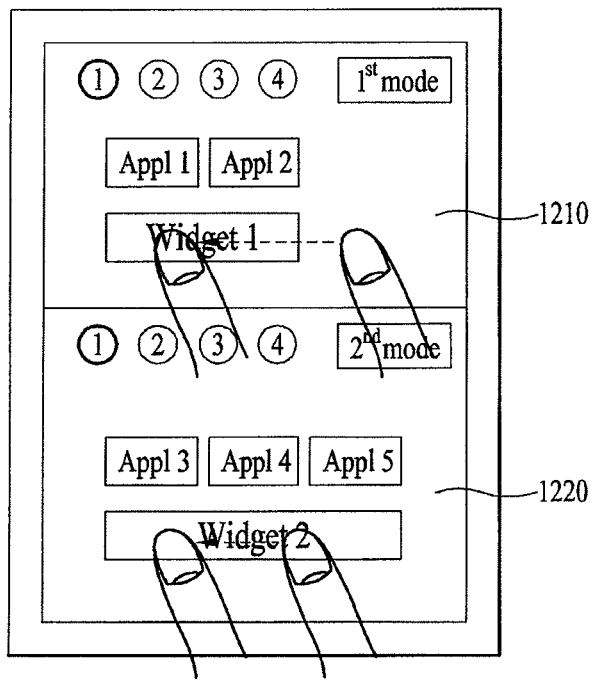
FIGS. 15A to 15C are display screens illustrating a plurality of mode screens on a plurality of display regions, respectively, according to an embodiment of the present invention.
Figure 15B:
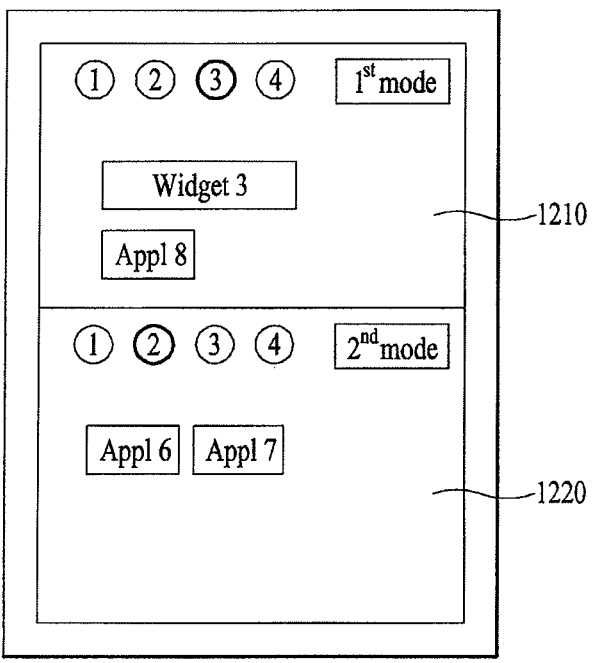
Figure 15C:
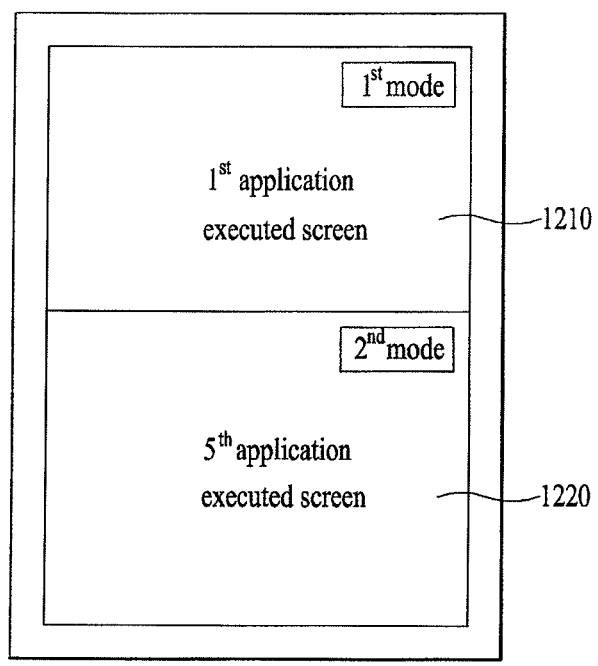

Next, FIGS. 15A to 15C are display screens illustrating displaying a plurality of mode screens on a plurality of display regions, respectively, according to an embodiment of the present invention. In this example, a first display region and a second display region are allocated to a first partitioned region and a second partitioned region, respectively.

Referring to FIG. 15A, the controller 180 displays a first page (including a first application indicator, a second application indicator and a first widget) among a plurality of pages configuring a first mode within the first display region 1210 and displays a first page (including a third application indicator, a fourth application indicator, a fifth application indicator and a second widget) among a plurality of pages configuring a second mode within the second display region 1220.

Referring to FIG. 15B, when receiving an input of a first/second touch and drag action for a page turning action on the first/second regions 1210/1220 in FIG. 15A, the controller 180 can perform a page turning action on the first/second display regions 1210/1220 to correspond to a first/second touch and drag distance or a first/second touch and drag speed.

Referring to FIG. 15C, when receiving a first touch action on the first application indicator displayed on the first display region 1210 and a second touch action on the fifth application indicator displayed on the second display region 1220 in FIG. 15A, the controller 180 displays an executed screen of a first application indicated by the first application indicator on the first display region 1210 and displays an executed screen of a fifth application indicated by the fifth application indicator on the second display region 1220.

In summary, the controller 180 can execute a plurality of applications belonging to different modes, respectively, and can display each executed screen on each display region. The controller 180 can also perform a display status switching operation between a status of displaying both screens corresponding to the first and second modes (within the first and second display regions) (hereinafter called a multimode screen status) and a status of displaying a screen corresponding to a single mode (hereinafter called a single mode screen status).

The display status switching operation between the multimode screen status and the single mode screen status is described in detail with reference to the accompanying drawings as follows. In particular, FIGS. 16A to 16C are display screens illustrating switching between a multimode screen and a single mode screen according to an embodiment of the present invention.

Figure 16A:
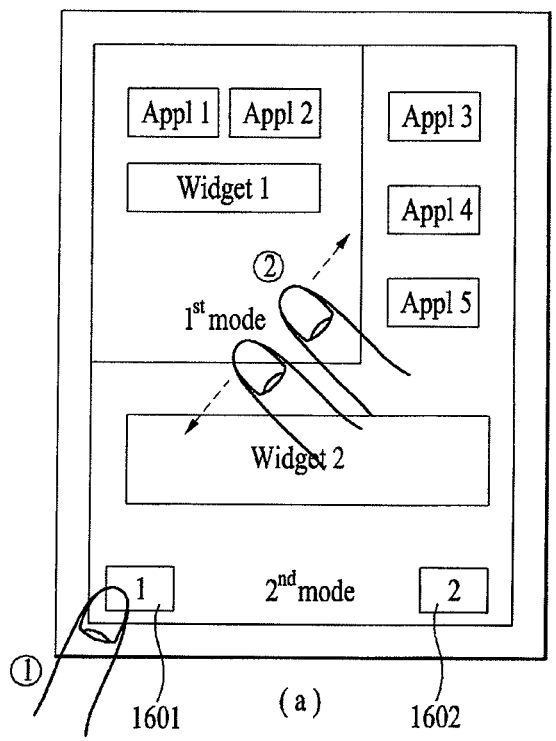
FIGS. 16A to 16C are display screens illustrating switching between a multimode screen and a single mode screen according to an embodiment of the present invention.
Figure 16A:
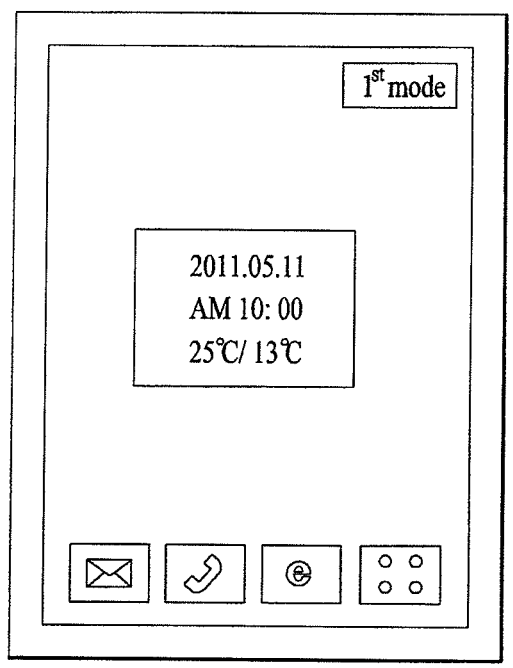

Referring to FIG. 16A, when receiving a touch action 10 on a key zone 1601 or 1602 corresponding to a specific mode in a multimode screen status or a pinch-out action z0 (FIG. 16A(a)), the controller 180 can display a screen of the specific mode (single mode screen status) (FIG. 16A(b)).

In particular, when the pinch-out action is received, the controller 180 can display a screen corresponding to one of a defaulted one of a first mode and a second mode, a mode having a high priority set by a user, a mode having a currently executed application existing therein, a mode having an early mode order and the like.

Figure 16B:
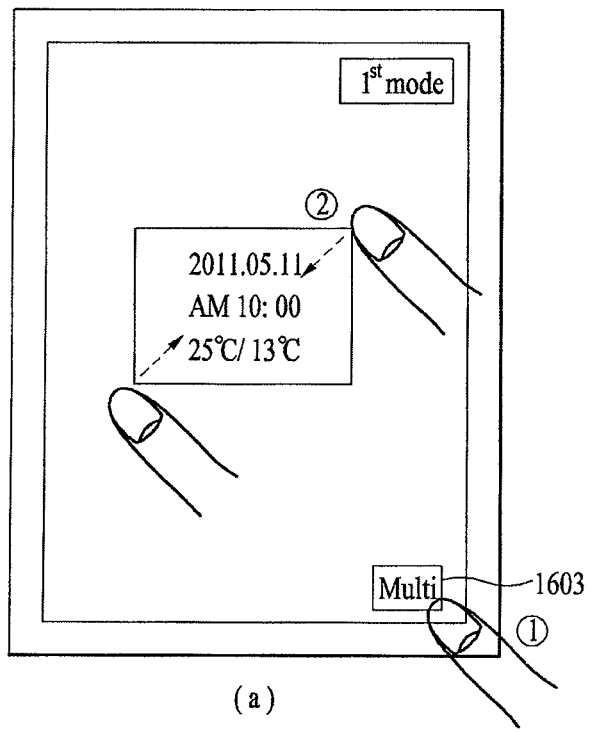
Figure 16B:
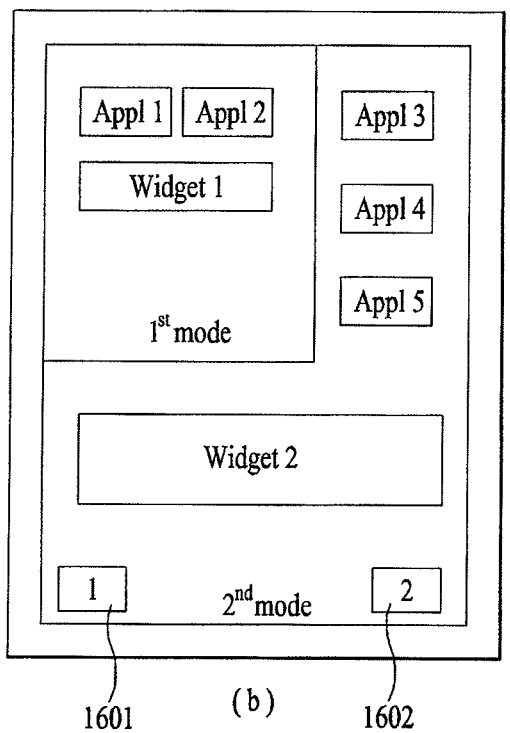
Figure 16C:
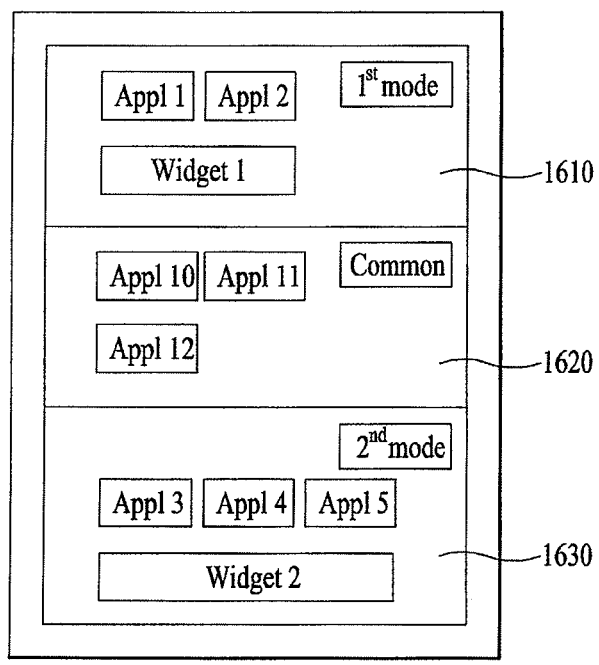

Referring to FIG. 16B, when receiving a touch action 10 on a key zone 1603 corresponding to a multimode in a single mode screen status or a pinch-in action 20 (FIG. 16B(a)), the controller 180 can display each mode screen within a first/second display region (multimode screen status) (FIG. 16B(b)).

Moreover, in the multimode screen status, a state of displaying a common region can be further included in addition to the first and second display regions. In this instance, the common region can contain an indicator of a common application of the first and second modes, a common function (e.g., voice call, message, configuration setting, etc.) of the first and second modes, an indicator of a user preferred application, an indicator of an application designated to be contained in the common region by a user or the controller 180 and the like.

Referring to FIG. 16C, when receiving an input of a command for switching to a screen status of displaying a plurality of display regions including a common region from a single mode screen status or a multimode screen status including a first display region and a second display region, the controller 180 can display a first display region 1610, a second display region 1630 and a common region 1620.

In particular, a command (hereinafter named a first switching command) for switching to a first multimode screen status including a first display region and a second display region from a single mode screen status and a command (hereinafter named a second switching command) for switching to a second multimode screen status including a first display region, a second display region and a common region from a single mode screen status are distinguished from each other. In addition, a screen switching operation between a first multimedia screen and a second multimode screen status is possible.

For instance, the first switching command can be input if a key zone or a menu item corresponding to the first switching command is selected. The first switching command can also be input if a distance between pointers for an end of a pinch-in action is a first distance. The first switching command can be input if a touch speed of a pinch-in action is equal to or greater than a predetermined reference, and the first switching command can also be input if a pinch-in action is input after a touch over a predetermined duration.

In another instance, the second switching command can be input if a key zone or a menu item corresponding to the second switching command is selected, if a distance between pointers for an end of a pinch-in action is a second distance, if a touch speed of a pinch-in action is smaller than a predetermined reference, or if a pinch-in action is input after a touch below a predetermined duration.

When receiving an input of a touch and drag action from a prescribed point within a first display region (boundary included) to a second display region in a first multimode screen status, the controller 180 can allocate a portion of the second display region to a common region. Hence, the first multimode screen status can be switched to a second multimode screen status including a first region, a second region and a common region. In this instance, the common region can have a size corresponding to a touch and drag distance.

In particular, when receiving an input of a touch and drag action in a right/bottom direction on the first display region, the controller 180 can allocate a portion of the second display region adjacent to a right/bottom side of the first display region to the common region. Moreover, when receiving an input of a touch and drag action in a diagonal direction on the first display region, the controller 180 can allocate a portion of the second display region enclosing vertical and horizontal sides situated in the touch and drag direction among the sides of the first display region to the common region.

Referring again to FIG. 11, the controller 180 receives an input of a touch and drag action from the first display region to the second display region from a user using the touchscreen 151 (S 1140). For instance, a start point of the touch and drag action can include at least one of a random point of the first display region, a random point belonging to a specific application indicator or widget included in the first display region, and a random point belonging to a specific data or content displayed on the first display region. That is, the start point of the touch and drag action can include a random point belonging to a specific' object (e.g., a specific application indicator or a specific widget) displayed on a screen or a random point within a whole screen.

Because the touch and drag action is one example only, a touch action on each of the first and second display regions, a flicking action from the first display region to the second display region and the like are applicable in various ways.

When receiving an input of the touch and drag action from the first display region to the second display region, the controller 180 determines whether the information corresponding to the first display region is supported in the second mode corresponding to the second display region (S 1150).

In this instance, the information corresponding to the first display region can include at least one of an application indicated by an application indicator having a touch point belong thereto, an application corresponding to an application executed screen displayed on the first display region, a widget having a touch point belong thereto, and a data or content displayed on the first display region. Moreover, if a touch point belongs to a group icon (or a representative icon) including a plurality of application indicators, the information corresponding to the first display region can contain a plurality of applications indicated by a plurality of the application indicators belonging to the group icon.

In the determining step S1150, if the information corresponding to the first display region is the specific application or the specific widget, the specific application or the specific widget is executable in the second mode, an execution information of the specific application or the specific widget is compatible with the second mode, or the execute information of the specific application, the specific widget in the second mode is stored in the memory 160, or the specific application or the specific widget is designated to be executed in the second mode already (common application/common widget), the controller 180 can determine that the information corresponding to the first display region is supported in the second mode.

In the determining step S1150, if the information corresponding to the first display region is a specific content or a specific data, an application corresponding to a specific content or a specific data is also designated to be executed in the second mode, or an application corresponding to a specific content or a specific data is executable in the second mode (refer to the foregoing description of the determination of a presence or non-presence of an application/widget support), the controller 180 can determine that the information corresponding to the first display region is supported in the second mode.

If the controller 180 determines the information corresponding to the first display region is supported in the second mode (yes in S1150), the controller 180 generates the information corresponding to the first display region in the second mode (S1160). For instance, if the information corresponding to the first display region is a specific application or a specific widget, as the specific application or the specific widget is generated in the second display region, an indicator of the specific application or the specific widget can be displayed on the second display region. In another instance, if the information corresponding to the first display region is a specific content/data associated with a specific application, as the specific content/data is generated in the second mode, an indicator of the specific application or the specific content/data itself can be displayed on the second display region.

In particular, in the generating step S1160, the controller 180 (1) displays the information corresponding to the first display region (or an indicator indicating the corresponding information, e.g., an application indicator) on the second display region only (stopping a display on the first display region) or (2) displays the information corresponding to the first display region on both of the first display region and the second display region (maintaining the display on the first display region).

Meanwhile, if the information corresponding to the first display region is already generated in the second mode (e.g., for a common application or a common widget), the information corresponding to the first display region can be brought from a specific page containing the information corresponding to the first display region among pages configuring the second mode instead of brining the information corresponding to the first display region from the first mode.

When generating the information corresponding to the first display region in the second mode, the controller 180 can determine whether to keep displaying the information corresponding to the first display region on the first display region in accordance with an input pattern of a touch and drag action from the first display region to the second display region (maintaining or stopping a display).

For instance, when stopping the display, the touch and drag action can include one of a touch and drag action by a multi-pointer, a touch and drag action into the second display region, and touch and drag action after a long touch. In another instance, compared to the above-mentioned touch and drag action when stopping the display, the touch and drag action when maintaining the display can include one of a touch and drag action by a single pointer and a touch and drag action after a short touch.

When generating the information corresponding to the first display region in the second mode, the controller 180 can display the information corresponding to the first display region on the second display region by changing a display status of the information corresponding to the first display region to correspond to the second mode. For instance, the controller 180 can change a displayed size, displayed color, displayed information, displayed position and/or the like of the information corresponding to the first display region to correspond to the second mode.

Meanwhile, if the controller 180 determines the information corresponding to the first display region is not supported in the second mode (no in S1150), the controller 180 accesses an external server via the wireless communication unit 110 to generate information, which is identical or similar to the information corresponding to the first display region, supported in the second mode (S1170). In doing so, the access to the external server is performed in accordance with a user selection or can be automatically performed by the controller 180.

In this instance, the external server can include an external server providing an application or widget to the terminal. For instance, the external server can include one of a web server, a server of a mobile communication service provider and the like. In addition, the controller 180 can access a corresponding web server via a website (e.g., Android Market, Apple Market, etc.) that provides application/widget.

Besides, if the controller 180 determines the information corresponding to the first display region is not supported in the second mode (no in S1150), the controller 180 enables the information corresponding to the first display region, which is moving to correspond to a touch and drag action, to return to a previous position before the moving of the corresponding information.

In the accessing step S1170, the controller 180 searches the external server for the information, which is equal or similar to the information corresponding to the first display region and supported in the second mode, and can then download the found information. Thus, the searching and downloading process can be automatically performed without a user selection.

In the accessing step S1170, the controller 180 searches the external server for the information, which is equal or similar to the information corresponding to the first display region and supported in the second mode, and can then display a list constructed with the found information as a result of the search or a recommended one of the found information.

A control operation in accordance with a presence or non-presence of a support of the information corresponding to the first display region in the second mode is described in detail with reference to the accompanying drawings as follows. Although the drawings of the following description show an operation of generating the information corresponding to the first display region in the second mode, the following embodiments are applicable to a reverse case as well.

First, the controller 180 can inform a user that a touch and drag action (e.g., a touch and drag action from a first display region to a second display region) for generating the information corresponding to the first display region in a second mode can be input. For instance, a boundary line between the first display region and the second display region is represented with slash lines or a different color or can be displayed thick. Optionally, in order to indicate that the touch and drag action can be input, a text, an image, an icon and/or the like is displayed and/or voice or vibration can be output.

Alternatively, the touch and drag action can be replaced by one of a selection of a menu item corresponding to the generation of the information corresponding to the first display region in the second mode, an input of a touch action having a predetermined pattern (e.g., a long touch, a multi-touch, etc.) on the first display region to which the information to be generated in the second mode corresponds, an input of a corresponding speech, an input of a corresponding terminal motion, a selection of a corresponding key zone and the like.

Next, FIGS. 17A to 17E are display screens illustrating receiving an input of a touch and drag action from an application indicator of a first display region to a second display region, if an application of the first display region is supported in a second mode, according to an embodiment of the present invention.

Figure 17A:
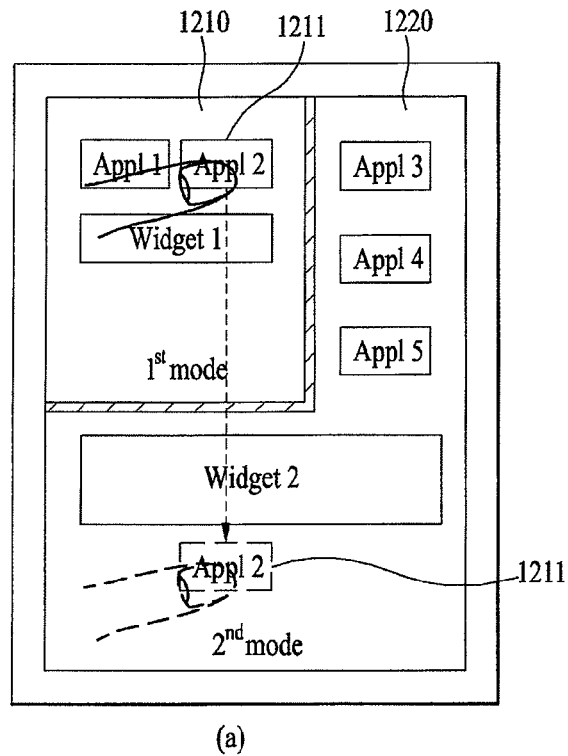
FIGS. 17A to 17E are display screens illustrating receiving a touch and drag action from an application indicator of a first display region to a second display region, if an application of the first display region is supported in a second mode, according to an embodiment of the present invention.
Figure 17A:
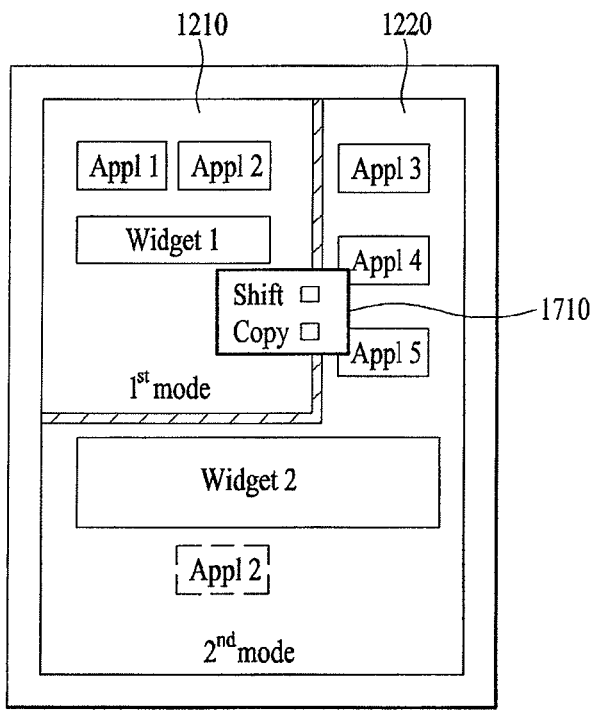

Referring to FIG. 17A, when receiving an input of a touch and drag action to the second display region 1220 from the second application indicator 1211 displayed on the first display region 1210 (FIG. 17A(a)), the controller 180 can generate a second application corresponding to the second application indicator 1211 in the second mode (FIG. 17A(b)).

For instance, assuming that the generation in the second mode includes a shift and a copy operation, the controller 180 can display a window 1710 for selecting whether to shift to the second mode or to copy (FIG. 17A(b)). Alternatively, the controller 180 performs a shift action on the second application as a default. If there is a separate command corresponding to the copy from a user, the controller 180 can perform a copy action on the second application.

Figure 17B:
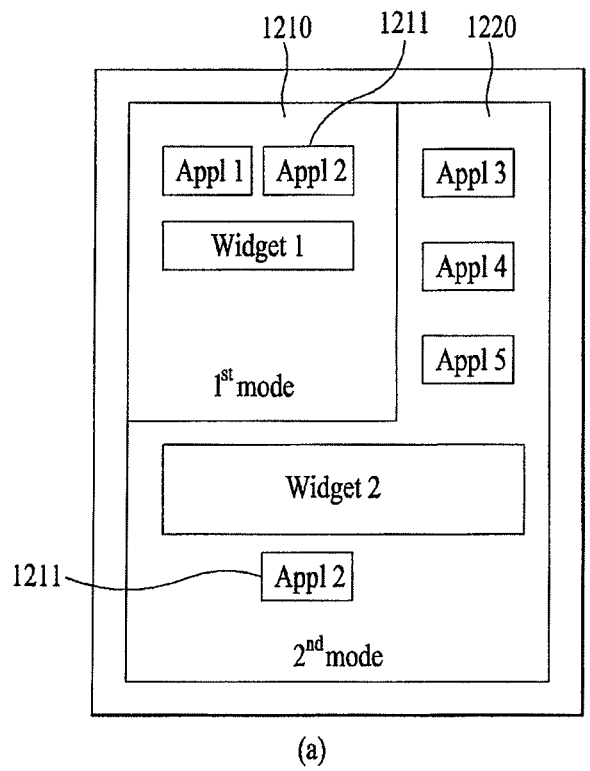
Figure 17B:
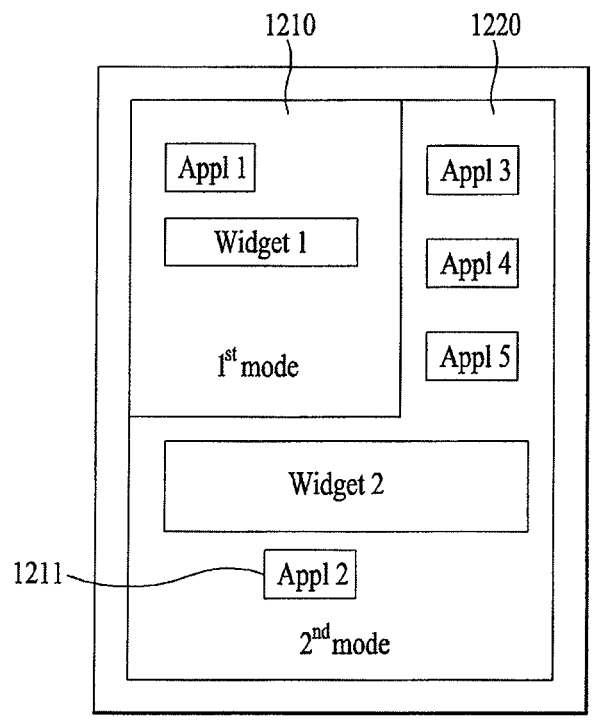

Referring to FIG. 17B, when the copy is selected in FIG. 17A(b), the controller 180 displays the second application indicator 1211 on both of the first display region 1210 and the second display region 1220 (FIG. 17B(a)). If the shift is selected in FIG. 17A(b), the controller 180 can display the second application indicator 122 on the second display region 1220 only (FIG. 17B(b)).

In brief, if the second application is copied, the second application is designated to a common application of the first and second modes. If the second application is shifted, the second application can be designated to a dedicated application of the second mode.

Figure 17C:
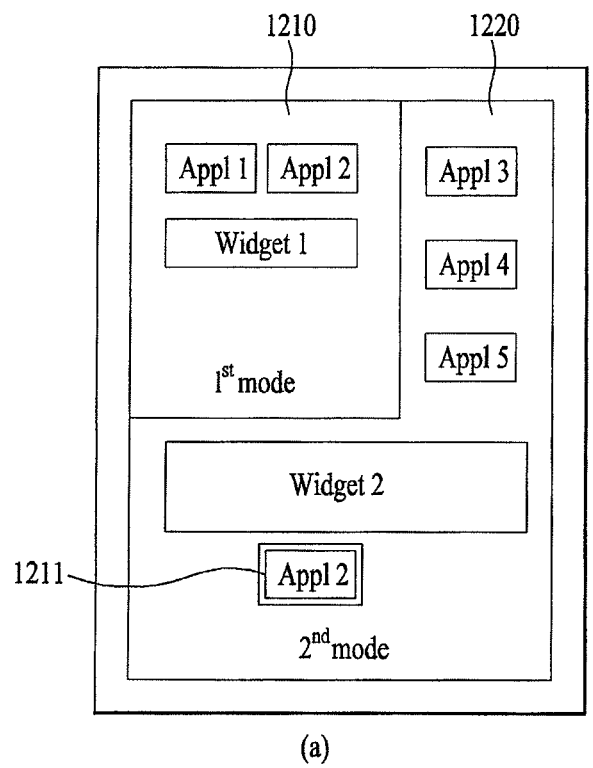
Figure 17C:
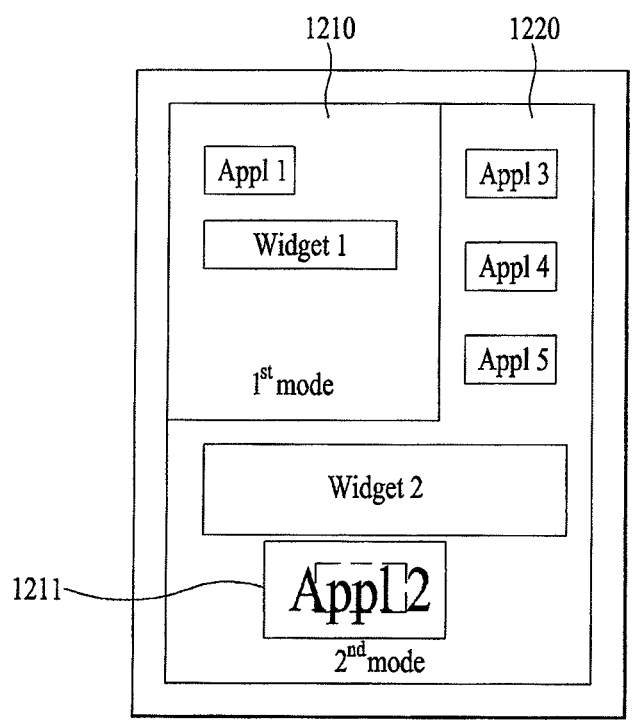

Referring to FIG. 17C, if the second application is generated in the second mode, the controller 180 can enable a display status of the second application indicator 1211 within the second display region to differ from a display status within the first display region 1210. For instance, the second application indicator 1211 within the second display region 1220 can differ from the second application indicator 1211 displayed on the first display region 1210 in at least one of a display shape, a display size, a display color, a display information (e.g., name, icon image, etc.) and the like.

This is because each of the first and second modes can have a different display scheme of its application indicator or widget. In this instance, information on the display scheme of each of the modes is stored in the memory 160. For instance, an application indicator in the first mode is represented as 1×1 or red. Yet, an application indicator in the second mode can be represented as 1×2 or blue.

Figure 17D:
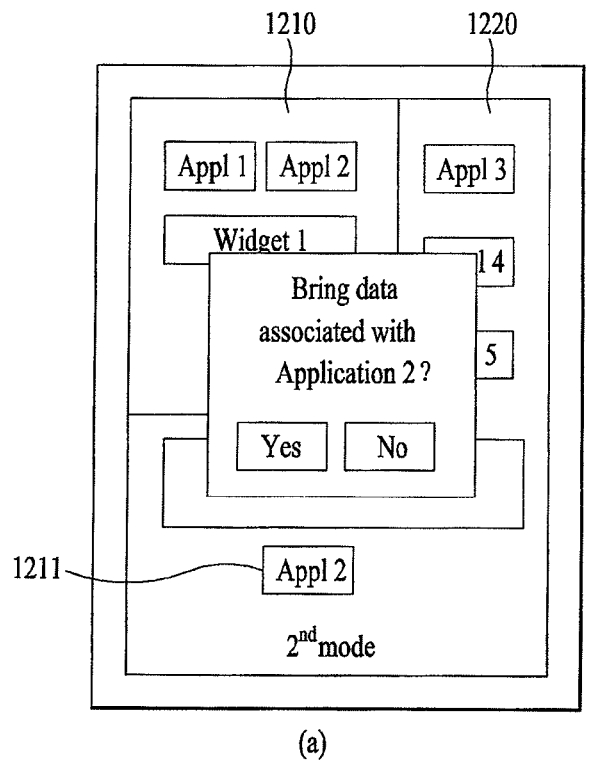
Figure 17D:
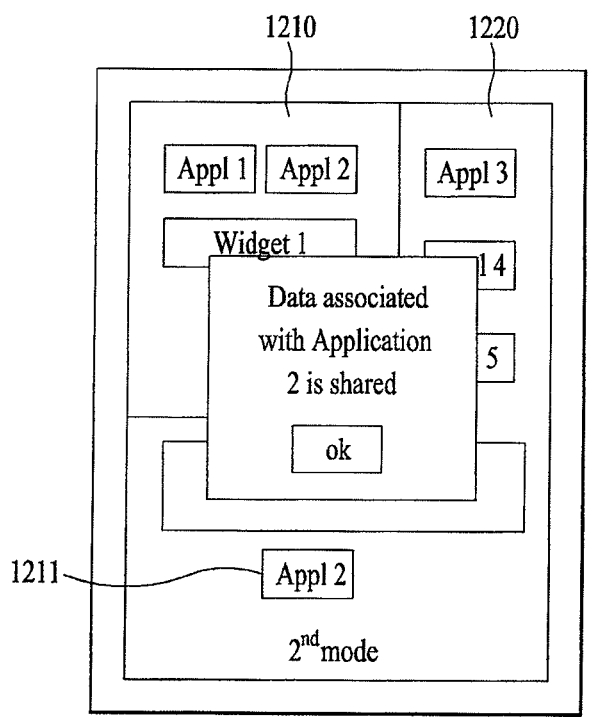

Referring to FIG. 17D, when copying the second application to the second mode, the controller 180 allows a user to select whether a data or content stored in the first mode in association with the second application is to be shared with the second mode (FIG. 17D(a)). Hence, if the user selects to share (yes), the controller 180 can share the data or content stored in the first mode in association with the second application with the second mode (FIG. 17D(b)). If the user selects not to share (no), the controller 180 copies the second application to the second mode only but enables the associated data or content not to be referred to in the second mode.

When shifting the second application to the second mode, the controller 180 allows a user to select whether to bring a data or content stored in the first mode in association with the second application. In accordance with a user selection, the controller 180 shifts the second application only or brings the associated with data or content to a storage region of the second mode together with a shift of the second application. Meanwhile, when the second application is generated in the second mode, the controller 180 can automatically generate the data or content associated with the second application in the second mode irrespective of a user selection.

Figure 17E:
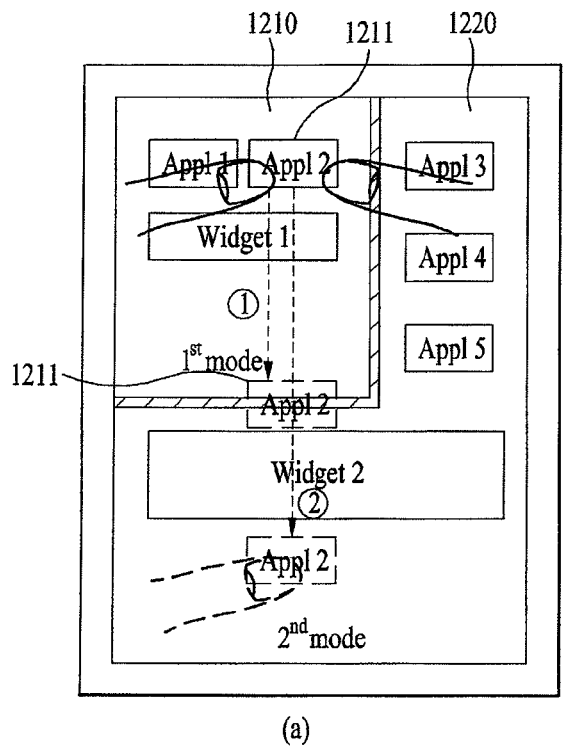
Figure 17E:
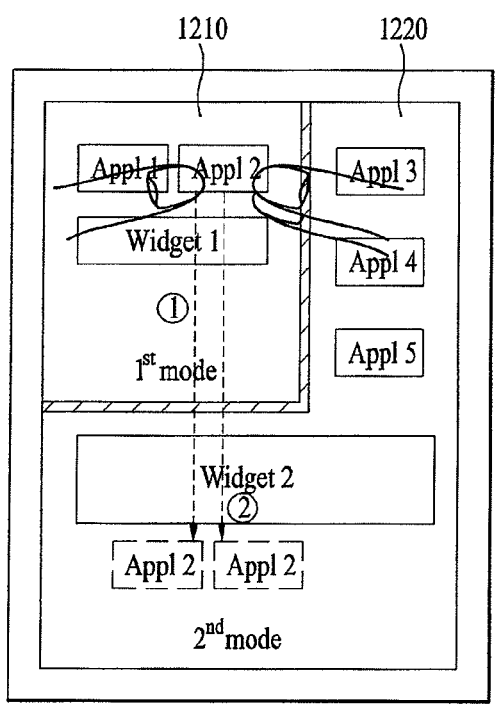

Referring to FIG. 17E, the controller 180 can determine whether to keep displaying the second application indicator 1211 on the first display region 1210 in accordance with an input pattern of a touch and drag action (maintaining/stopping a display). For instance, referring to FIG. 17E(a), when receiving an input of a touch and drag action ① from the second application indicator 1211 to a boundary between the first and second display regions 1210 and 1220, the second application indicator 1211 can be displayed on both of the first display region 1210 and the second display region 1220 (maintaining a display). When receiving an input of a touch and drag action ② from the second application indicator 1211 into the second display region 1220, the second application indicator 1211 can be displayed on the second display region 1220 only (stopping a display).

In another instance, when receiving an input of a touch and drag action ② by a single pointer from the second application indicator 1211, the second application indicator 1211 can be displayed on both of the first display region 1210 and the second display region 1220 (maintaining a display). When receiving an input of a touch and drag action ① by a multi-pointer from the second application indicator 1211, the second application indicator 1211 can be displayed on the second display region 1220 only (stopping a display).

Figure 18A:
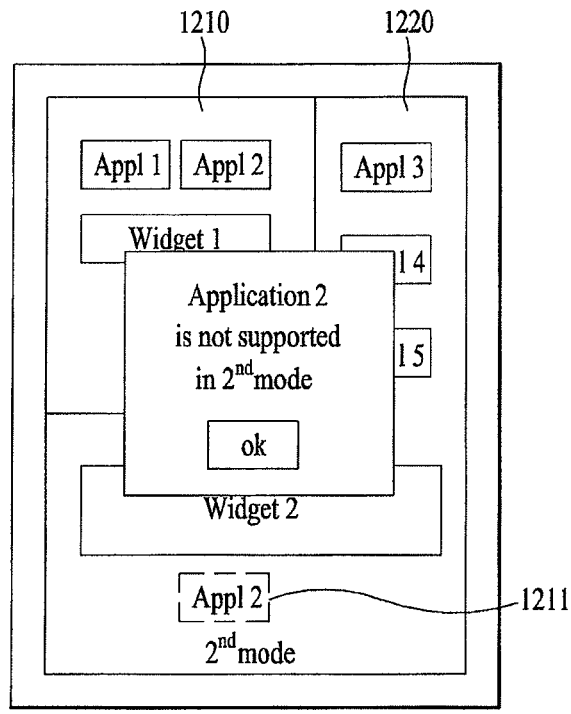
FIGS. 18A to 18C are display screens illustrating receiving a touch and drag action from an application indicator of a first display region to a second display region, if an application of the first display region is not supported in a second mode, according to an embodiment of the present invention.
Figure 18A:
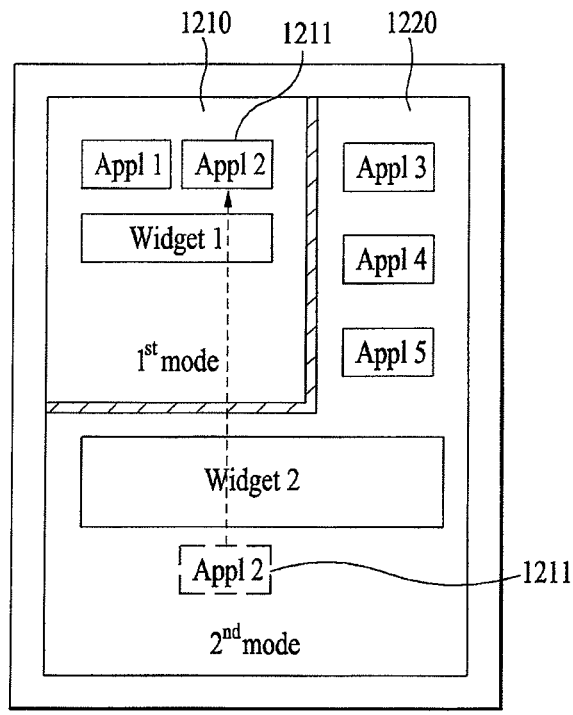
Figure 18B:
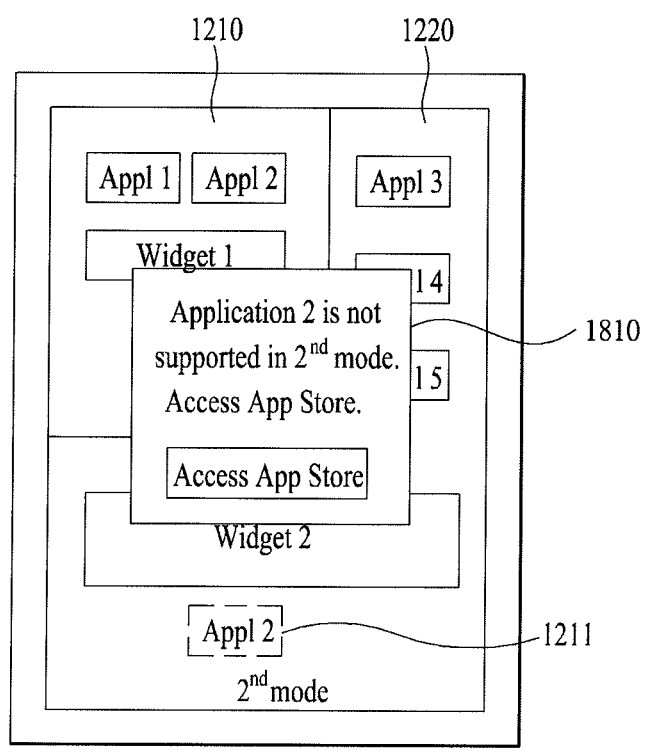
Figure 18C:
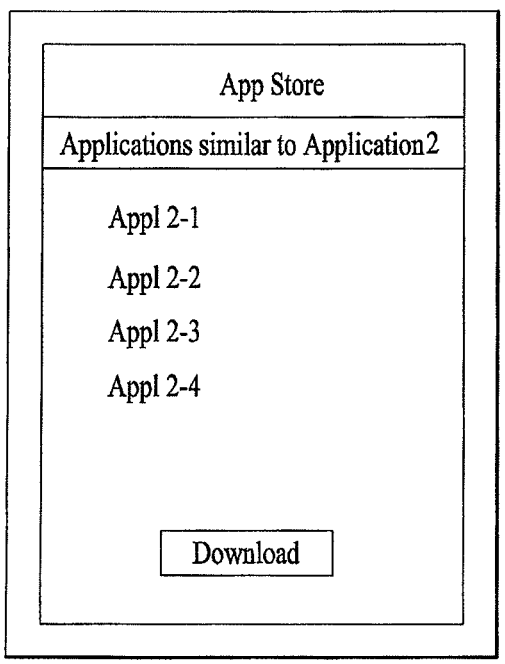
Figure 18C:
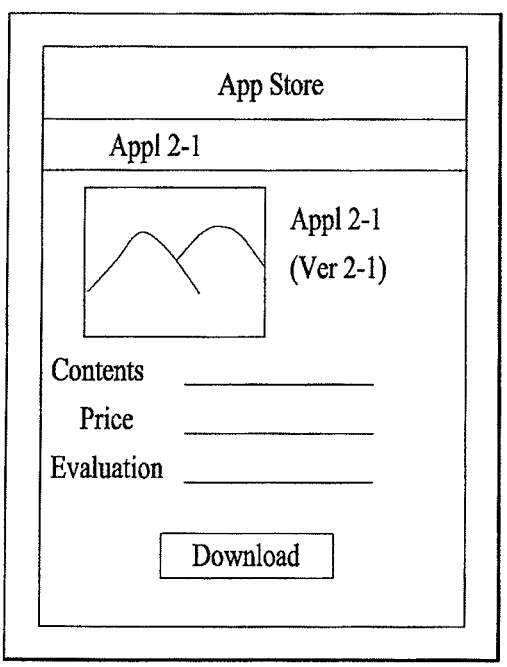

Next, FIGS. 18A to 18C are display screens illustrating receiving an input of a touch and drag action from an application indicator of a first display region to a second display region, if an application of the first display region is not supported in a second mode, according to an embodiment of the present invention.

Referring to FIG. 18A, when receiving an input of a touch and drag action on the second application indicator 1211 displayed on the first display region 1210 toward the second display region 1220, the controller 180 indicates that the second application is not supported in the second mode (FIG. 18A(a)) and enables the second application indicator 1211, which is being shifted in response to the touch and drag action, to return to its original position before the shift (FIG. 18A(b)).

Referring to FIG. 18B, when receiving an input of a touch and drag action on the second application indicator 1211 displayed on the first display region 1210 toward the second display region 1220, the controller 180 indicates that the second application is not supported in the second mode and can display a window 1810 for allowing a user to select an access to a website (e.g., App Store) providing applications. Alternatively, the controller 180 can automatically access the App Store without a user selection.

Referring to FIG. 18C, after the controller 180 has accessed an App Store, the controller 180 displays a list of applications supported in the second mode by performing a function equal or similar to the second application (FIG. 18C(a)) or can display detail information on a specific one (e.g., application having a highest download count, application having best evaluation, free application, etc.) of the applications (FIG. 18C(b)).

For instance, the application performing a function equal or similar to the second application can include one of an application belonging to the same category of the second application, an application having the same name of the second application and an application corresponding to a version of the second mode of the second application for the application having a version differing per mode.

Therefore, the controller 180 receives a selection of a specific application from the application list shown in FIG. 18C (a) and then downloads the selected application. Alternatively, the controller 180 can download a specific application, of which detail information is displayed in FIG. 18C(b). In this instance, an indicator of the downloaded specific application can be displayed on the second display region 1220.

Figure 19A:
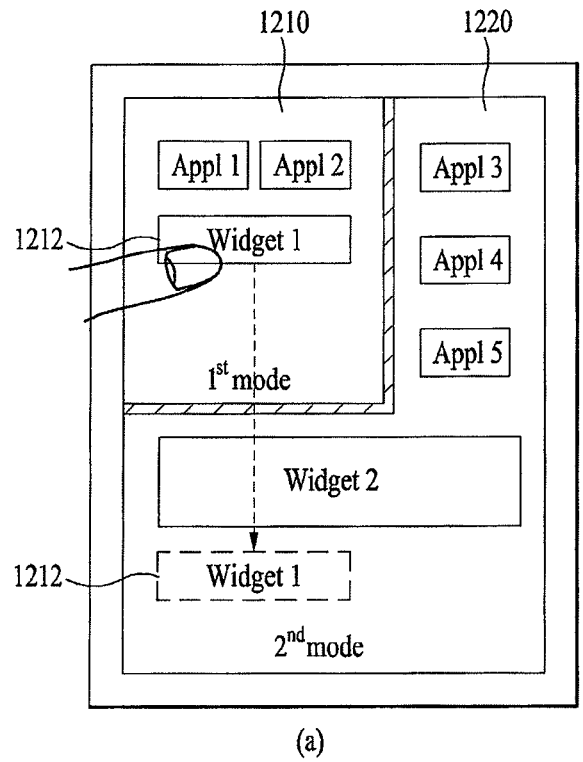
FIGS. 19A to 19C are display screens illustrating receiving a touch and drag action from a widget of a first display region to a second display region, if the widget of the first display region is supported in a second mode, according to an embodiment of the present invention.
Figure 19A:
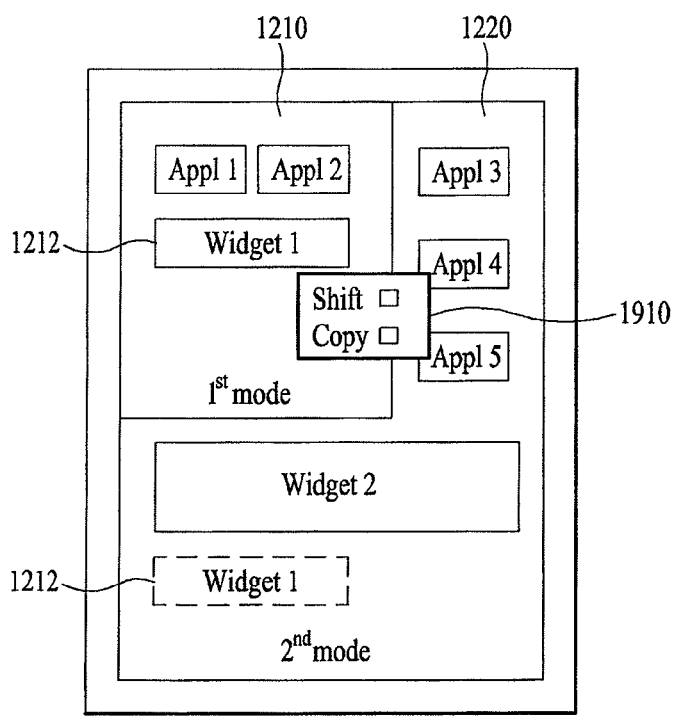
Figure 19B:
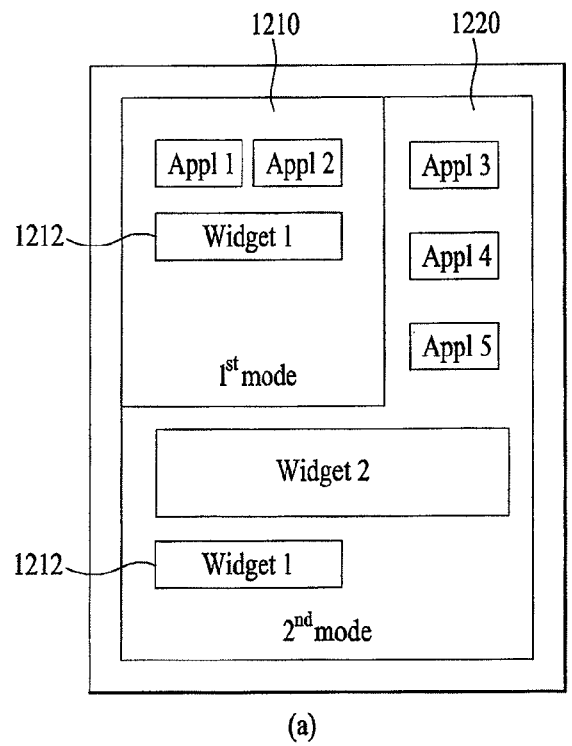
Figure 19B:
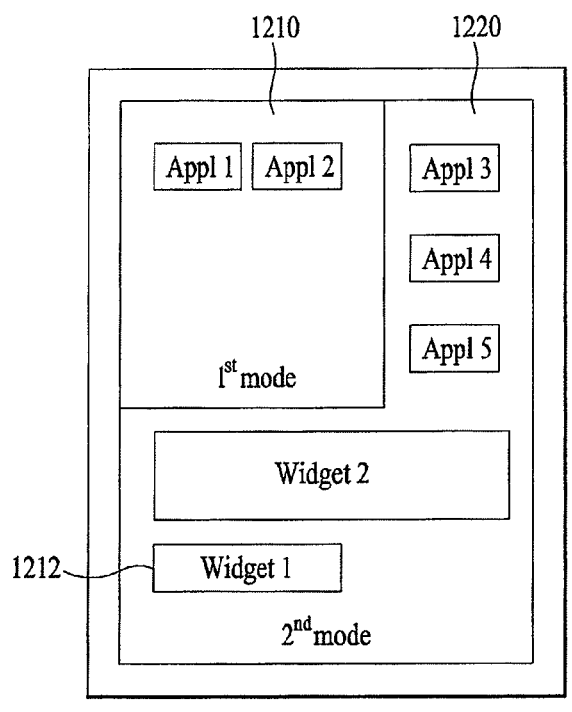
Figure 19C:
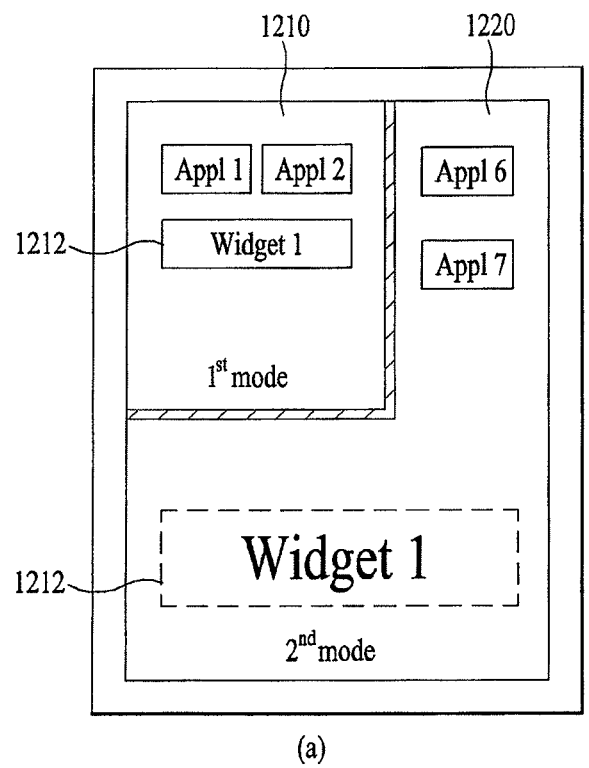
Figure 19C:
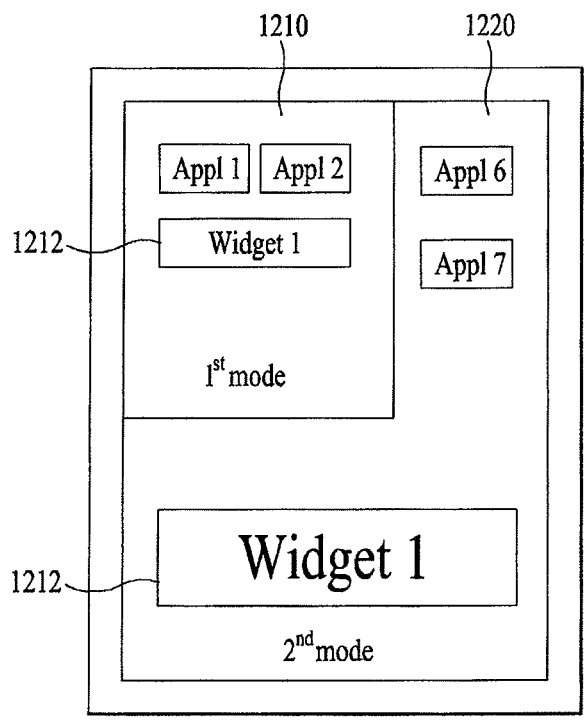

FIGS. 19A to 19C are display screens illustrating receiving an input of a touch and drag action from a widget of a first display region to a second display region, if the widget of the first display region is supported in a second mode, according to an embodiment of the present invention.

Referring to FIG. 19A, when receiving an input of a touch and drag action from the first widget 1212 displayed on the first display region 1210 to the second display region 1220 (FIG. 19A(a)), the controller 180 can generate the first widget 1212 in the second mode (FIG. 19A(b)). Moreover, when generating the first widget 1212 in the second mode, the controller 180 can select whether to keep displaying the first widget 1212 on the first display region 1210 (maintaining/stopping a display). For instance, if a shift is selected via a window 1910, the first widget 1212 stops being displayed. If a copy is selected, the display of the first widget 1212 is maintained.

Referring to FIG. 19B, if the first widget 1212 is generated in the second mode, the controller 180 displays the first widget 1212 on both of the first display region 1210 and the second display region 1220 (FIG. 19B(a)) or can display the first widget 1212 on the second display region 1220 only (FIG. 19B(b)).

In brief, when the first widget 1212 is displayed on both of the first display region 1210 and the second display region 1220, the first widget 1212 is designated to a common widget of the first and second modes. When the first widget 1212 is displayed on the second display region 1220 only, the first widget 1212 can be designated to a dedicate widget of the second mode.

Referring to FIG. 19C, when generating the first widget 1212 in the second mode, the controller 180 can enlarge the first widget 1212 within the second display region 1220 to be larger than that within the first display region 1210. If a space for displaying the enlarged first widget 1212 is insufficient on a page currently displayed on the second display region 1220, a page securing a space for displaying the enlarged first widget 1212 through a page turning is displayed on the second display region 1220 and the enlarged first widget 121 can be situated on the turned page.

For instance, an outline of the first widget 1212 is represented as a dotted line until its position in the second display region 1220 is confirmed (FIG. 19C(a)). After the position has been confirmed, the outline of the first widget 1212 can be represented as a solid line (FIG. 19C(b)). Moreover, the controller 180 enables the first widget 1212 within the second display region 1220 to differ from that within the first display region 1210 in a display shape, a display color, a display information and/or the like as well as a size. This is because a display configuration of a same widget can vary per mode.

The foregoing embodiments relating to the application generation operation in accordance with a presence or non-presence of a support in the second mode (FIGS. 17A to 18B) are applicable to the widget as well.

Figure 20:
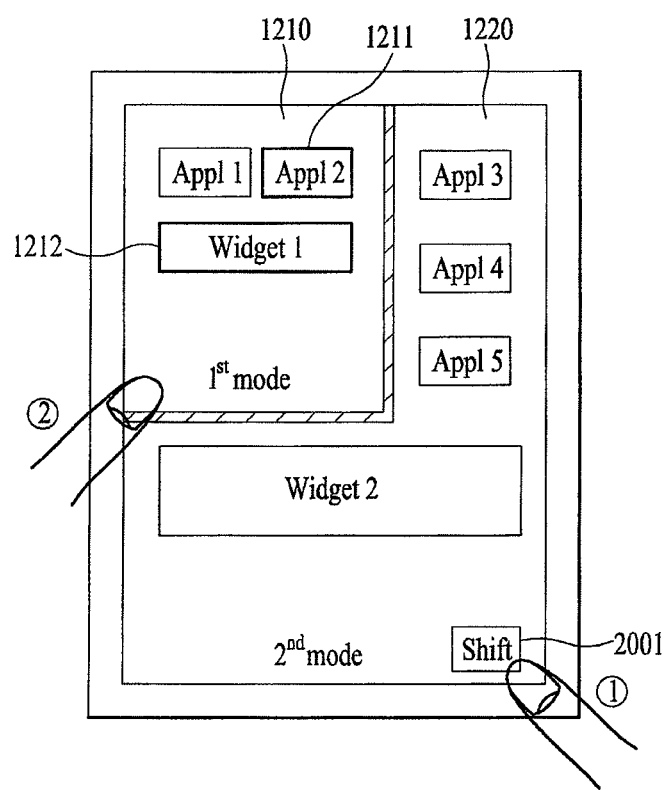
FIG. 20 is a display screen illustrating identifiably displaying application/widget, which can be generated in a different mode, according to an embodiment of the present invention.

Next, FIG. 20 is a display screen illustrating identifiably displaying an application/widget, which can be generated in a different mode, according to an embodiment of the present invention. Referring to FIG. 20, when receiving an input of a touch action on a random point of the first display region 1210, the controller 180 can identifiably display the indicator 1211 of an application or the widget 1212, which can be generated in a second mode, among application widgets or widgets displayed within the first display region 1210. This is applicable to a second display region as well.

When a shift zone 2001 provided to a prescribed region of a screen is selected, the controller 180 can identifiably display an indicator of an application or a widget, which can be generated in a counterpart mode, among the application indicators or widgets displayed on each of the first and second display regions 1210 and 1220.

Figure 21A:
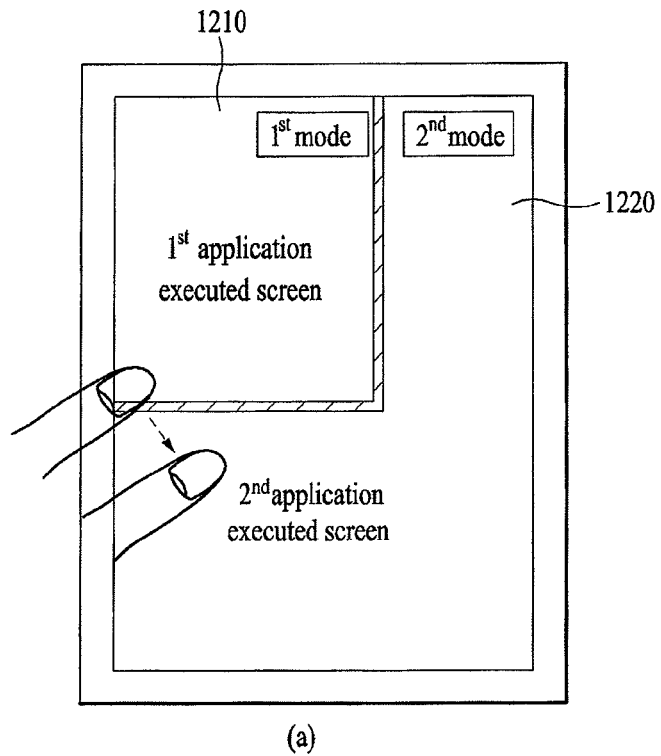
FIGS. 21A and 21B are display screens illustrating receiving a touch and drag action from a random point of a first display region to a second display region, if an application corresponding to an application executed screen of the first display region is supported in a second mode, according to an embodiment of the present invention.
Figure 21A:
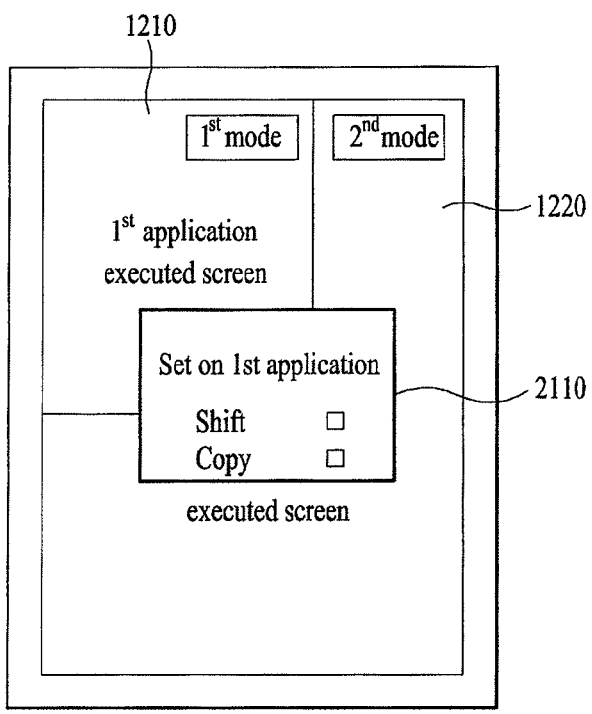
Figure 21B:
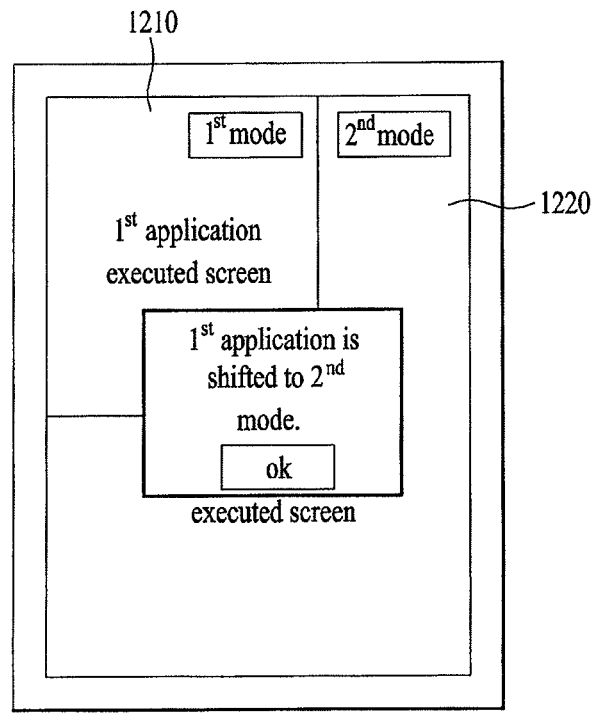
Figure 21B:
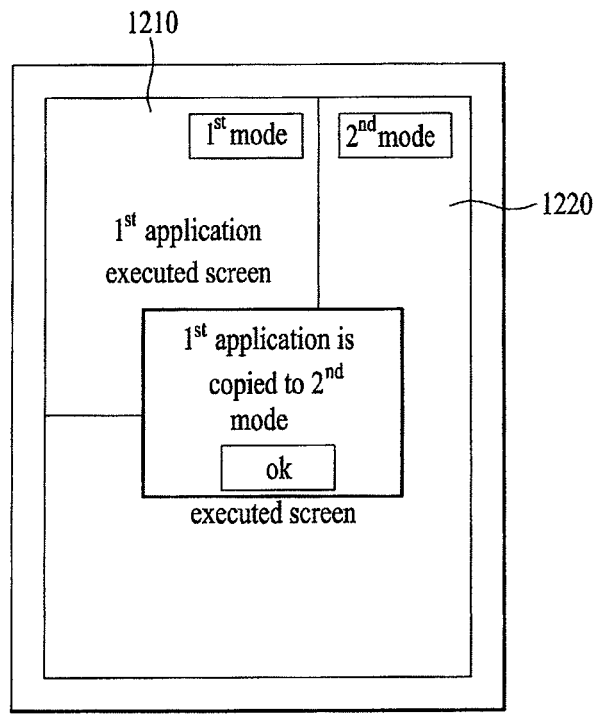

Next, FIGS. 21A and 21B are display screens illustrating receiving a touch and drag action from a first display region to a second display region, if an application corresponding to an application executed screen of the first display region is supported in a second mode, according to an embodiment of the present invention.

Referring to FIG. 21A, when receiving an input of a touch and drag action from a first application executed screen displayed on the first display region 1210 to the second display region 1220 (FIG. 21A(a)), the controller 180 can generate a first application in a second mode. In addition, the controller 180 can select whether to keep displaying a first application indicator on the first display region 1210. For instance, if a shift is selected via a window 2110, the first application indicator stops being displayed on the first display region 1210. If a copy is selected, the first application indicator can keep being displayed on the first display region 1210.

Referring to FIG. 21B, when generating a first application in a second mode, the controller 180 shifts the first application to a storage region of the second mode (FIG. 21B(a)) or can refer to the first application by shifting the first application to a common storage region or having the first application stored in a storage region of a first mode (FIG. 21B(b)). In brief, the first application is designated to a dedicated application of the second mode (FIG. 21B(a)) or the first application can be designated to a common application of the first and second modes (FIG. 21B(b)).

When generating the first application in the second mode while executing the first application, the controller 180 stops displaying a first application executed screen on the first display region 1210, can display the first application executed screen on the second display region 1220, and can display the first application indicator on the second display region 1220 only. In addition, when generating the first application in the second mode while executing the first application, the controller 180 displays the first application executed screen on a prescribed one of the first and second display regions 1210 and 1220 or can display the first application indicator on both of the first and second display regions 1210 and 1220, in accordance with a user selection.

The foregoing embodiments (FIGS. 17A to 18B) relating to the application generating operation in accordance with a presence or non-presence of a support in the second mode are applicable to the present embodiment. However, the foregoing embodiment relating to the display of the shifted application indicator can be set not to be applicable.

Figure 22A:
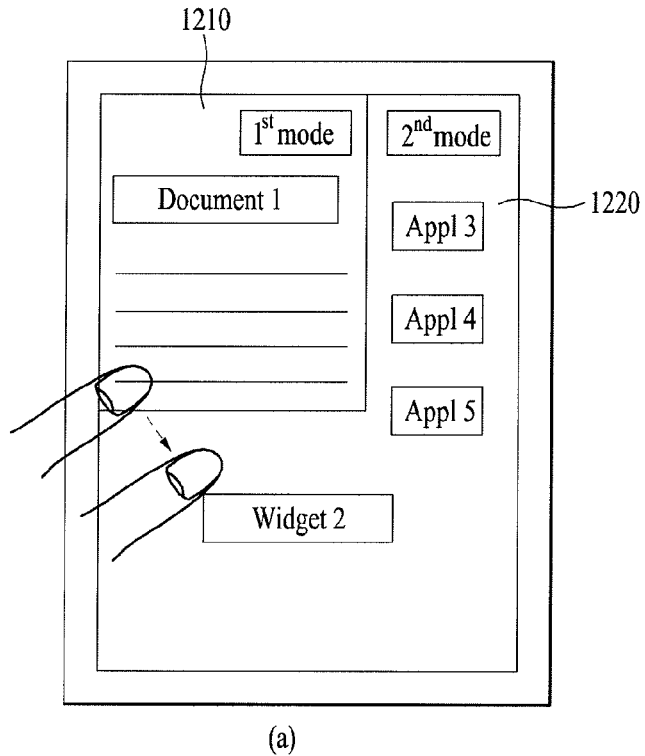
FIGS. 22A and 22B are display screens illustrating receiving a touch and drag action from a random point of a first display region to a second display region, if a data/content of the first display region is supported in a second mode, according to an embodiment of the present invention.
Figure 22A:
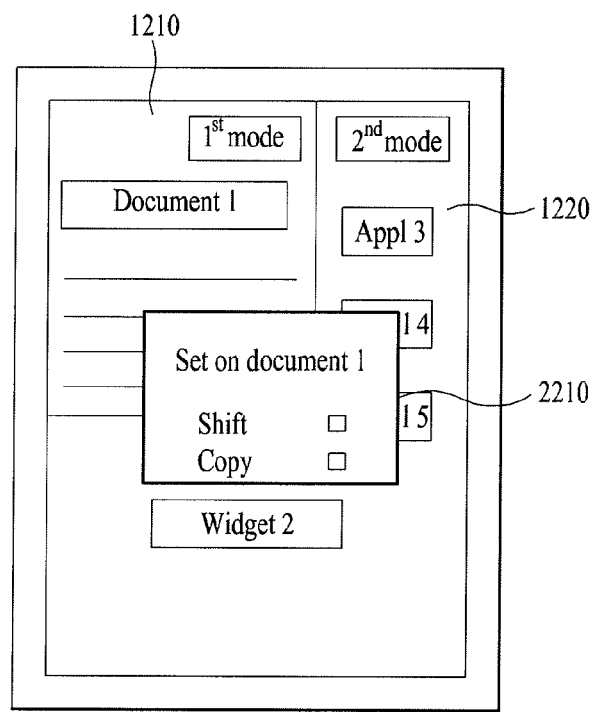
Figure 22B:
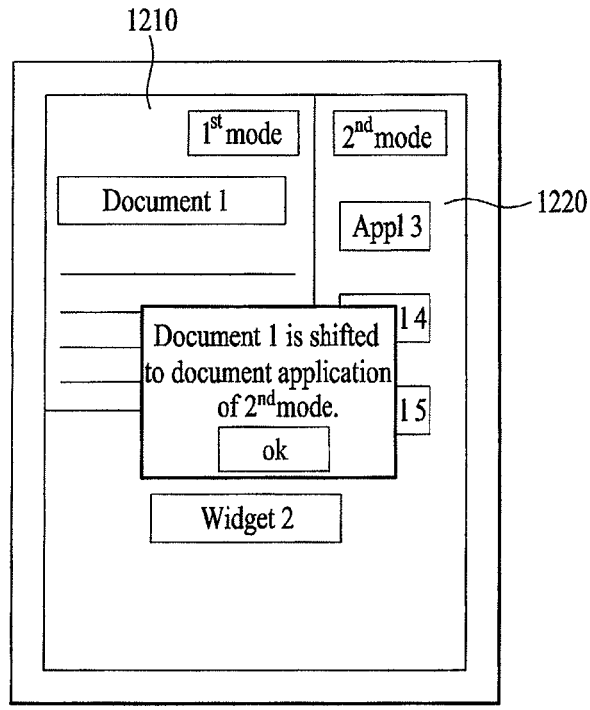
Figure 22B:
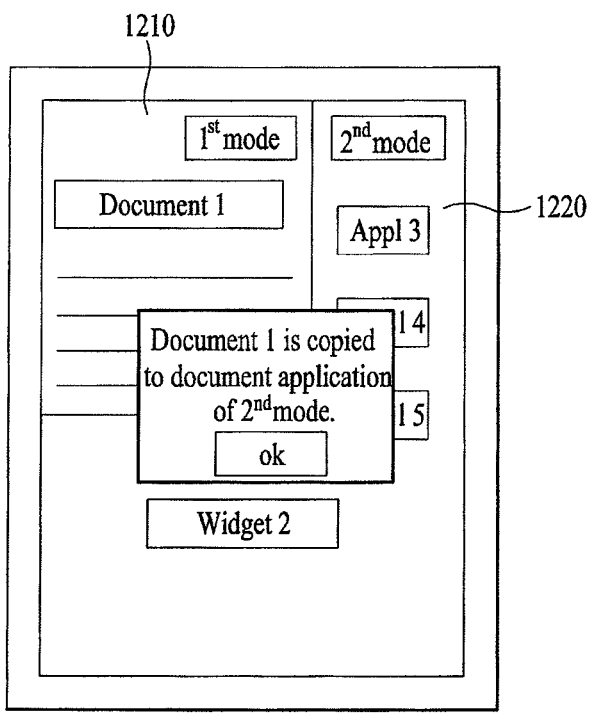

Next, FIGS. 22A and 22B are display screens illustrating receiving a touch and drag action from a random point of a first display region to a second display region, if a data/content of the first display region is supported in a second mode, according to an embodiment of the present invention. Referring to FIG. 22A, when receiving an input of a touch and drag action from the first display region 1210 to the second display region 1220 while displaying a first document as specific data (or specific content) on the first display region 1210 (FIG. 22A(a)), the controller 180 can generate the first document in a second mode (FIG. 22A(b)). In addition, the controller 180 can display a window 2210 for selecting whether the first document is made to correspond to the second mode (shift) or both of the first and second modes (copy) (FIG. 22A(b)). In this instance, an embodiment of generating an application corresponding to the first document in the second mode can refer to the former description with reference to FIGS. 21A and 21B.

Referring to FIG. 22B, when generating a first document in the second mode, the controller 180 shifts the first document to a storage region of the second mode (FIG. 22B(a)) or can refer to the first document by shifting the first document to a common storage region or having the first document stored in a storage region of a first mode (FIG. 22B(b)).

In this instance, a document related application capable of executing the first document exists in the second mode and the first document can correspond to the document related application of the second mode. If the document related application capable of executing the first document does not exist in the second mode, a document related application of the first mode is controller to be generated in the second mode or the document related application corresponding to the second mode can be set to be downloaded from an external server.

In brief, the first document is designated to a dedicated data of the second mode (FIG. 22B(a)) or the first document can be designated to a common data of the first and second modes (FIG. 22B(b)). Moreover, the controller 180 stops displaying the first document on the first display region 1210 and displays the first document on the second display region 1220. Alternatively, the controller 180 can display the first document on either the first display region 1210 or the second display region 1220.

The foregoing embodiments (FIGS. 17A to 18B) relating to the application generating operation in accordance with a presence or non-presence of a support in the second mode are applicable to the present embodiment. Yet, the foregoing embodiment relating to the display of the shifted application indicator can be set not to be applicable.

Figure 23A:
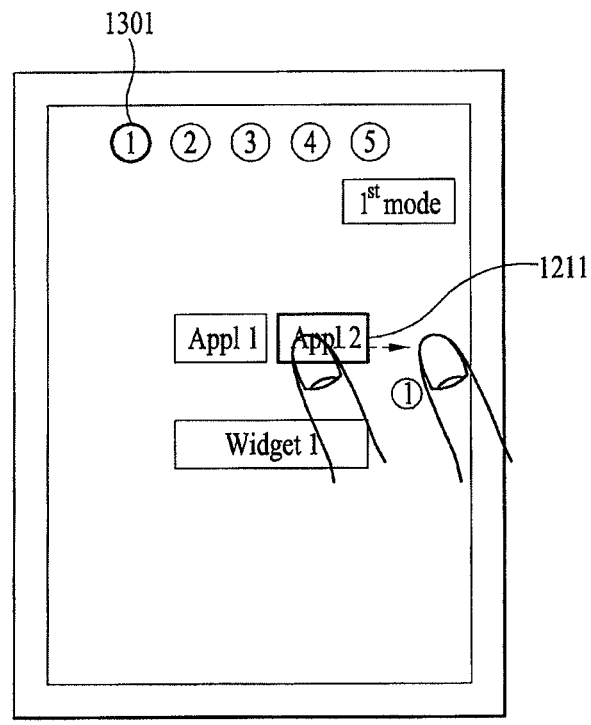
FIGS. 23A to 23C are display screens illustrating receiving a touch and drag action from a page corresponding to a first display region to a page corresponding to a second display region, if the first display region and the second display region are generated from different pages, respectively, according to an embodiment of the present invention.
Figure 23A:
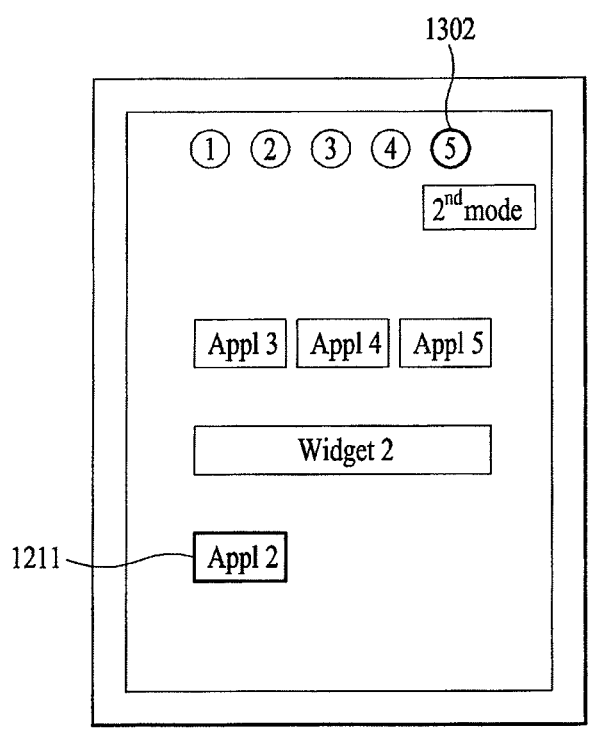
Figure 23B:
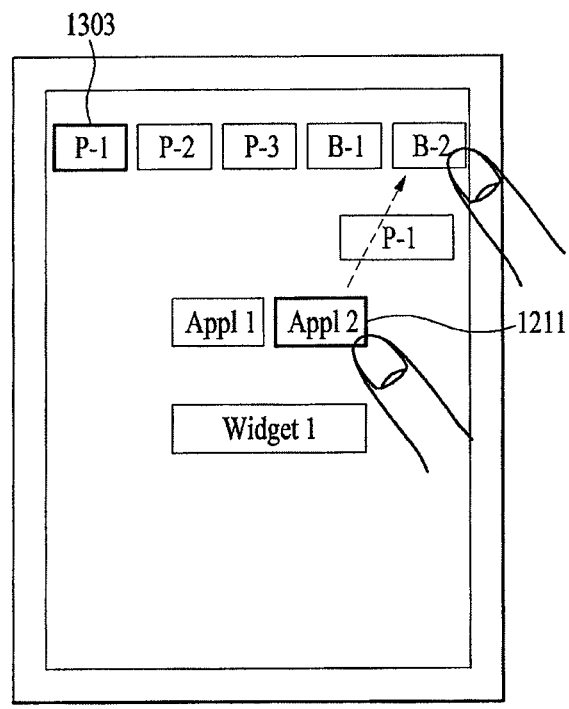
Figure 23B:
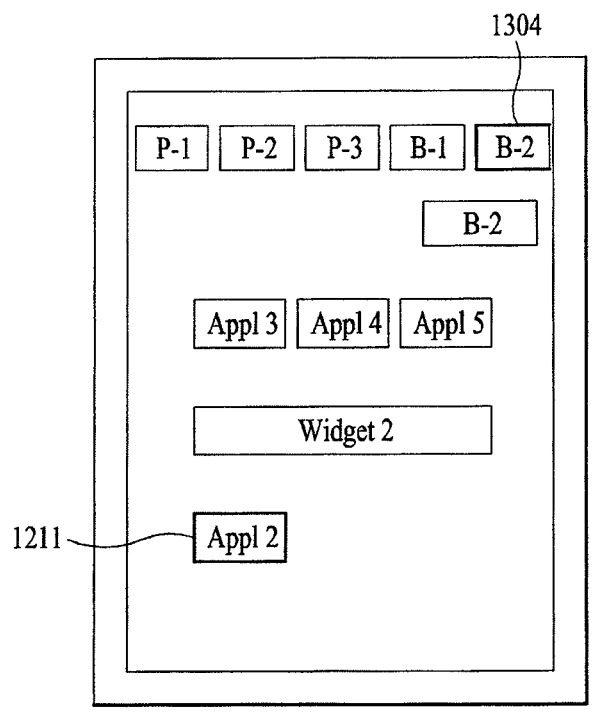
Figure 23C:
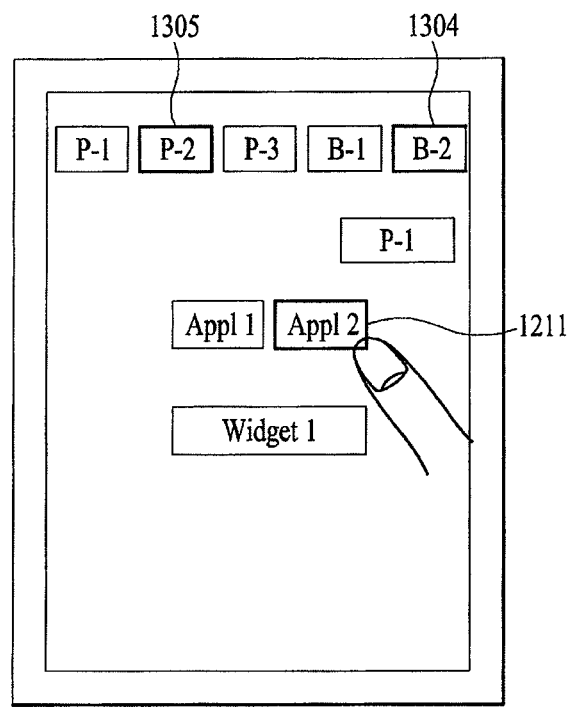

Next, FIGS. 23A to 23C are display screens illustrating receiving a touch and drag action from a page corresponding to a first display region to a page corresponding to a second display region, if the first display region and the second display region are generated from different pages, respectively, according to an embodiment of the present invention. For clarity and convenience of the following description, assume that the first and second display regions are provided to different pages, respectively.

Referring to FIG. 23A, while the second application indicator 1211 displayed on a first page 1301 provided within the first display region is selected, the controller 180 performs a page turning action (FIG. 23A(a)). If a fifth page 1302 having a second display region is displayed by the page turning action, the controller 180 can display the second application indicator 1211 on the second display region (FIG. 23A(b)).

In this instance, the page turning action or an application indicator generating action can be performed to correspond to a touch and drag action. For instance, while the second application indicator 1211 is selected, if a touch and drag action in a right direction is input, the controller 180 can execute a forward page turning action (in order of incrementing a page number).

Referring to FIG. 23B, although the page number is used as the page indicator in FIG. 23A, the controller 180 can display an identification number 1303 of a mode, to which a display region included in a corresponding page corresponds, as a page indicator. For instance, first to third private modes are represented as P-1 to P-3, respectively. A first business mode and a second business mode can be represented as B-1 and B-2, respectively.

First, while the second application indicator 1211 is selected, if a touch and drag action to the page indicator B-2 1304 corresponding to the second business mode is input (FIG. 23B(a)), the controller 180 can display the second application indicator 1211 on a display region corresponding to the second business mode.

In FIG. 23A or 23B, when the second application indicator 1211 situated on the page containing the first display region or the page corresponding to the first private mode P1 is displayed on the page containing the second display region or the page containing the display region corresponding to the second business mode B-2, the controller 180 determines whether the second application indicated by the second application indicator 1211 is supported in the second mode or the second business mode P-2. In accordance with a result of the determination, the second application can be generated in the second mode or the second business mode. This refers to the former description relating to the application generation (FIGS. 17A to 18B).

Referring to FIG. 23C, if the second application indicator 1211 displayed on the display region of the first private mode provided to the first page is selected to be generated in a different mode, the controller 180 can identifiably display indicators 1304 and 1305 of pages, each of which has a display region of a mode capable of supporting the second application. Hence, a user can place the second application indicator 1211 in the display region corresponding to the mode of supporting the second application.

In addition, the controller 180 can request an authentication procedure before generating the information corresponding to the first display region. If the authentication procedure is validly performed, the controller 180 generates the information corresponding to the first display region in the second mode. If the authentication procedure is not validly performed, the controller 180 cannot generate the information corresponding to the first display region in the second mode entirely or in part.

For instance, the controller 180 can request to perform the authentication procedure in at least one of the following instances. First, the controller 180 can request to perform the authentication procedure if a conditional access or a security function is set on the information corresponding to the first display region entirely or in part. Secondly, the controller 180 can request to perform the authentication procedure if a conditional access is set on the second mode. Thirdly, the controller 180 can request to perform the authentication procedure if a security level of the first mode is higher than that of the second mode. Fourthly, the controller 180 can perform the authentication procedure if a security level of an entire part or portion of the information corresponding to the first display region is higher than that of the second mode.

The controller 180 receives an input of user authentication information from a user. If the input user authentication information matches previously registered authentication information, the controller 180 can determine that the authentication procedure is valid. For instance, the user authentication information can be input in one of various ways including a password input, a user fingerprint input, a user face image input, a user iris recognition, a user ID card recognition and the like.

If the authentication procedure is not valid, the controller 180 (1) does not display the entire part of the information corresponding to the first display region in the second mode or (2) limitedly generates a portion of the information corresponding to the first display region in the second mode. For instance, a partial information, on which the security level or conditional access is not set, in the information corresponding to the first display region, a partial information designated by a user to be shared, a partial information having a security level equal to or lower than that of the second mode or the like can be generated despite that the authentication procedure is not validly performed.

The authentication procedure execution is described in detail with reference to the accompanying drawings as follows. In particular, FIGS. 24A to 24C are display screens illustrating performing an authentication procedure when generating information corresponding to a first display region in a second mode according to an embodiment of the present invention.

In this example, information corresponding to a first display region is limited to an application indicated by an application indicator containing a touch point. The following embodiment relating to an authentication procedure is applicable to information of a different type. In addition, the information corresponding to the first display region is assumed to be supported in a second mode.

Figure 24A:
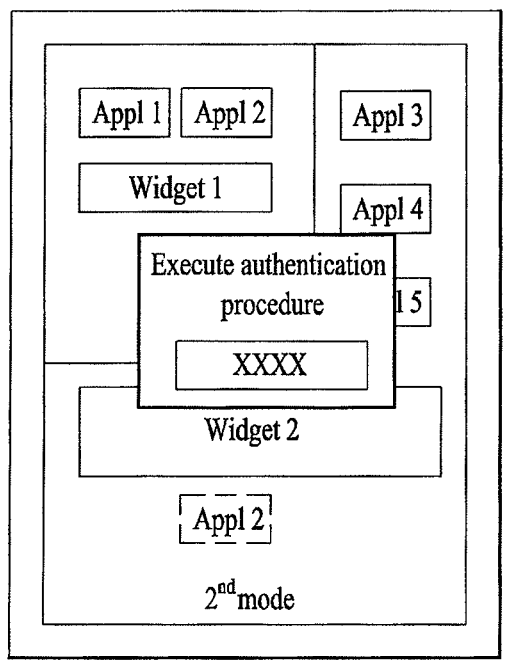
FIGS. 24A to 24C are display screens illustrating performing an authentication procedure when generating information corresponding to a first display region in a second mode according to an embodiment of the present invention.
Figure 24B:
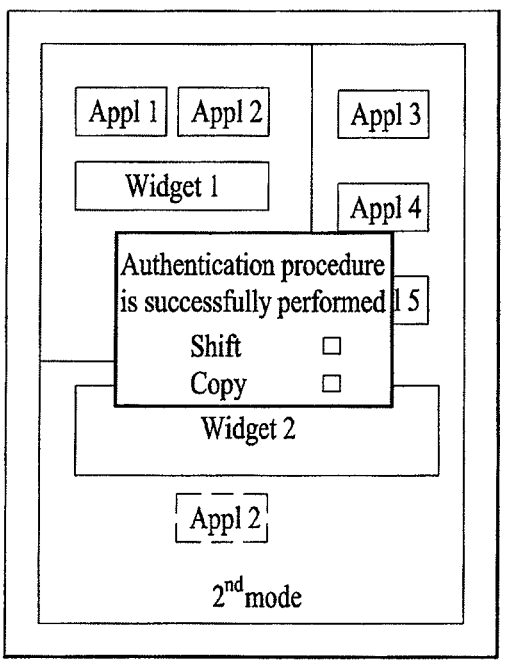
Figure 24C:
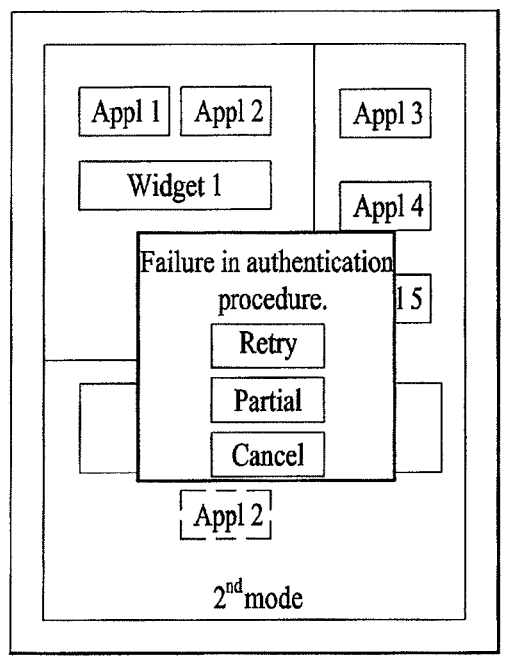
Figure 24C:
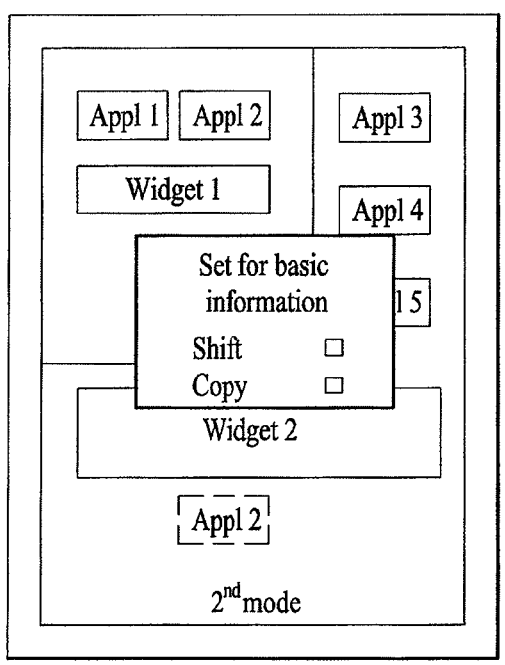

Referring to FIG. 24A, when attempting to generate a second application corresponding to the second application information 1211 displayed on the first display region 1210 in a second mode, the controller 180 can request an execution of an authentication procedure. Referring to FIG. 24B, if the authentication procedure is validly performed, the controller 180 allows a user to generate the second application in the second mode.

Moreover, the user can select whether to keep displaying the second application indicator on the first display region 1210 (maintaining/stopping a display). For instance, if a shift is selected via a window, the second application indicator is not displayed on the first display region 1210 any more (stopping a display). If a copy is selected, the second application indicator can be displayed on both of the first display region 1210 and the second display region 1220 (maintaining a display).

Referring to FIG. 24C, if the authentication procedure is not validly performed, the controller 180 informs a user of the authentication procedure failure and also allows a user to select one of an authentication procedure retrial (retry), an authentication procedure cancellation (cancel) and a generation of partial information (partial) (FIG. 24C(a)).

If the 'partial' is selected in FIG. 24C(a), the controller 180 can generate a portion of the second application in the second mode (FIG. 24C(b)). For instance, if the second application is a common application, information (i.e., basic information), on which a security level or conditional access is not set) in data/content related to the second application can be generated in the second mode. Meanwhile, if the second application is a dedicated application, the second application may not be generated at all.

In addition, the controller 180 displays a shift indicator on a boundary between the first display region and the second display region using the touchscreen 151 and can then receive an input of a touch and drag action to shift the shift indicator. Further, the controller 180 determines whether a partial information contained in a shift region of the shift indicator in the information corresponding to the first display region is supported in the second mode. In accordance with a result of the determination, the controller 180 can generate the partial information contained in the shift region of the shift indicator in the second mode.

Figure 25A:
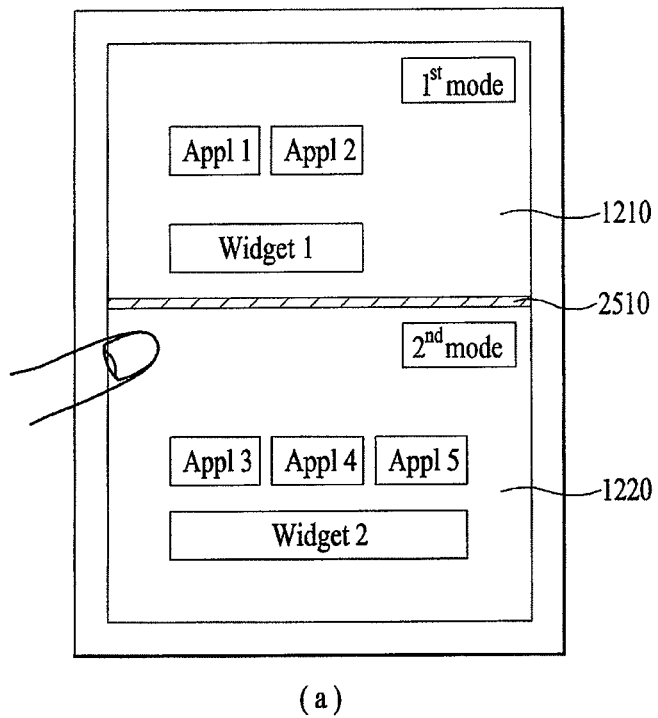
FIGS. 25A to 25E are display screens illustrating generating an application/widget, which is displayed on a prescribed display region, in a different mode using a shift indicator according to an embodiment of the present invention.
Figure 25A:
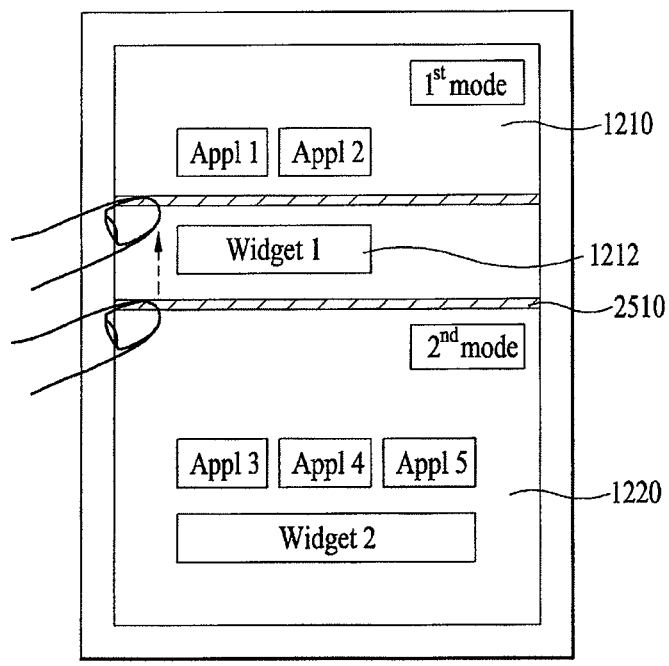

This is described in detail with reference to the accompanying drawings as follows. FIGS. 25A to 25E are display screens illustrating receiving a touch and drag action on a shift indicator according to an embodiment of the present invention. Referring to FIG. 25A, the controller 180 displays a shift indicator 2510 on a boundary between the first display region 1210 and the second display region 1220 (FIG. 25A(a)) and can then receive an input of a touch and drag action to shift the shift indicator 2510 (FIG. 25A(b)). In this instance, the shift indicator 2510 can be set if a long touch, plural touches or a multi-touch is input to the boundary between the first and second display regions 1210 and 1220.

Figure 25B:
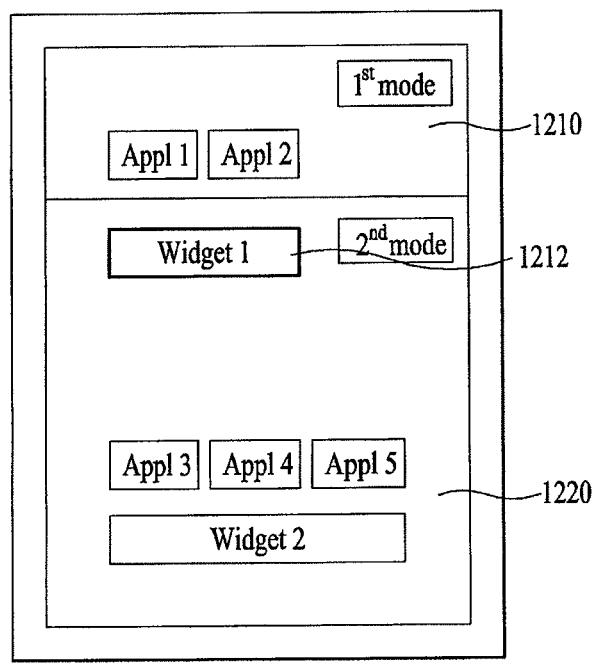

Referring to FIG. 25B, if the first widget 1212 of the first display region 1210 is contained in the shift region of the shift indicator shown in FIG. 25A, the controller 180 determines whether the first widget 1212 is supported in the second mode. If the first widget 1212 is supported in the second mode, the controller 180 generates the first widget 1212 in the second mode and can then display the first widget 1212 within the second display region 1220.

Thus, because the boundary between the first and second display regions 1210 and 1220 is shifted by the shift of the shift indicator 2510, a size of the first display region 1210 is decreased and a size of the second display region 1220 is increased. If the boundary is not shifted by the shift of the shift indicator 2510, the display region size is not modified.

Figure 25C:
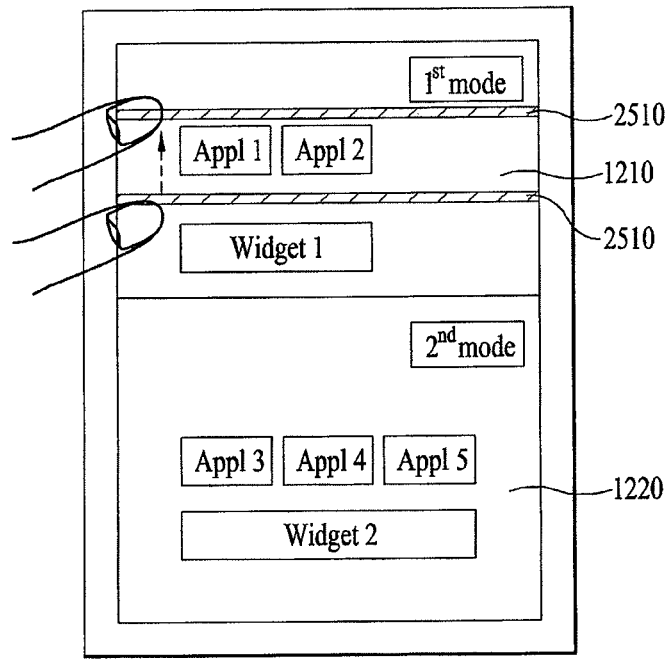
Figure 25C:
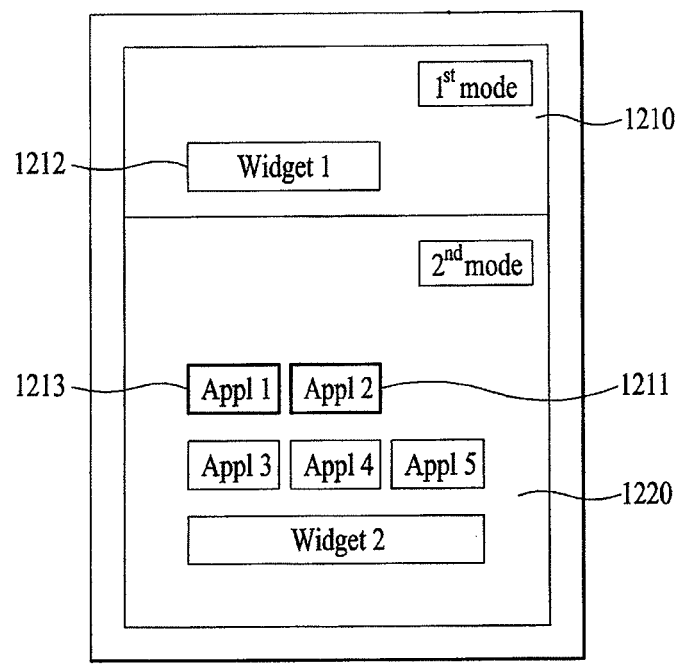

Referring to FIG. 25C, the controller 180 receives an input of a first touch and drag action to shift a position of the shift indicator 2510 to a second position from a first position in FIG. 25A and receives an input of a second touch and drag action on the shift indicator 2510 from the second position (FIG. 25C(a)).

After the shift indicator 2510 at the second position has been shifted in FIG. 25C(a), if the controller 180 receives an input of a touch and drag action for enabling the first and second application indicators 1211 and 1213 to be included in the shifted region (FIG. 25C(b)), the controller 180 determines whether a first application corresponding to the first application indicator 1213 and a second application corresponding to the second application indicator 1211 are supported in the second mode. If the controller 180 determines that the first and second applications are supported in the second mode, the controller 180 generates the first and second applications in the second mode and can display first and second application indicators 1213 and 1211 within the second display region 1220. Thus, if the first and second applications are generated in the second mode, the first display region 1210 is reduced by a size corresponding to the first and second application indicators 1213 and 1211 while the second display region 1220 is enlarged.

Figure 25D:
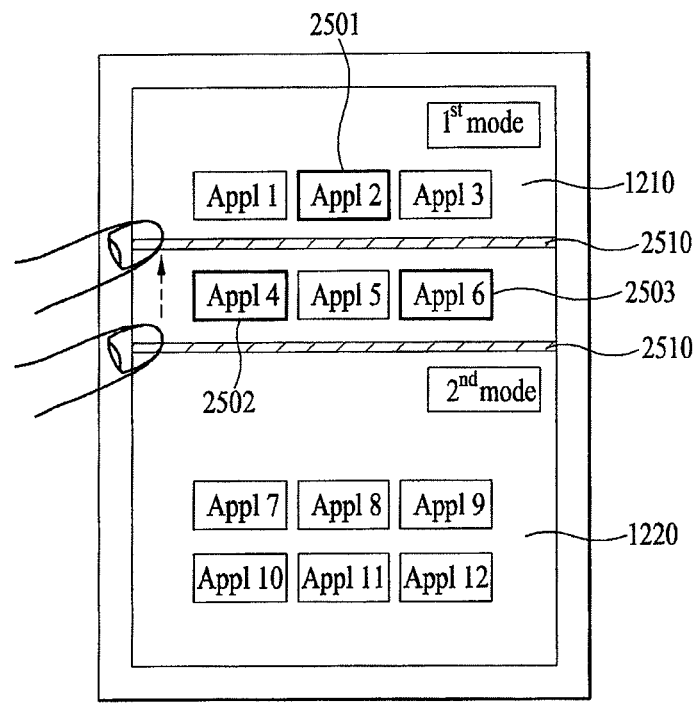
Figure 25D:
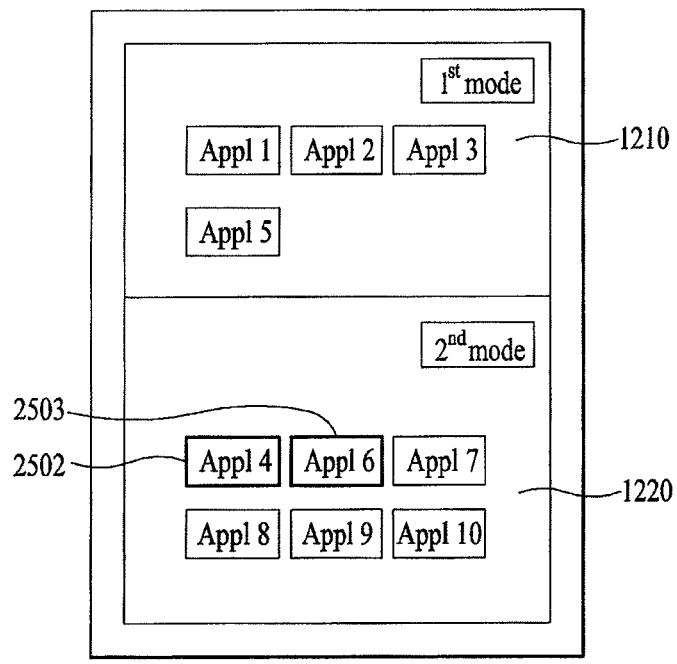

Referring to FIG. 25D, while the shift indicator 2510 is displayed, the controller 180 can identifiably display the application indicators 2501 to 2503 supported in the second mode among a plurality of application indicators displayed on the first display region (FIG. 25D(a)). The application indicator supported in the first mode among the application indicators displayed on the second display region can be identifiably displayed.

If the shift indicator 2510 is shifted, the controller 180 generates fourth and sixth applications respectively corresponding to the fourth and sixth application indicators 2502 and 2503 supported in the second mode among the application indicators contained in the shifted region and can then display the fourth and sixth application indicators 2502 and 2503 on the second display region 1220 (FIG. 25D(b)).

Figure 25E:
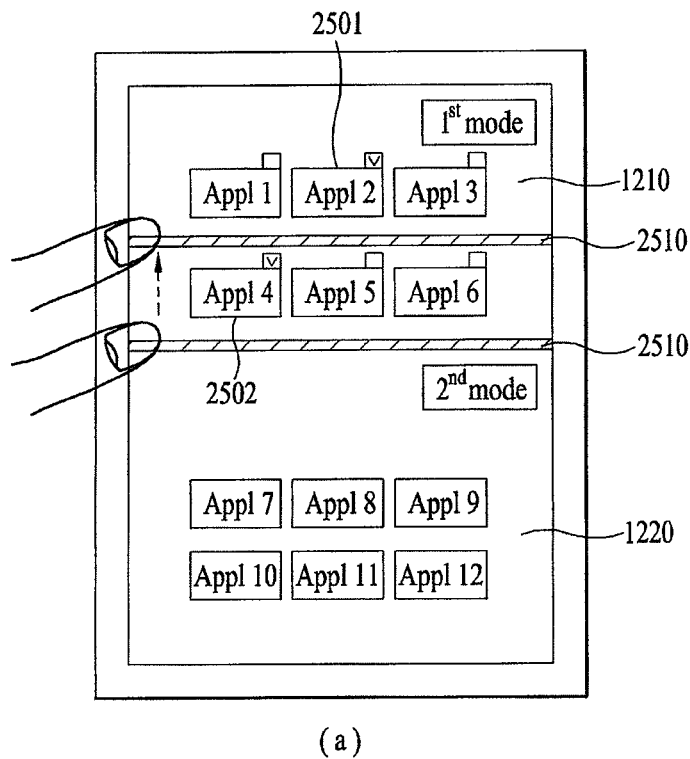
Figure 25E:
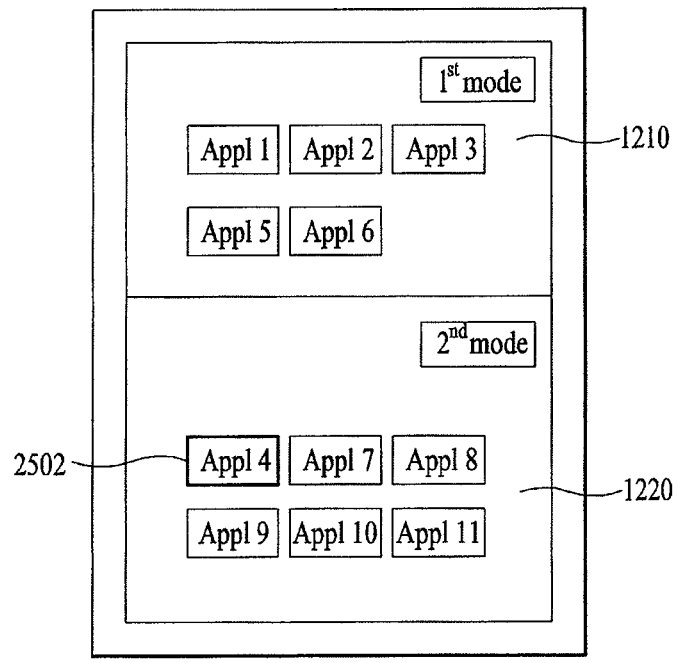

Referring to FIG. 25E, while the shift indicator 2510 is displayed, the controller 180 provides each of the application indicators with a selection box (e.g., a check box), thereby enabling a user to select an indicator of an application to generate in the second mode. In particular, after the second and fourth applications 2501 and 2502 have been selected in FIG. 25E(a), if the shift indicator 2510 is shifted, the controller 180 generates the fourth application corresponding to the fourth application indicator 2502 selected from the application indicators contained in the shift region and can display the fourth application indicator 2502 on the second display region 1220 (FIG. 25E(b)).

Also, when receiving an input of a command (hereinafter named a cancel command) for canceling a shift indicator displayed status, the shift indicator may not be displayed. For instance, the cancel command can be input by shaking the terminal shaking, selecting a corresponding menu item or a key zone, inputting a voice command and the like. Moreover, if a touch and drag action for shifting the shift indicator is not input for a predetermined duration in the shift indicator displayed status, the shift indicator may not be displayed.

According to an embodiment of the present invention, when downloading a specific application to be executed in a first mode using the wireless communication unit 110, the controller 180 displays an indicator (hereinafter named a normal indicator) of a specific application on a first display region and can display a virtual indicator (hereinafter named a virtual indicator) of a specific application on a second display region, under the control of the controller 180.

In this instance, the virtual indicator corresponds to a virtual application indicator provided to a second mode to receive an input of an execution command for a specific application without a mode switching despite that the specific application is executed in the first mode. Thus, the virtual indicator provides a shortcut. The controller 180 can also identifiably display each of the normal indicator and the virtual indicator. For instance, information (e.g., 'F' indicating 'Fake') indicating the virtual indicator can be displayed on the virtual indicator.

Moreover, when downloading a specific application to execute in the first mode, the controller 180 can generate a virtual indicator of a specific application corresponding to each of the rest of at least one or more modes (second mode included) except the first mode and link information on a link to the specific application. In addition, the generated virtual indicator and link information can be stored in the memory 160. Alternatively, the virtual indicator and link information of the specific application can be downloaded together with the specific application in the course of downloading the specific application.

For instance, the link information of the specific application includes: (1) identification information of the specific application and mode information on a mode set on the specific application; or (2) position information of the specific application on a web server providing the specific application.

Moreover, at a download start point of the specific application, during the download or after completion of the download, the controller 180 can determine whether to generate the virtual indicator and the link information or whether to download the virtual indicator and the link information, in accordance with a user selection or a decision made by the controller 180.

For instance, when the specific application is not supported in the second mode, the virtual indicator and the link information are automatically generated. In another instance, when the specific application is supported in the second mode, the controller 180 can determine whether to generate the virtual indicator and the link information in accordance with a user selection.

When receiving an input of a selection signal of a virtual indicator of a specific application displayed on a second display region, the controller 180 activates a first mode using link information (mode information and identification information of the specific application) on the link to the stored specific application and then executes the specific application in the first mode. Alternatively, the controller 180 accesses an external server using link information (position information of the specific application on a web server) on the link to the stored specific application and then downloads the specific application supported in a second mode. Alternatively, when the specific application is a common application, the controller 180 brings the common application to the second mode using link information (mode information and identification information of the specific application) on the link to the stored specific application and then executes the common application in the second mode.

Figure 26A:
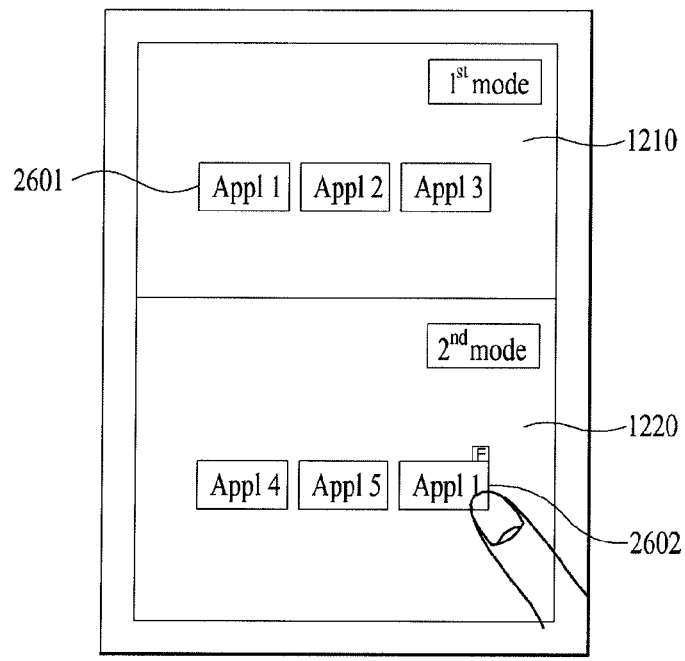
FIGS. 26A to 26C are display screens illustrating displaying a virtual indicator of an application and executing the application using the same according to an embodiment of the present invention.
Figure 26A:
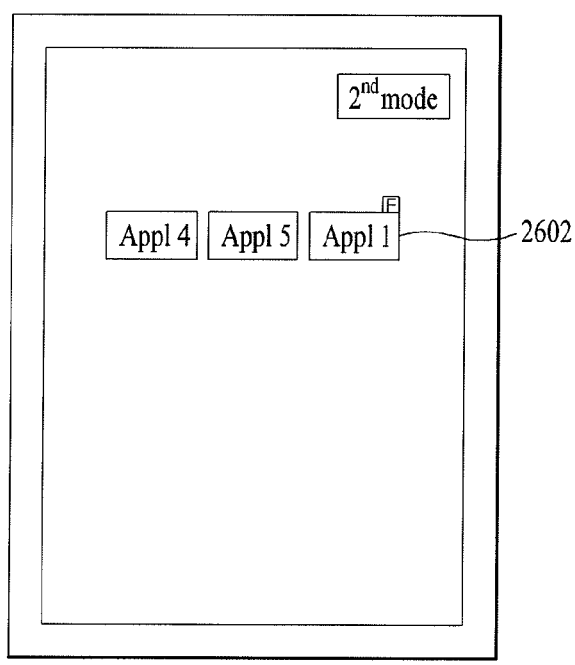
Figure 26B:
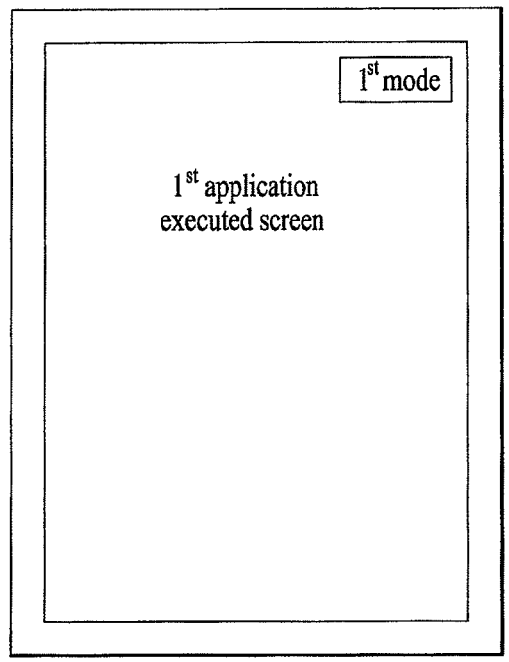
Figure 26B:
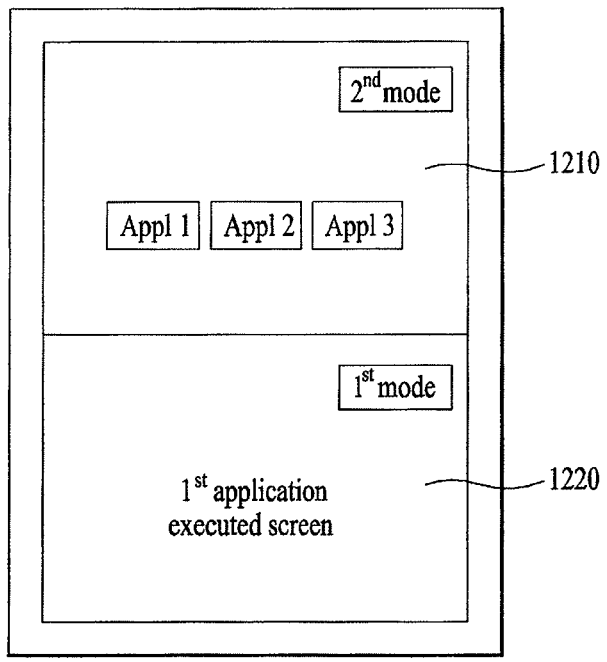
Figure 26C:
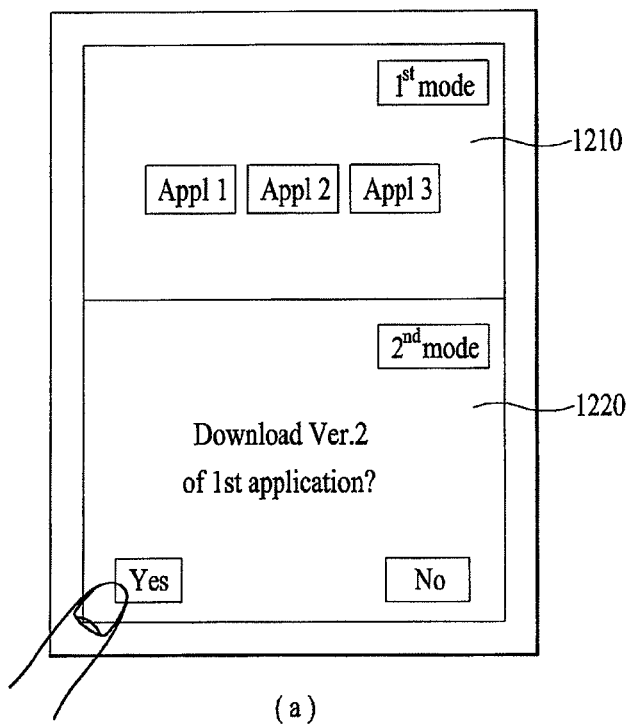
Figure 26C:
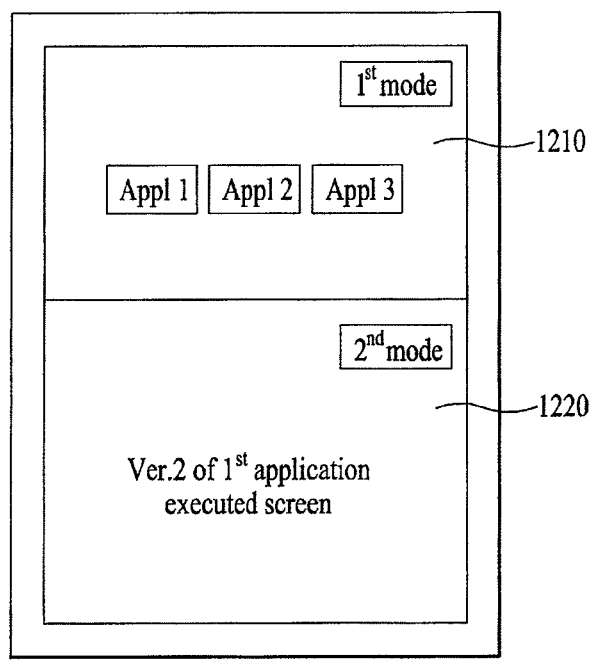

This is described in detail with reference to the accompanying drawings. In particular, FIGS. 26A to 26C are display screens illustrating displaying a virtual indicator of an application and executing the application using the same according to an embodiment of the present invention. For clarity and convenience of the following description, assume that a third application is designated to be executed in a first mode.

Referring to FIG. 26A, in a multimode screen status, a normal indicator 2601 of a third application is displayed within the first display region 1210 and a virtual indicator 2602 of the third application is displayed within a second display region 1220 (FIG. 26A(a)). In a single mode screen status of a second mode, the virtual indicator 2602 of the third application can be displayed within a second mode screen (FIG. 26A(b)). In doing so, a mark (F) for indicating that it is a virtual indicator is contained in the virtual indicator 2602.

Referring to FIG. 26B, when receiving an input of a selection signal of a virtual indicator 2602 of a first application displayed on the second display region 1220, the controller 180 activates a first mode and then executes the first application in the first mode. In addition, the controller 180 can display a whole screen (FIG. 26B(a)) or an executed screen of the first application on the second display region 1220 (FIG. 26B(b)). In this instance, the selection signal can contain a command for an execution of the first application.

Referring to FIG. 26C, when receiving an input of a selection signal of a virtual indicator 2602 of a first application displayed on the second display region 1220, the controller 180 enables a user to select whether to download the first application (FIG. 26C(a)). If the user selects to download the first application, the controller 180 accesses an application providing server, downloads the first application corresponding to the second mode, executes the downloaded first application in the second mode, and can then display an executed screen of the first application within the second display region 1220 (FIG. 26C(b)). In this instance, the selection signal can contain a command for a download of the first application corresponding to the second mode. Besides, the controller 180 can display virtual indicators only by sorting them or can display a virtual indicator to be distinguished from a normal indicator.

Accordingly, the present invention provides the following effects and/or advantages. First, when a plurality of modes are implemented, the present invention displays a corresponding mode screen via a plurality of display regions respectively corresponding to a plurality of the modes, whereby a mode screen of each of a plurality of the modes can be provided without performing a mode switching operation.

Second, the present invention generates information corresponding to a prescribed display region in a mode corresponding to a different display region by a touch and drag action, thereby facilitating an inter-mode information shift or information sharing substantially.

In addition, the modes mentioned above can variously include a religion mode, a hobby mode, a school mode and the like per type in addition to a private mode and a business mode. In addition, a plurality of modes can be set for each type. Further, when determining an application executed per mode, the controller 180 can designate an application in accordance with a user selection. In addition, the controller 180 can automatically designate an application to a corresponding mode in consideration of a property and type of the corresponding application.

For instance, assuming that a mode field exists in a data structure of an application, the controller 180 can designate an application to a corresponding mode defined in the mode field. Also, in each of a plurality of modes, a user interface related to at least one of a voice based communication and a text based communication can be provided via the display unit 151 under the control of the controller 180. For instance, the voice based communication includes a voice call, a voice based chatting and the like. In another instance, the text based communication can include a message service, a text based chatting and the like. The user interface is displayed as a virtual key form on a touchscreen or can be provided as a button key form. In addition, the user interface provided in each of a plurality of modes can differ in position, shape, size and the like.

In addition, the above-mentioned embodiments are applicable to a sharing of content/data included in a currently displayed screen or a sharing of an application to which content/data included in a currently displayed screen corresponds as well as the mode screen sharing.

According to one embodiment of the present invention, the above-described mode screen display controlling method of the mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via the Internet). In addition, the computer can include the controller 180 of the terminal.

The aforementioned embodiments for the mobile terminal and mode switching controlling method therein are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a communication unit configured to communicate with at least one external terminal;
   a memory configured to store at least first and second operating systems including at least first and second modes, respectively; and
   a controller configured to display, in a first display region of a display unit of the mobile terminal, a first application indicator corresponding to a first application executable in the first mode using the first operating system and that can be activated by selecting the first application indicator, and to display, in a second display region, a second application indicator corresponding to a second application executable in the second mode using the second operating system and that can be activated by selecting the second application indicator,
   wherein the first and second application indicators indicate whether the applications are executable in the first mode or the second mode, or executable in both the first and second modes,
   wherein the controller is further configured to receive a selection signal indicating a selecting of the first application indicator in the first display region and a moving of the first application indicator to the second display region, and
   wherein the controller is further configured to determine if the first application corresponding to the first application indicator can be executed in the second mode.

2. The mobile terminal of claim 1, wherein the controller is further configured to execute the first application in the first mode and display the executing first application in the first region when the first application indicator is selected, and to execute the second application in the second mode and display the executing second application in the second display region when the second application indicator is selected.

3. The mobile terminal of claim 1, wherein when the first application can be executed in the second mode, the controller is further configured to move or copy the first application indicator from the first display region to the second display region, and designate the first application as a common application executable in both the first and second modes when the first application indicator is copied to the second display region and to designate the first application as a second mode application executable only in the second mode when the first application indicator is moved to the second display region.

4. The mobile terminal of claim 1, wherein the controller is further configured to selectively use data corresponding to the first application when the first application is executed in the second mode based on an authentication procedure.

5. The mobile terminal of claim 1, wherein if the first application cannot be executed in the second mode, the controller is further configured to access an external server to retrieve at least one application that is similar to the first application and that can be executed in the second mode.

6. The mobile terminal of claim 1, wherein the controller is further configured to distinctively display the first application indicator in the first display region from other application indicators to indicate the first application can be executed in the second mode.

7. The mobile terminal of claim 1, wherein the controller is further configured to display a plurality of first mode identification numbers indicating a plurality of first modes, and display a plurality of second mode identification numbers indicating a plurality of second modes, and
wherein the selection signal indicates a selecting and moving of the first application indicator or the second application indicator to one of the first and second mode identification numbers.

8. The mobile terminal of claim 1, wherein the first mode corresponds to a private mode of a user using the mobile terminal and the second mode corresponds to a business mode for a business associated with the user.

9. The mobile terminal of claim 1, wherein the first and second application indicators include one of a widget and an icon.

10. A method of controlling a mobile terminal, the method comprising: allowing, via a communication unit of the mobile terminal, communication with at least one external terminal;
storing, in a memory of the mobile terminal, at least first and second operating systems including at least first and second modes, respectively;
displaying in a first display region of a display unit of the mobile terminal a first application indicator corresponding to a first application executable in the first mode using the first operating system and that can be activated by selecting the first application indicator;
displaying in a second display region of the display unit, a second application indicator corresponding to a second application executable in the second mode using the second operating system and that can be activated by selecting the second application indicator;
receiving a selection signal indicating a selecting of the first application indicator in the first display region and a moving of the first application indicator to the second display region; and
determining, via the controller, if the first application corresponding to the first application indicator can be executed in the second mode,
wherein the first and second application indicators indicate whether the applications are executable in the first mode or the second mode, or executable in both the first and second modes.

11. The method of claim 10, further comprising:
executing, via a controller of the mobile terminal, the first application in the first mode and displaying the executing first application in the first region when the first application indicator is selected; and
executing, via the controller, the second application in the second mode and display the executing second application in the second display region when the second application indicator is selected.

12. The method of claim 10, wherein when the first application can be executed in the second mode, the method further comprises:
moving or copying the first application indicator from the first display region to the second display region;
designating the first application as a common application executable in both the first and second modes when the first application indicator is copied to the second display region; and
designating the first application as a second mode application executable only in the second mode when the first application indicator is moved to the second display region.

13. The method of claim 10, further comprising: selectively using data corresponding to the first application when the first application is executed in the second mode based on an authentication procedure.

14. The method of claim 10, wherein if the first application cannot be executed in the second mode, the method further comprises:
access, via the communication unit, an external server to retrieve at least one application that is similar to the first application and that can be executed in the second mode.

15. The method of claim 10, further comprising:
distinctively displaying the first application indicator in the first display region from other application indicators to indicate the first application can be executed in the second mode.

16. The method of claim 10, further comprising:
displaying a plurality of first mode identification numbers indicating a plurality of first modes; and
displaying a plurality of second mode identification numbers indicating a plurality of second modes,
wherein the selection signal indicates a selecting and moving of the first application indicator or the second application indicator to one of the first and second mode identification numbers.

17. The method of claim 10, wherein the first mode corresponds to a private mode of a user using the mobile terminal and the second mode corresponds to a business mode for a business associated with the user.

18. The method of claim 10, wherein the first and second application indicators include one of a widget and an icon.

* * * * *